United States Patent
Lu et al.

(10) Patent No.: US 12,491,041 B2
(45) Date of Patent: Dec. 9, 2025

(54) MEDICAL DEVICE AND STORAGE BOX FOR MEDICAL ARTICLE

(71) Applicants: SHENZHEN MINDRAY BIO-MEDICAL ELECTRONICS CO., LTD., Shenzhen (CN); SHENZHEN MINDRAY SCIENTIFIC CO., LTD., Shenzhen (CN)

(72) Inventors: Yi Lu, Shenzhen (CN); Haibin Meng, Shenzhen (CN); Xuegang Zhang, Shenzhen (CN); Lijuan He, Shenzhen (CN); Shenhui Dong, Shenzhen (CN); Zedong Li, Shenzhen (CN); Wenhui Zhou, Shenzhen (CN); Huan Zou, Shenzhen (CN); Xiang Zhou, Shenzhen (CN)

(73) Assignees: SHENZHEN MINDRAY BIO-MEDICAL ELECTRONICS CO., LTD., Shenzhen (CN); SHENZHEN MINDRAY SCIENTIFIC CO., LTD., Shenzhen (CN)

(*) Notice: Subject to any disclaimer, the term of this patent is extended or adjusted under 35 U.S.C. 154(b) by 1145 days.

(21) Appl. No.: 16/944,108

(22) Filed: Jul. 30, 2020

(65) Prior Publication Data

US 2020/0360102 A1 Nov. 19, 2020

Related U.S. Application Data

(63) Continuation of application No. PCT/CN2018/113471, filed on Nov. 1, 2018.

(30) Foreign Application Priority Data

Jan. 31, 2018 (CN) .......................... 201810100066.6

(51) Int. Cl.
*A61B 50/20* (2016.01)
*A61B 5/00* (2006.01)
(Continued)

(52) U.S. Cl.
CPC ............ *A61B 50/20* (2016.02); *A61B 5/0002* (2013.01); *B25J 15/0028* (2013.01); *B25J 15/0441* (2013.01)

(58) Field of Classification Search
None
See application file for complete search history.

(56) References Cited

U.S. PATENT DOCUMENTS

| | | | |
|---|---|---|---|
| 6,102,855 A * | 8/2000 | Kehr | .................... A61B 5/0002 600/300 |
| 6,770,028 B1 | 8/2004 | Ali et al. | |

(Continued)

FOREIGN PATENT DOCUMENTS

| | | |
|---|---|---|
| CN | 203983364 U | 12/2014 |
| CN | 104471623 A | 3/2015 |

(Continued)

OTHER PUBLICATIONS

Second Office Action issued in related Chinese Application No. 201880085116.6, mailed Aug. 24, 2023, 5 pages.

(Continued)

*Primary Examiner* — Erica S Lee
(74) *Attorney, Agent, or Firm* — Syncoda PLLC; Feng Ma

(57) ABSTRACT

A medical device and a storage box for a medical article are provided, where the medical device at least includes a main case having at least two exposed chamber outer walls and an accommodation compartment for accommodating a medical article. The at least two exposed chamber outer walls enclose an accommodation chamber to accommodate a (Continued)

functional module. The accommodation compartment is disposed on the main case and adjacent to the accommodation chamber. The accommodation compartment includes at least one exposed compartment outer wall, and the at least one exposed compartment outer wall is connected to the at least one chamber outer wall of the main case. The medical device enables the medical article to be well accommodated in the accommodation compartment, and the accommodation compartment can be flexibly configured onto the medical device to decrease the space occupied by the accommodation compartment.

15 Claims, 50 Drawing Sheets

(51) Int. Cl.
*A61B 50/30* (2016.01)
*A61B 50/31* (2016.01)
*B25J 15/00* (2006.01)
*B25J 15/04* (2006.01)

(56) References Cited

U.S. PATENT DOCUMENTS

| | | | |
|---|---|---|---|
| 2003/0163089 A1* | 8/2003 | Bynum | A61M 5/14566 604/154 |
| 2007/0026888 A1* | 2/2007 | Zhou | H04M 1/0262 455/550.1 |
| 2010/0114218 A1* | 5/2010 | Heath | A61H 31/006 128/204.23 |
| 2014/0159921 A1 | 6/2014 | Qualey et al. | |
| 2014/0275902 A1 | 9/2014 | Kinsley et al. | |
| 2015/0083121 A1* | 3/2015 | Fisher | A61M 16/0051 128/205.13 |
| 2015/0083728 A1* | 3/2015 | Hooley | B65F 1/1623 220/495.08 |
| 2016/0015167 A1* | 1/2016 | Abu-Akel | A47B 21/02 248/161 |
| 2017/0076634 A1* | 3/2017 | Hoss | G09B 23/288 |
| 2017/0244825 A1* | 8/2017 | Li | H04W 4/80 |
| 2017/0340847 A1* | 11/2017 | Taylor | A61M 16/0875 |

FOREIGN PATENT DOCUMENTS

| | | |
|---|---|---|
| CN | 204219063 U | 3/2015 |
| CN | 104691898 A | 6/2015 |
| CN | 204959974 U | 1/2016 |
| CN | 204995440 U | 1/2016 |
| CN | 205144733 U | 4/2016 |
| CN | 205493777 U | 8/2016 |
| CN | 205658582 U | 10/2016 |
| CN | 106562784 A | 4/2017 |
| CN | 209645071 U | 11/2019 |
| JP | H11268725 A | 10/1999 |
| JP | 2008108661 A | 5/2008 |
| TW | M328825 U | 3/2008 |

OTHER PUBLICATIONS

First Office Action issued in related Chinese Application No. 201880085116.6, mailed Feb. 27, 2023, 9 pages.

International Search Report issued in corresponding International Application No. PCT/CN2018/113471, mailed Nov. 1, 2018, 6 pages.

First Office Action issued in related Chinese Application No. 202210321457.7, mailed Nov. 15, 2024, 12 pages.

* cited by examiner

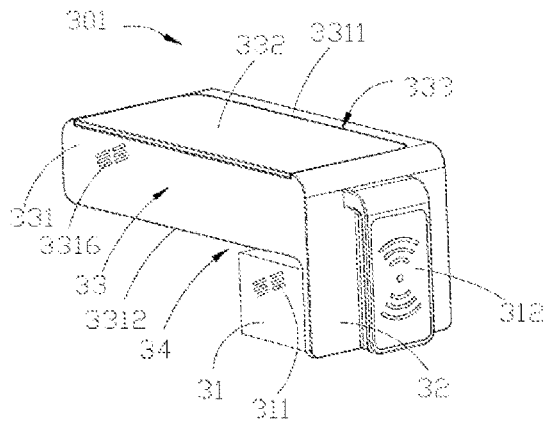
FIG. 3
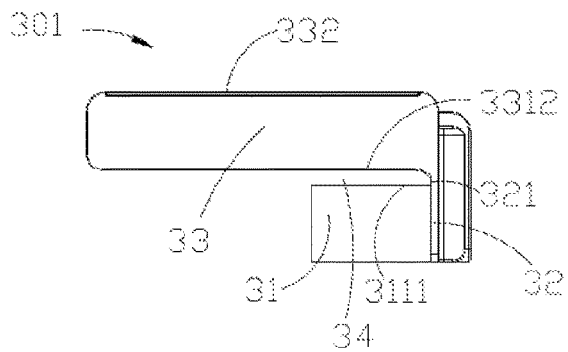
FIG. 4
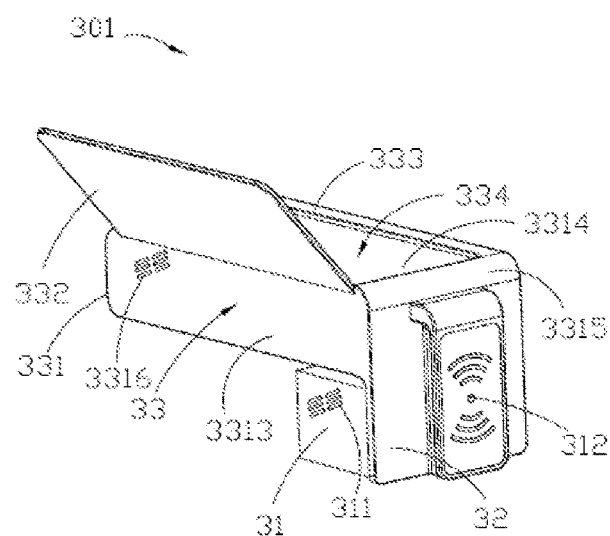
FIG. 5
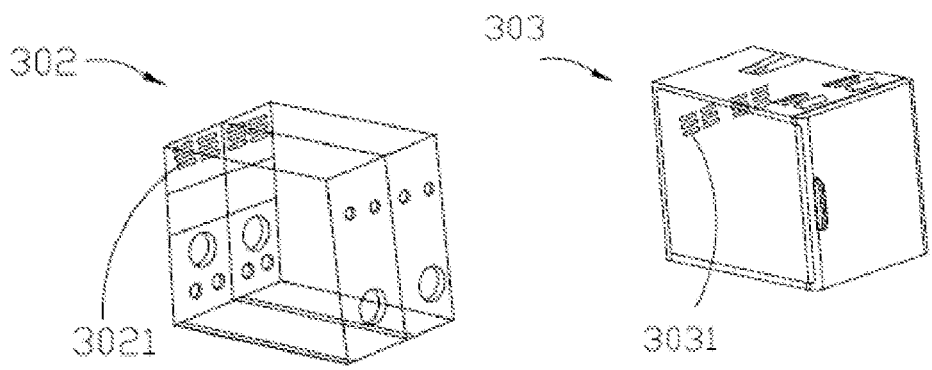
FIG. 6
FIG. 7

MEDICAL DEVICE AND STORAGE BOX FOR MEDICAL ARTICLE

CROSS REFERENCE TO RELEATED APPLICATIONS

This disclosure is a continuation of Patent Cooperation Treaty Application No. PCT/CN2018/113471, filed on Nov. 1, 2018, which claims priority and benefits of Chinese Patent Application No. 201810100066.6, filed on Jan. 31, 2018. These applications are hereby incorporated by reference.

TECHNICAL FIELD

This disclosure relates to the technical field of medical equipment, in particularly to a medical device and a storage box for a medical article.

BACKGROUND

In a hospital, patients require various medical devices such as a patient monitor to monitor the physiological changes in the patients during or after surgery. However, these medical devices usually are connected to a wide variety of power lines, data transmission lines, cable wires, or the like. These lines and cables are scattered near the medical devices and are prone to trampling by medical care personnel or patients, causing that the lines and cables are unable to work due to breaking or the loss of the capability to transmit signals caused by prolonged trampling. Further, the tangling of the lines and cables also impairs the work efficiency of surgeons and nurses. Therefore, such patient monitors with lines and cables not accommodated well increase the maintenance expenses of medical devices and is inconvenient for cleaning wards.

Furthermore, for existing patient monitors, the lines and cables are accommodated mainly by adding a storage bracket on main bodies of the patient monitors. However, such a storage bracket is externally hung on the main bodies of the patient monitors, which results in large space occupation of the medical devices, inflexible configurations and inconvenient real-time monitoring of patients.

SUMMARY

In one aspect, a medical device is provided, which may include a main case that includes at least two exposed chamber outer walls and an accommodation compartment for accommodating a medical article. The at least two exposed chamber outer walls enclose an accommodation chamber for accommodating a functional module. The accommodation compartment is disposed on the main case and is adjacent to the accommodation chamber. The accommodation compartment includes at least one exposed compartment outer wall, and the at least one compartment outer wall is connected to at least one of the chamber outer walls of the main case.

In another aspect, a storage box for a medical article is provided, which includes a mounting portion insertable into a medical device, and an accommodation portion fixed on the mounting portion, where the accommodation portion is a chamber structure for housing the medical article.

In the medical device of this disclosure, the accommodation chamber is provided on the main body of the medical device and the at least one compartment outer wall of the accommodation compartment is connected to at least one of the chamber outer walls of the main case to enable the accommodation compartment to be embedded in the main body of the medical device in a hidden manner. Therefore, the medical device of this disclosure enables the medical article to be well accommodated in the accommodation compartment, and the accommodation compartment can be flexibly configured onto the medical device to reduce the space occupied by the accommodation compartment. The storage box for the medical article provided by this disclosure is removably connected to the medical device, and has a structure partially inserted in the accommodation compartment, such that the space occupied by the accommodation compartment is reduced.

BRIEF DESCRIPTION OF THE DRAWINGS

Following detailed descriptions of respective embodiments in this disclosure can be understood better when combining with these figures, in which the same structure is represented by the same reference sign. In the figures:

FIG. 3 is a schematic structural diagram of a first implementation of a medical article of the medical device of FIG. 1.

FIG. 4 is a front view of the medical article of FIG. 3.

FIG. 5 is a view of an operating state of the medical article of FIG. 3.

FIG. 6 is a schematic structural diagram of a second implementation of the medical article of the medical device of FIG. 1.

FIG. 7 is a schematic structural diagram of a third implementation of the medical article of the medical device of FIG. 1.

DETAILED DESCRIPTION

The technical solutions in the embodiments of this disclosure will be clearly and completely described below with respect to the accompanying drawings in the embodiments of this disclosure. The present application may be implemented in various forms and is not limited to the implementations described in those embodiments. The detailed description of embodiments below is provided for the purpose of better and complete understanding of the disclosure of the present application, where the words "up", "low", "left", "right" or the like that indicate orientations refer to the position of a structure shown in a corresponding FIGURE.

It should be understood that the terms as used here are merely for describing particular embodiments and are not intended to limit the present application. As used here, singular forms "a" and "an" are intended to include a plural form unless stated explicitly otherwise. Further, as used in this description, the terms "include" and/or "comprise" indicate the presence of a feature, a whole, a step, an element and/or a component, but do not exclude the presence or addition of one or more other features, wholes, steps, elements, components and/or combinations thereof. Preferred implementations of the present application are subsequently described in the description, but the description is for the purpose of explaining the general principles of this disclosure and is not intended to limit the scope of this disclosure. The scope of protection of this disclosure is defined by the appended claims.

Figure 1:
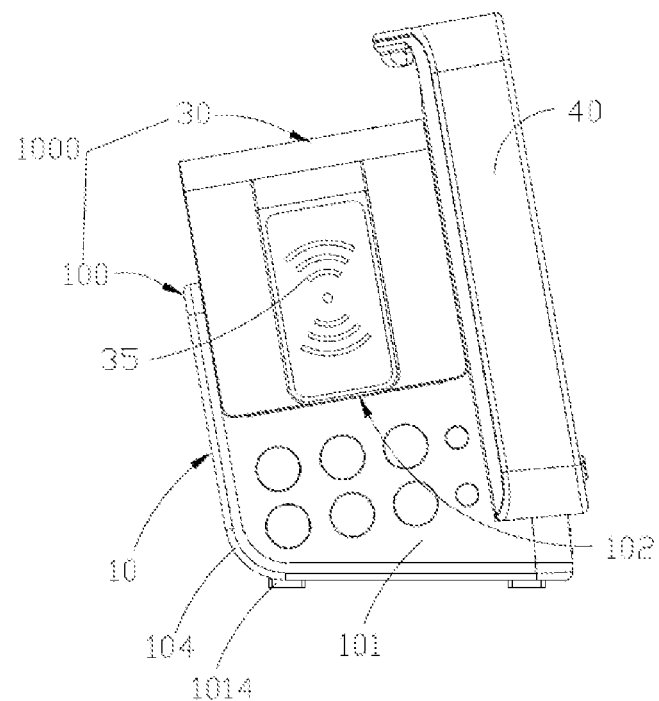
FIG. 1 is a schematic structural diagram of a medical device provided according to a first embodiment of this disclosure.

The terms "first", "second", "third", "fourth" or the like in the description, the claims as well as the above-mentioned accompanying drawings of this disclosure are used to distinguish different objects, and are not necessarily used to describe a specific order. Referring to FIG. 1, a schematic structural diagram of a medical device 1000 provided according to a first embodiment of this disclosure is shown. It may be understood that the medical device 1000 comprises a monitor 100. In this embodiment, the monitor 100 may be a portable monitor, a transfer monitor or a movable monitor. Alternatively, in other embodiments, the monitor 100 may also be another type of medical device, for example, a monitor with physically separated host and displayer, and data may be transmitted between the physically separated host and display in the monitor in a wireless or wired manner.

Figure 2:
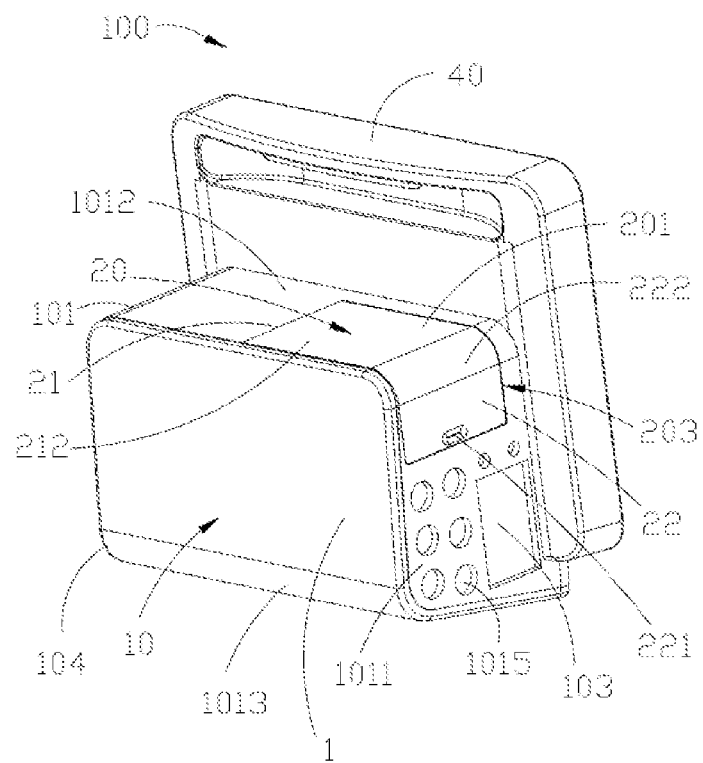
FIG. 2 is a schematic structural diagram of a patient monitor provided according to the first embodiment of this disclosure.

Referring to FIGS. 1 and 2, the monitor 100 may include a host part 10 and an accommodation compartment 20 disposed on the host part 10. Of course, in other embodiments, the monitor 100 may also include a display screen 40.

The host part 10 may include at least a main case 1 and several functional modules disposed inside the main case 1. The several functional modules may be, but are not limited to, a parameter processing board that measures and processes physiological parameters, a main control board and a first interface communication board. The main case 1 may include at least two exposed chamber outer walls 101, and the at least two exposed chamber outer walls 101 jointly enclose an accommodation chamber 103 for accommodating the several functional modules. Particularly, the parameter processing board, the main control board and the first interface communication board are disposed inside the accommodation chamber 103.

In this embodiment, the parameter processing board may be, but is not limited to, a physiological parameter measurement circuit (module), a human physiological parameter measurement circuit (module) or a sensor for acquiring human physiological parameters, etc. Specifically, the parameter processing board may obtain a physiological sampled signal related to a patient from an external physiological parameter monitoring accessory through the first interface communication board, process the physiological sampled signal and then get physiological data for outputting to the display screen and/or a loudspeaker through the main control board for giving an alarm and display.

The main control board is used to control the data interaction and control signal transmission between at least one parameter processing board and the first interface communication board. The main control board may transfer the physiological data to the display screen 40 for display, or may also receive an inputted user control instruction from the display screen 40 or a physical input interface such as a keyboard and a button (generally the physical input interface may be disposed at a position on an edge of the display screen 40). In some embodiments, the main control board may also output a control signal about how to acquire the physiological parameters.

The main case 1 is also provided with several connection interfaces 1015 that is positioned correspondingly to and electrically connected to the first interface communication board. An output end of the external physiological parameter monitoring accessory inputs the sampled signal to the host part 10 via these connection interfaces 1015. Of course, the control signal about how to acquire the physiological parameters outputted from the host part 10 may also be outputted to the external physiological parameter monitoring accessory via a respective connection interface and the first interface communication board, thus achieving the monitoring and control of the physiological parameters of the patient. The first interface communication board mentioned herein may be a parameter panel.

The connection interfaces 1015 may include a wireless interface or a wired interface. The wireless interface included in the connection interfaces 1015 may be, but is not limited to, a parallel interface, wifi, Bluetooth or Ethernet. The wired interface included in the connection interfaces 1015 may be, but is not limited to, a serial interface, a power interface, a USB interface, a printer interface, a headphone interface or other interfaces for function extension modules.

It may be understood that the types of the connection interfaces 1015 are suitable for other embodiments of this disclosure.

The main case 1 is provided with the accommodation compartment 20 for accommodating a medical article 30. For example, the accommodation compartment 20 is disposed on the main case 1 and is adjacent to the accommodation compartment 103 of the main case 1. The accommodation compartment 20 includes at least one exposed compartment outer wall 201, and the at least one compartment outer wall 201 is connected to at least one of the chamber outer walls 101 of the main case 1. The accommodation chamber 103 of the main case 1 is a closed chamber structure, and the accommodation compartment 20 is a semi-open chamber structure so as to prevent dust and debris from entering the accommodation chamber 103 of the main case 1, enable various functional elements to be well accommodated and realize the inserting of the medical article 30 into the accommodation compartment 20.

The medical article 30 here may include a parameter measurement function extension module, a storage box for the medical article, a physiological parameter monitoring accessory or an adapter module for a third-party device that is connected to the medical device. The parameter measurement function extension module may be a separately arranged module for measuring the physiological parameters such as carbon dioxide gas and blood oxygen, and the storage box for the medical article may be a box for housing the physiological parameter monitoring accessory. The physiological parameter monitoring accessory include at least one accessory device for measuring the physiological parameters such as ECG signals, blood oxygen signals, blood pressure signals, body temperature and respiration. The adapter module for the third-party device may be a structure for inserting the accommodation compartment 20 to additionally house the parameter measurement function extension module, the storage box for the medical article and the physiological parameter monitoring accessory.

The above-mentioned display screen 40 is fixedly disposed on the host part 10, or the display screen 40 is removably disposed on the host part 10. The display screen 40 is in electrical connection with the first interface communication board and/or the main control board. The display screen 40 is used for displaying the physiological data, receiving various instructions inputted by the user, and/or for prompting alarm information, etc. The display screen 40 may be a touch display screen or other visualization devices. In an embodiment, the display screen 40 may switch menus or switch to pop up a parameter setting window based on touch gestures of the user.

In addition, in one of the embodiments, the above-mentioned accommodation compartment 20 is provided with an opening 203 for inserting the medical article 30 that is to be connected to the host part 10. When the medical article 30 is not inserted in the opening 203 in the accommodation compartment 20, the at least one compartment outer wall 201 of the accommodation compartment 20 is flush with the correspondingly connected chamber outer wall 101 of the host part 10, such that the host part 10 can have a complete outer wall and the risk of collision in a small and jammed space due to an irregular outer wall may be eliminated, or difficulties in mounting due to an irregular outer wall are eliminated.

It may be understood that, in one of the embodiments, the at least one compartment outer wall 201 of the accommodation compartment 20 is in the same plane as at least one of the chamber outer walls 101 of the main case 1. For example, the at least one compartment outer wall 201 of the accommodation compartment 20 is in the same plane as the chamber outer wall on which the first interface communication board is located.

As shown in FIG. 2, in one of the embodiments, the accommodation compartment 20 includes one movable compartment door 22. The compartment door 22 may be turned over toward the interior of the accommodation compartment 20 or be turned over toward outside of the accommodation compartment 20 to expose an inner chamber in the accommodation compartment 20 for facilitating the usage by the user. In addition, the compartment door 22 may form the at least one compartment outer wall 201 of the accommodation compartment 20, and at least part of the compartment outer wall 201 on which the compartment door 22 is located is in the same plane as the chamber outer wall on which the first interface communication board is located.

In this embodiment, the accommodation compartment 20 may be fixedly disposed on the main case 1. Alternatively, in other embodiments, the accommodation compartment 20 may also be removably or movably disposed on the main case 1. It may be understood that the accommodation compartment 20 may be fixedly or movably connected to the main case 1 by means of a mounting structure disposed on the main case 1. The mounting structure here can be a fixed connection portion and/or a movable connection portion. The accommodation compartment 20 is fixedly disposed on the main case 1 by means of the fixed connection portion. For example, the fixed connection portion may be a retaining structure of a locking member or the like. Alternatively, the accommodation compartment 20 is removably or movably disposed on the main case 1 by means of the movable connection portion. For example, the movable connection portion may be a sliding guide structure, a magnetic attraction structure or the like. The accommodation compartment 20 is connected to the main case 1 by the movable connection portion so as to be movable relative to the main case 1, such that the accommodation compartment 20 has a variable accommodation space for accommodating the medical article 30.

As shown in FIGS. 1 and 2, in one of the embodiments, the main case 1 may include a side plate 1011, and a top plate 1012 and a bottom plate 1013 which two are opposite arranged. The side plate 1101 extends downward vertically from an edge of the top plate 1012 and is connected to the bottom plate 1013. The bottom plate 1013 of the main case 1 is provided with several fixed support blocks 1014 for stably supporting the monitor 100. In this embodiment, the first interface communication board is disposed on the side plate 1011 of the main case 1.

In this embodiment, a first accommodation recess 102 for accommodating the accommodation compartment 20 is provided at an end of the main case 1. A recess wall of the first accommodation recess 102 is connected to the top plate 1012 and the side plate 1011. In this embodiment, the recess wall of the first accommodation recess 102 is one of the chamber outer walls 101 of the main case 1, and the side plate 1011, the top plate 1012 and the bottom plate 1013 of the main case 1 are the other one of the chamber outer walls 101 of the main case 1, such that the at least two chamber outer walls 101 of the main case 1 can enclose the accommodation chamber 103 for accommodating various functional modules. Arc-shaped and rounded transition corners 104 are provided around the chamber outer walls 101 of the main case 1 in order that the problem of damages to the monitor 100 due to collision during use is avoided and the monitor 100 can have a better visual effect.

The accommodation compartment 20 include a compartment inner wall corresponding to the compartment outer wall 201. The compartment inner wall is provided with several connection interfaces connected to the host part 10, where the connection interfaces include a wireless interface and/or a wired interface, such that the loading efficiency of the medical article 30 is improved, the influences of external environment on the connection may be prevented, contaminations to the connection interfaces caused by dust or debris may also be prevented and the overall appearance of the monitor 100 is further improved.

In some embodiments, the accommodation compartment 20 may be arranged independently of the accommodation chamber 103. The monitor 100 in those embodiments includes at least two accommodation structures, where one is used for housing core elements of the host, for example the parameter processing board, the main control board and the first interface communication board, etc., and the other one is used for accommodating the medical article. The configuration of independent accommodation compartment 20 and accommodation chamber 103 is convenient for use, storage and cleaning by nurses.

In this embodiment, the accommodation compartment 20 is a semi-open chamber structure. For example, as shown in FIG. 2, the accommodation compartment 20 include a compartment body 21 and the compartment door 22. The compartment body 21 is configured to have an accommodation space for accommodating the medical article 30, and the compartment door 22 is movably disposed on the compartment body 21 and may cover or open the opening 203 of the accommodation compartment 20. When the compartment door 22 is opened, the medical article 30 may enter and exit the accommodation space of the compartment body 21. When the compartment door 22 covers on the compartment body 21, the compartment door 22 is flush with the side plate 1011 of the main case 1 and can prevent dust from entering the accommodation compartment 20, where the entered dust may result in inconvenient cleaning.

The compartment body 21 include a bottom plate and a top plate 212 that are opposite to each other. The compartment door 22, when covering the opening 203 and locating between the bottom plate and the top plate 212 of the compartment body 21, forms a side plate of the compartment body 21, and abuts against and is flush with the side plate 1011 of the main case 1. When the compartment door 22 is opened, the opening 203 is exposed toward the side plate 1011. The "flush" herein may also be understood to be in the same plane at a connection position.

The outer surface of the side plate 1011 of the main case 1 forms one of the chamber outer walls 101 of the main case 1, and the outer surface of the top plate 1012 of the main case 1 forms the other one of the chamber outer walls 101 of the main case 1. The outer surface of the compartment door 22 forms one compartment outer wall 201 of the accommodation compartment 20, and the outer surface of the top plate 212 of the accommodation compartment 20 forms another compartment outer wall 201 of the accommodation compartment 20. When the compartment door 22 of the accommodation compartment 20 covers the opening 203, the compartment outer wall 201 formed by the outer surface of the compartment door 22 is flush with the chamber outer wall 101 formed by the outer surface of the side plate 1011 of the main case 1, and the compartment outer wall 201 formed by the outer surface of the top plate 212 of the accommodation compartment 20 is flush with the chamber outer wall 101 formed by the outer surface of the top plate 1012 of the main case 1.

The accommodation compartment 20 has at least one compartment inner wall adjacent to the opening 203, and one of the compartment inner walls of the accommodation compartment 20 is provided with several guiding structures for guiding the medical article 30 to be inserted into the accommodation compartment 20 through the opening 203. Particularly, an inner surface of the bottom plate of the compartment body 21 is provided with several guiding structures for guiding the medical article 30 to be properly inserted into the accommodation compartment 20 through the opening 203. Alternatively, the guiding structures may be, but are not limited to, sliding slots, rails or guiding blocks.

Particularly, the compartment door 22 is disposed on the top plate 212 of the compartment body 21 and is movably connected to an end of the top plate 212 that is away from the top plate 1012 of the main case 1. Alternatively, the compartment door 22 is rotatably connected to the top plate 212 of the compartment body 21 by means of a hinge or a rotatable arm. The compartment door 22 is provided with a catch 221. When the compartment door 22 of the accommodation compartment 20 covers the opening 203 of the accommodation compartment 20, the compartment door 22 is locked to the side plate 1011 of the main case 1 by means of the catch 221. The catch 221 may be, but is not limited to, a fastener, a locking bolt or a toggle button. The compartment door 22 is provided with a rounded transition corner 222 corresponding to the rounded transition corner 104 of the main case 1 at an end close to the top plate 212 of the compartment body 21, such that when the compartment door 22 covers on the compartment body 21, the assembly of the accommodation compartment 20 and the main case 1 may be considered as an integral design, that is, the accommodation compartment 20 is disposed in a hidden manner relative to the main case 1, such that the space occupied by the accommodation compartment 20 is reduced and the monitor 100 is more aesthetic.

The above-mentioned monitor 100 further include a second interface communication board, and a first connection interface correspondingly electrically connected to the second interface communication board is provided on one of the compartment inner walls of the accommodation compartment 20. For example, the first connection interface is disposed on the compartment inner wall adjacent to the accommodation chamber 103 in the accommodation compartment 20. This first connection interface is connected to a communication interface of the medical article 30.

Referring to FIGS. 3-7, in an embodiment, the medical article 30 includes one of the storage box 301 for the medical article, the physiological parameter monitoring accessory, the function extension module 302 and an adapter part 303 for the third-party device that are connected to the monitor 100. The adapter part 303 for the third-party device may also be other medical accessories such as a cable.

In one embodiment, as shown in FIG. 3, the medical article 30 is the storage box 301 for the medical article.

The storage box 301 for the medical article includes a mounting portion 32 that can be inserted into the accommodation compartment 20, and an accommodation portion 33 fixed on the mounting portion 32, where the accommodation portion 33 is a chamber structure that can house an article.

In addition, the storage box 301 for the medical article further include a communication connection portion 31 that is disposed on the mounting portion 32. When the mounting portion 32 is inserted into the accommodation compartment 20, the communication connection portion 31 may be electrically connected to the first connection interface disposed inside the accommodation compartment 20. The first connection interface includes a wireless interface and/or a wired interface, such that a corresponding functional module in the host part 10 may be connected via the first connection interface for communications.

Still further, the communication connection portion 31 may include a first communication interface 311 that is disposed on a side or an end of the mounting portion 32 and is electrically connectable to the first connection interface. Alternatively, the communication connection portion 31 may further comprise a second communication interface 312. The second communication interface 312 includes a wireless interface and/or a wired interface, and the second communication interface 312 is disposed on an outer surface of the mounting portion 32. In another example, the second communication interface 312 may be disposed on the mounting portion 32 at a position for gripping.

As shown in FIG. 3, the mounting portion 32 may further extend, along the plane where a side face of the communication connection portion 31 is located, from one end of the communication connection portion 31 and can be connected to the accommodation portion 33. The communication connection portion 31 is arranged parallel to the accommodation portion 33, and a gap 34 for inserting the storage box 301 for the medical article into the monitor 100 is formed between the mounting portion 32 and accommodation portion 33. As shown in FIG. 3, specifically, the mounting portion 32 extends from one end of the communication connection portion 31, extends along the side face of the communication connection portion 31 by a preset distance and is then connected to the accommodation portion 33. A side of the mounting portion 32 facing away from the communication connection portion 31 is provided with the second communication interface 312. For example, the second communication interface 312 is a wireless communication module. The accommodation portion 32 may also extend from an end of the mounting portion 32 that is not connected to the communication connection portion 31, and is formed integrally with the mounting portion 32.

It may be understood that the communication module may be a wireless communication module or a wired communication module. The wireless communication module may be, but is not limited to, a NFC wireless pairing communication module, so as to achieve wireless transmission of data.

In this embodiment, as shown in FIGS. 4-5, the communication connection portion 31, the mounting portion 32 and the accommodation portion 33 jointly enclose the gap 34 for accommodating the top plate 212 and the compartment door 22 of the accommodation compartment 20. Particularly, the communication connection portion 31 includes an upper surface 3111, the mounting portion 32 includes a side face 321 close to the communication connection portion 31, the accommodation portion 33 includes an upper surface 3311 and a lower surface 3312 that are opposite relative to each other, and the lower surface 3312 is opposite the upper surface 3111 of the communication connection portion 31. The upper surface 3111 of the communication connection portion 31, the side face 321 of the mounting portion 32 and the lower surface 3312 of the accommodation portion 33 jointly enclose the gap 34. It may be understood that the width of the gap 34 is slightly greater than the thickness of the top plate 212 of the accommodation compartment 20 plus the thickness of the compartment door 22 so as to insert the storage box 301 for the medical article into the accommodation compartment 20. When the medical article 301 is inserted into the accommodation compartment 20, the lower surface 3312 of the accommodation portion 33 abuts against the chamber outer wall 101 of the top plate 1012 of the main case 1.

The accommodation portion 33 includes an accommodation body 331 and a cover plate 332 rotatably connected to the accommodation body 331. The accommodation body 331 is provided with an opening 333 facing away from the upper surface 3311 of the accommodation portion 33, and the cover plate 332 covers the opening 333 so as to prevent dust from entering the accommodation body 331, where the dust may result in inconvenient cleaning. Alternatively, the cover plate 332 is rotatably connected to the accommodation body 331 by means of a hinge or a rotatable arm. The accommodation body 331 is also provided with an accommodation recess 334 in communication with the opening 333. It may be understood that the accommodation recess 334 of the accommodation portion 33 can accommodate other medical devices such as the function extension module 302 and the adapter part 302 for the third-party device.

The accommodation body 331 includes an exposed outer wall 3313 and an inner wall 3314 opposite the outer wall 3313. Arc-shaped and rounded transition corners 3315 are provided around the outer wall 3313 of the accommodation body 331 in order that the problem of damages to the accommodation body 331 due to collision during assembly is avoided and the monitor 100 can have a better visual effect. The inner wall 3314 of the accommodation body 331 is provided with several connection interfaces 3316 connected to the monitor 100, where the connection interfaces 3316 include a wireless interface and/or a wired interface, such that the loading efficiency of the functional module is improved, the influences of external environment on the connection may be prevented, contaminations to the connection interface caused by dust or debris interfaces may also be prevented and the overall appearance of the monitor 100 is further improved.

In a further embodiment, as shown in FIG. 6, the medical article 30 is the function extension module 302. It may be understood that the function extension module 302 is a separated module that can implement a certain function. The function extension module 302 may be, but is not limited to, a functional module having a certain function, such as a carbon dioxide measurement module, a blood pressure measurement module, an ECG measurement module, a recorder or a power module. The function extension module 302 includes a connection interface 3021 for connection to the monitor 100. The connection interface 3021 may be a wireless interface and/or a wired interface, and the host part 10 includes a function extension interface connected to the connection interface 3021 of the function extension module 302. The function extension interface of the host part 10 may also be a wireless interface and/or a wired interface. Once the function extension module 302 is mounted to the accommodation compartment 20 of the monitor 100, the function extension module 302 is connected to the monitor 100 in a wireless and/or wired manner so as to extend the functions of the monitor 100.

In other embodiments, as shown in FIG. 7, the medical article 30 may also be the adapter part 303 for the third-party device. The third-party device may be other medical devices such as an anesthesia machine and a ventilator, a data processing device or module such as a computer module, or a data printing device or module. The adapter part 303 includes a connection interface 3031 for connection to the monitor 100, and the connection interface 3031 may be a wireless interface and/or a wired interface. The monitor 100 includes a function extension interface connected to the connection interface 3031 of the adapter part 303, and the function extension interface may also be a wireless interface and/or a wired interface. Once the adapter part 303 is mounted to the accommodation compartment 20 of the monitor 100, the monitor 100 is connected to the third-party device in a wireless and/or wired manner so as to add multiple functions to the monitor 100.

Figure 8:
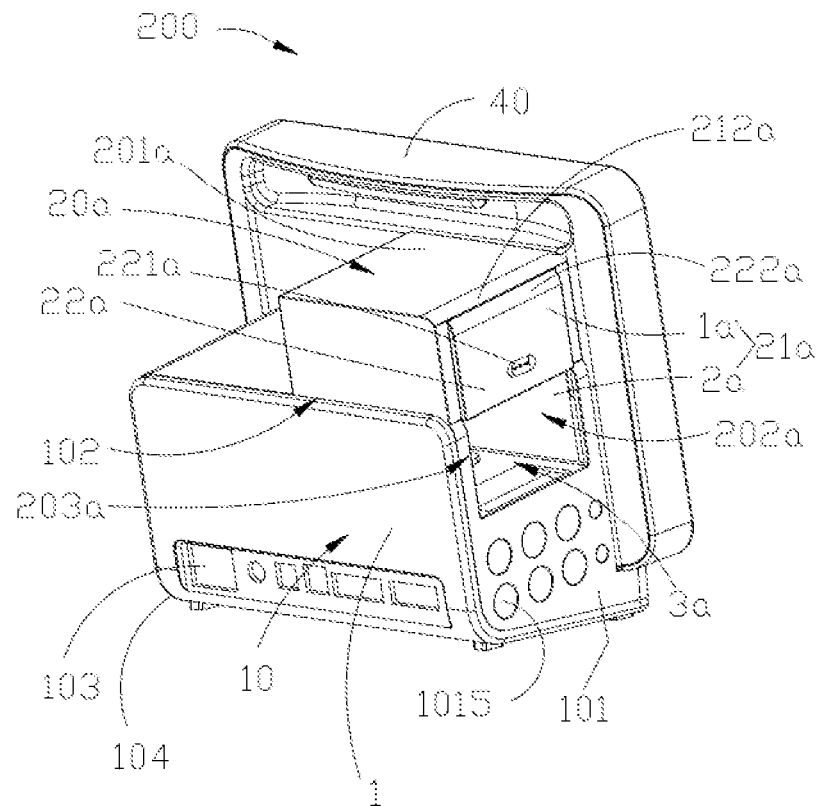
FIG. 8 is a schematic structural diagram of a patient monitor provided according to a second embodiment of this disclosure.
Figure 9:
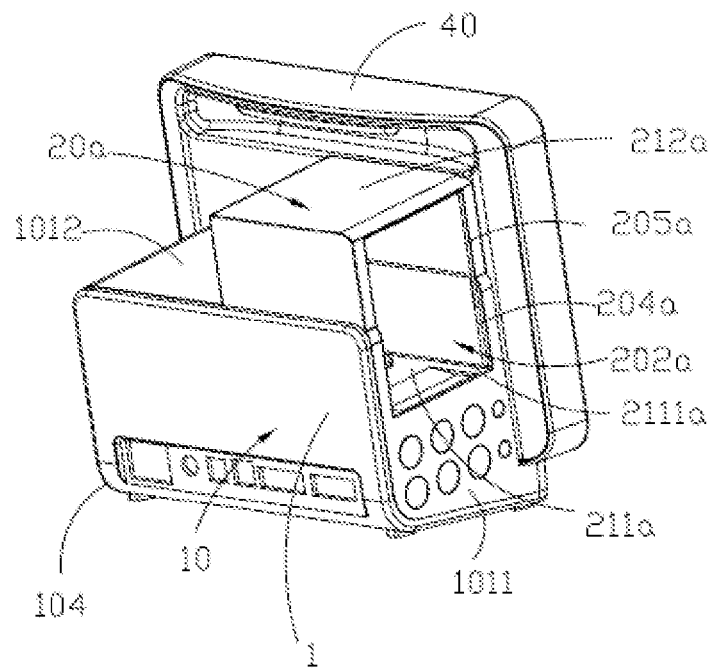
FIG. 9 is a view of an operating state of the monitor of FIG. 8.
Figure 10:
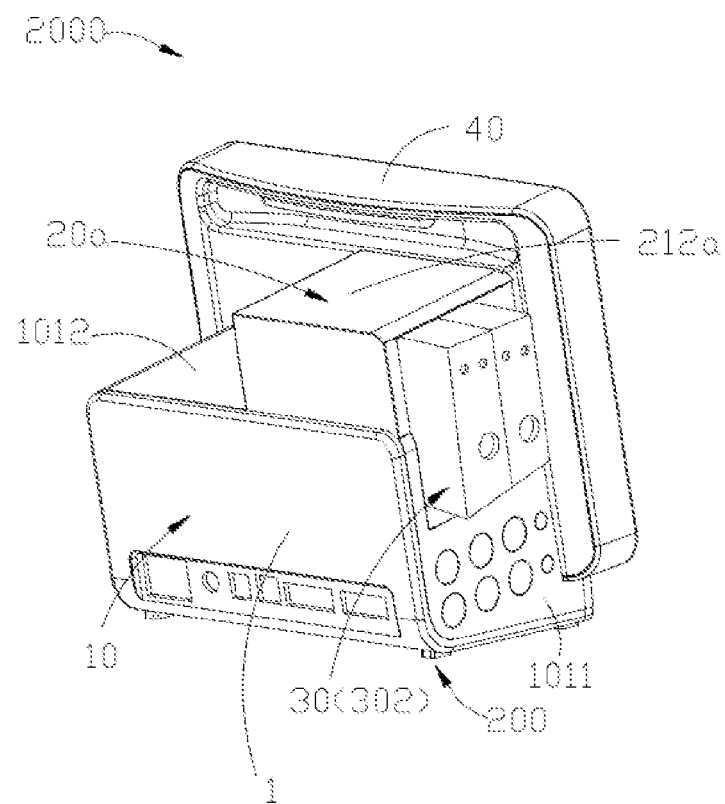
FIG. 10 is a schematic structural diagram of a medical device provided according to the second embodiment of this disclosure.

Referring to FIGS. 8-10, FIGS. 8 and 9 show a monitor 200 provided according to a second embodiment of this disclosure, and FIG. 10 shows a medical device 2000 provided according to the second embodiment of this disclosure. The medical device 2000 includes the monitor 200. In this embodiment, the monitor 200 has a similar structure to the structure of the monitor 100 of the first embodiment, except that an accommodation compartment 20a of the monitor 200 of the second embodiment is movably disposed on the main case 1.

In this embodiment, referring to FIG. 8, the accommodation compartment 20a includes a compartment body 21a and a compartment door 22a rotatably connected to the compartment body 21a. The compartment body 21a includes a fixed compartment body 1a and a movable compartment body 2a that is connected slidably relative to the fixed compartment body 1a, and the fixed compartment body 1a and the movable compartment body 2a jointly enclose an accommodation space 3a for accommodating the medical article 30. In this embodiment, the fixed compartment body 1a is fixedly accommodated inside a first accommodation recess 102 of the main case 1, the movable compartment body 2a is slidably accommodated inside the first accommodation recess 102 of the main case 1, and the fixed compartment body 1a may sleeve the movable compartment body 2a. The compartment door 22a is movably disposed on the movable compartment body 2a. The recess wall of the first accommodation recess 102 may be part of the fixed compartment body 1a. In some variant embodiments, the compartment door 22a may not be provided.

The movable compartment body 2a includes at least one exposed compartment outer wall 201a connected to the chamber outer wall 101 of the main case 1, and the fixed compartment body 1a includes a compartment inner wall 202a corresponding to the at least one compartment outer wall 201a. The accommodation compartment 20a is provided with an opening 203a for inserting the medical article 30, and the opening 203a passes through one end of the fixed compartment body 1a and the movable compartment body 2a to enlarge the insertion opening of the accommodation space 3a. When the medical article 30 is not inserted in the opening 203a of the accommodation compartment 20a, the fixed compartment body 1a sleeves the movable compartment body 2a, the compartment outer wall 201a of the movable compartment body 2a that is connected to the chamber outer wall 101 of the main case 1 is flush with the chamber outer wall 101 of the main case 1, and the compartment door 22a abuts against and is flush with the side plate 1011 of the main case 1. At this point, the compartment door 22a may cover the opening 203a of the fixed compartment body 1a and the movable compartment body 2a such that dust may be prevented from entering the accommodation compartment 20 to avoid the problem of inconvenient cleaning.

The compartment inner wall 202a of the fixed compartment body 1a is provided with several connection interfaces for connection to the monitor 200, and the connection interfaces include a wireless interface and/or a wired interface.

Referring to FIG. 9, the fixed compartment body 1*a* includes a bottom plate 211*a*, and the movable compartment body 2*a* includes a top plate 212*a* opposite the bottom plate 211*a*. When the compartment door 22*a* covers the opening 203*a*, the compartment door 22*a* is positioned between the bottom plate 211*a* and the top plate 212*a* of the compartment body 21*a* to form a side plate of the compartment body 21*a*, and is connected to and flush with the side plate 1011 of the main case 1. When the compartment door 22*a* is opened, the opening 203*a* is exposed toward the side plate 1011 of the main case 1.

Alternatively, the inner surface of the bottom plate 211*a* of the fixed compartment body 1*a* is provided with several guiding structures 2111*a* for guiding the medical article 30 to be inserted into the accommodation compartment 20*a*, such that the medical article 30 is guided to be properly inserted into the accommodation compartment 20*a* through the opening 203*a* of the accommodation compartment 20*a*. Alternatively, the guiding structures 2111*a* may be, but are not limited to, sliding slots, rails or guiding blocks.

Referring to FIGS. 8 and 9, in this embodiment, the outer surface of the compartment door 22*a* forms one compartment outer wall 201*a* of the accommodation compartment 20*a*, and the outer surface of the top plate 212*a* of the accommodation compartment 20*a* forms another compartment outer wall 201*a* of the accommodation compartment 20*a*. When the compartment door 22*a* of the accommodation compartment 20*a* covers the opening 203*a*, the compartment outer wall 201*a* formed by the outer surface of the compartment door 22*a* is flush with the chamber outer wall 101 formed by the outer surface of the side plate 1011 of the main case 1, and the compartment outer wall 201*a* formed by the outer surface of the top plate 212*a* of the accommodation compartment 20*a* is flush with the chamber outer wall 101 formed by the outer surface of the top plate 1012 of the main case 1, such that the device main body 10 has a complete outer wall, which further improves the aesthetics of the monitor 200 and reduces the space occupied by the accommodation compartment 20*a*.

The compartment door 22*a* is disposed on the top plate 212*a* of the movable compartment body 2*a* and is movably connected to an end of the top plate 212 that is connected to the top plate 1012 of the main case 1. The compartment door 22*a* may be rotated in the direction of the accommodation space 3*a* to be superimposed on the top plate 212*a*. Alternatively, the compartment door 22*a* is rotatably connected to the movable compartment body 2*a* by means of a hinge or a rotatable arm. Further, the superimposition of the compartment door 22*a* and the top plate 212*a* may be implemented by designing the compartment door 22*a* and the top plate 212*a* to have a magnet or a material that may be attracted by the magnet or by means of a fastening structure so as to enlarge the insertion opening of the accommodation space 3*a* of the accommodation compartment 20*a*, which further facilitates the insertion of the medical article 30.

The compartment door 22*a* is provided with a catch 221*a*, and the compartment door 22*a* of the accommodation compartment 20*a* is locked to the side plate 1011 of the main case 1 by means of the catch 221*a*. The compartment door 22*a* is provided with a rounded transition corner 222*a* corresponding to the rounded transition corner 104 of the main case 1 at an end close to the top plate 212*a* of the movable compartment body 2*a*, such that when the compartment door 22*a* covers the opening 203*a* of the fixed compartment body 1*a* and the movable compartment body 2*a*, the assembly of the accommodation compartment 20*a* and the main case 1 may be considered as an integral design, that is, the accommodation compartment 20*a* is disposed in a hidden manner relative to the main case 1, such that the space occupied by the accommodation compartment 20*a* is reduced.

Referring to FIG. 9, two opposite sliding slots 204*a* are arranged in the compartment inner wall 202*a* of the fixed compartment body 1*a* at positions close to the opening 203*a*, and two rails 205*a* corresponding to the two sliding slots 204*a* of the fixed compartment body 2*a* are respectively arranged on two sides of the compartment door 22*a* in the movable compartment body 2*a*, such that the movable compartment body 2*a* can slide vertically relative to the fixed compartment body 1*a*.

Alternatively, the compartment body 21*a* further comprises a lifting support apparatus for supporting the movable compartment body 2*a*. In an embodiment, the fixed compartment body 2*a* may be driven to go up and down by a driving electric motor. In a further embodiment, the lifting of the fixed compartment body 2*a* may be adjusted manually.

In this embodiment, the movable connection portion is the sliding slot 204*a*, the rail 205*a* or the lifting support apparatus in order to enable the accommodation compartment 20*a* to be movably connected to the main case 1 to be movable relative to the main case 1, such that the accommodation compartment 20*a* has a variable accommodation space for accommodating the medical article 30. Referring to FIGS. 8-10, in this embodiment, before the medical article 30 is inserted into the accommodation compartment 20*a*, both the fixed compartment body 1*a* and the movable compartment body 2*a* are accommodated inside the first accommodation recess 102 of the main case 1, the compartment door 22*a* covers the opening 203*a* of the fixed compartment body 1*a* and the movable compartment body 2*a*, and the compartment outer wall 201*a* of the movable compartment body 2*a* is flush with the chamber outer wall 101 of the main case 1 so as to enable the accommodation compartment 20*a* to be disposed in a hidden manner relative to the main case 1, which further reduces the space occupied by the accommodation compartment 20*a*. If the medical article 30 needs to be inserted into the accommodation compartment 20*a*, the movable compartment body 2*a* is first lifted to a preset height, and then the compartment door 22*a* is rotated in the direction of the accommodation space 3*a* and is superposed on the top plate 212*a* of the movable compartment body 2*a*. Finally, the medical article 30 is inserted so as to enable the monitor 100 to perform a variety of tasks.

In this embodiment, the medical article 30 is the function extension module 30 of FIG. 10. It may be understood that the other medical articles 30 in the first embodiment are also suitable for the second embodiment.

Figure 12:
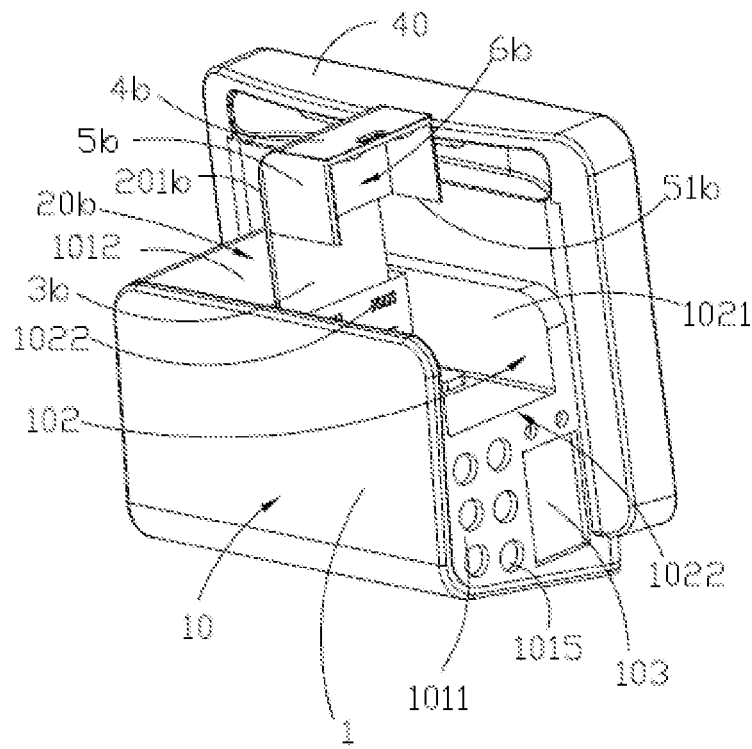
FIG. 12 is a view of an operating state of the monitor of FIG. 11.
Figure 13:
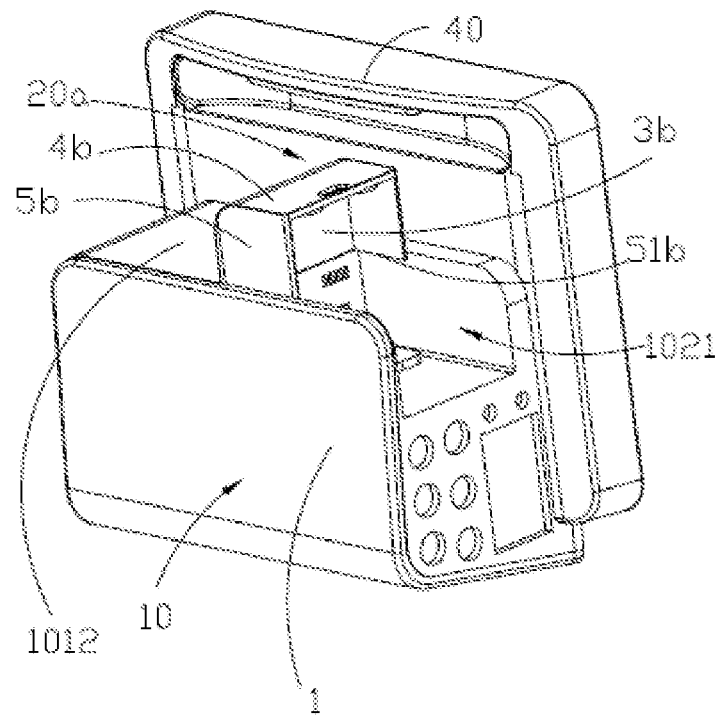
FIG. 13 is a view of another operating state of the monitor of FIG. 11.
Figure 14:
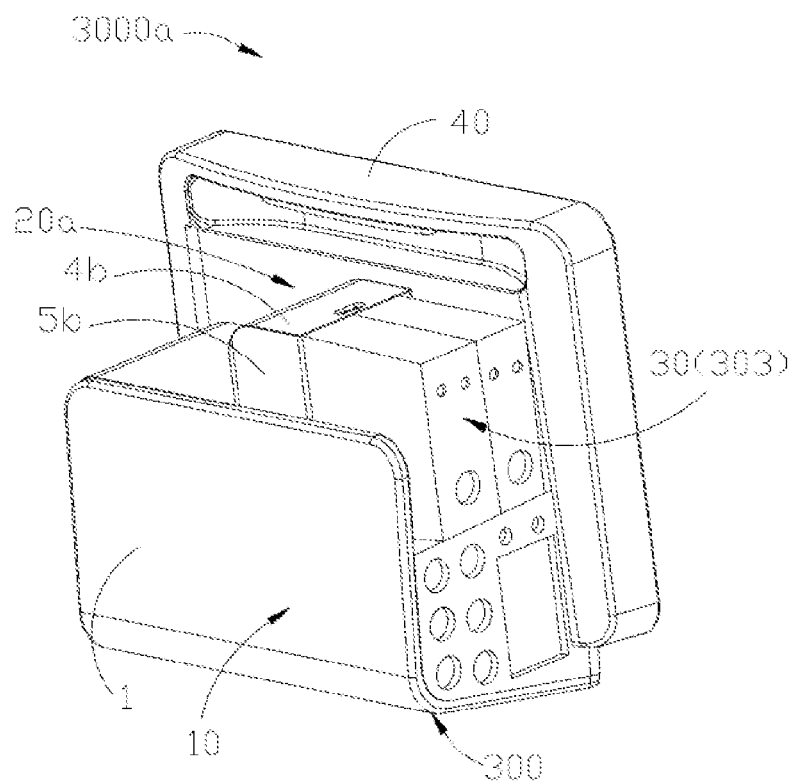
FIG. 14 is a schematic structural diagram of a medical device provided according to a third embodiment of this disclosure.
Figure 15:
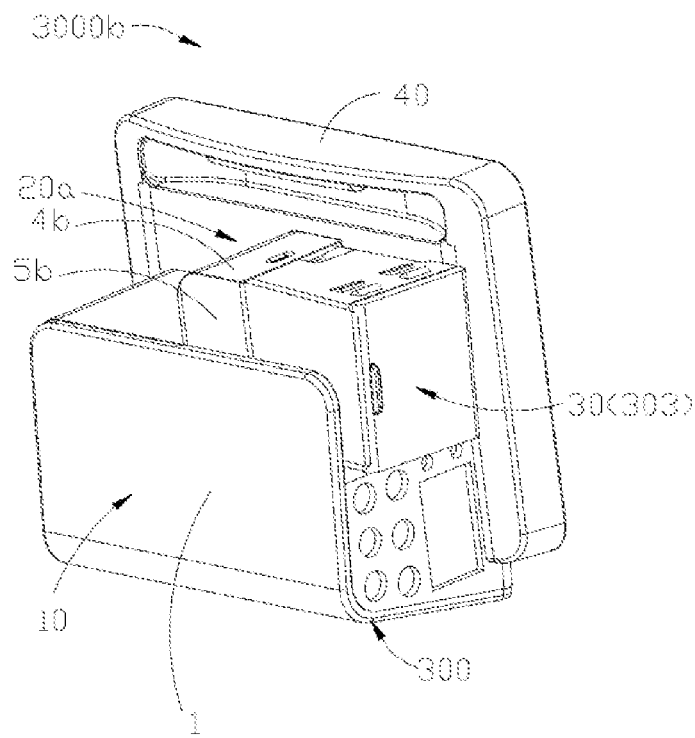
FIG. 15 is a further schematic structural diagram of a medical device provided according to a third embodiment of this disclosure.

Referring to FIGS. 11-15, FIGS. 11-13 show a monitor 300 provided according to a third embodiment of this disclosure, and FIGS. 14 and 15 show medical devices 3000*a*, 3000*b* provided according to the third embodiment of this disclosure, where the medical devices are respectively combined with different medical articles 30. In this embodiment, the monitor 300 has a similar structure to the structure of the monitor 100 of the first embodiment, except that a compartment door 22*b* of the monitor 300 in the third embodiment is movably disposed on the main case 1 and covers the first accommodation recess 102 of the main case 1 to form an accommodation compartment 20*b*.

The first accommodation recess 102 includes a recess wall 1021 connected to the top plate 1012 and the side plate 1011 of the main case 1. In this embodiment, the recess wall 1021 of the main case 1 is the compartment body 21*b* of the accommodation compartment 20*b*. The recess wall 1021 of the first accommodation recess 102 is provided with several connection interfaces 1022 for connection to the monitor 200, and the connection interfaces include a wireless interface and/or a wired interface.

An opening 1022 for inserting the medical article is provided in the recess wall 1021 at one end of the main case 1. The accommodation compartment 20*b* includes an exposed compartment outer wall 201*b* connected to at least one of the chamber outer walls 101 of the main case 1. The compartment outer wall 201*b* is the outer surface of the compartment door 22*b*. When the medical article 30 is not inserted in the opening 1022 of the accommodation compartment 20*b*, the compartment outer wall 201*b* of the accommodation compartment 20*b* is flush with at least one of the chamber outer walls 101 of the main case 1.

Figure 11:
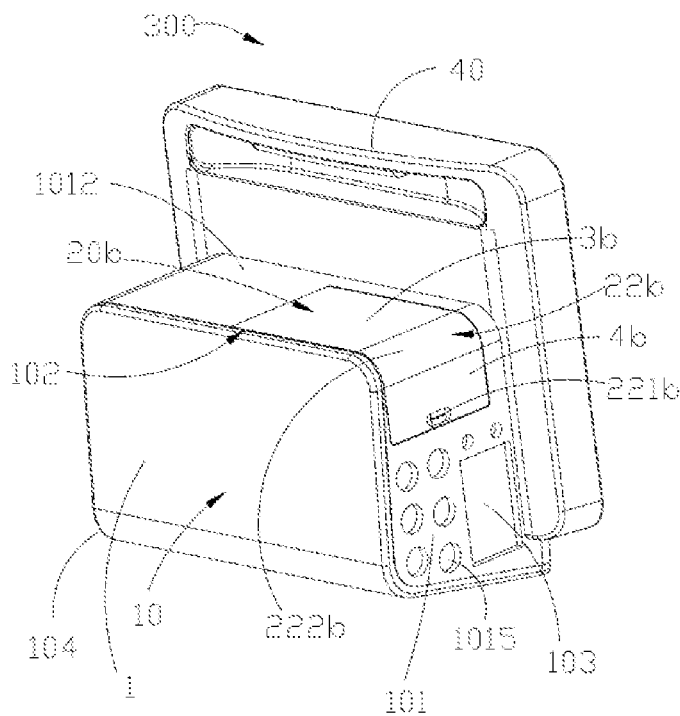
FIG. 11 is a schematic structural diagram of a patient monitor provided according to a third embodiment of this disclosure.

Referring to FIGS. 11 and 12, the compartment door 22*b* includes a movable plate 3*b*, a support plate 4*b* extending downward vertically from one end of the movable plate 3*b*, and two opposite retaining plates 5*b* extending vertically from two ends of the support plate 4*b*, The movable plate 3*b*, the support plate 4*b*, the two retaining plates 5*b* and the recess wall 1021 jointly enclose an accommodation space 6*b* for accommodating the medical article.

The outer surface of the movable plate 3*b* forms one compartment outer wall 201*b* of the accommodation compartment 20*b*, and the outer surface of the support plate 4*b* of the accommodation compartment 20*b* forms another compartment outer wall 201*b* of the accommodation compartment 20*b*. When the compartment door 22*b* of the accommodation compartment 20*b* covers the opening 1022, the compartment outer wall 201*b* formed by the outer surface of the support plate 4*b* of the accommodation compartment 20*b* is flush with the chamber outer wall 101 formed by the outer surface of the side plate 1011 of the main case 1, and the compartment outer wall 201*b* formed by the outer surface of the movable plate 3*b* of the accommodation compartment 20*b* is flush with the chamber outer wall 101 formed by the outer surface of the top plate 1012 of the main case 1, such that the device main body 10 has a complete outer wall formed, which further improves the aesthetics of the monitor 300 and reduces the space occupied by the accommodation compartment 20*b*.

It may be understood that the height of the support plate 4*b* and the retaining plates 5*b* is equal to the height of the recess wall 1021 of the accommodation recess 102, such that the compartment door 22*b* may completely cover the accommodation recess, which can further prevent dust or debris from entering the monitor 300 to avoid cleaning influence. The length of each of the retaining plates 5*b* may be set according to actual conditions so as to be adapted for use of medical articles 30 having different specifications.

In an embodiment, the compartment door 22*b* is removably connected to the main case 1 to enable the user to change the compartment door 22*b* having a different dimension for being correspondingly adapted for the medical article 30 having a different dimension (see FIG. 14). In a further embodiment, the retaining plates 5*b* are removably or fixedly connected to the movable plate 3*b* and the support plate 4*b*. Preferably, the retaining plates 5*b* are removably connected to the movable plate 3*b* and the support plate 4*b* to also enable the user to change the retaining plates 5*b* having a different dimension for being correspondingly adapted for the medical article 30 having a different dimension.

Referring to FIGS. 12 and 13, in an embodiment, a movable connection structure may be a sliding slot. For example, the main case 1 is provided with a sliding slot for lifting of the movable plate 3*b* at a position close to the first accommodation recess 102. Each of the retaining plates 5*b* includes a stop surface 51*b* at an end thereof away from the support plate 4*b*. The stop surface 51*b* abuts against the top plate 1012 of the main case 1 or a bottom of the first accommodation recess 102. Particularly, when the compartment door 22*b* is rotated from an orientation away from the accommodation space 6*b* until the movable plate 3*b* is perpendicular to the top plate 1012 of the main case 1, the movable plate 3*b* may move downward along the sliding slot under the action of gravity or an external force. It can be understood that when the stop surface 51*b* of the retaining plate 5*b* abuts against the top plate 1012 of the main case 1, the movable plate 3*b* will not move downward any more along the sliding slot. The stop surface 51*b* of the retaining plate 51 abuts against the bottom of the first accommodation recess 102 when the compartment door 22*b* covers the opening 1022 of the accommodation compartment 20*b*.

It can be understood that in a further embodiment, the movable plate 5*b* of the compartment door 22*b* is movably connected to the main case 1 and the height of the position of the movable plate 5*b* relative to the main case 1 is adjustable. Particularly, several elastic pieces may be arranged on two sides of the movable plate 5*b*, and several grooves mating with the elastic pieces are provided at different heights in the main case 1 so as to allow the movable plate 5*b* to be retained at different heights, which thus serves for inserting the medical articles 30 having different sizes. Alternatively, the main case 1 is also provided with several elastic pieces at different heights, and several grooves mating with the several elastic pieces are provided on two sides of the movable plate 5*b*.

In this embodiment, the movable connection portion is the compartment door 22*b*, such that the accommodation compartment 20*b* is movably connected to the main case 1 to be movable relative to the main case 1, thereby allowing the accommodation compartment 20*b* to have a variable accommodation space for accommodating the medical article 30.

Referring to FIGS. 12-15, in this embodiment, when the medical article 30 is not inserted in the accommodation compartment 20*b*, the movable plate 3*b* of the compartment door 22*b* is flush with the top plate 1012 of the host part 10, and the support plate 4*b* is flush with the side plate 1011 of the host part 10, such that accommodation compartment 20*b* is disposed in a hidden manner relative to the main case 1, which further reduces the space occupied by the accommodation compartment 20*b*. If the medical article 30 needs to be inserted into the accommodation compartment 20*b*, the movable compartment door 22*b* is first rotated from an orientation away from the main case 1 until the movable plate 3*b* of the compartment door 22*b* is perpendicular to the top plate 1012 of the main case 1. Then, the movable plate 3*b* may move along the sliding slot under the action of gravity or an external force. When the stop surface 51*b* of the retaining plate 5*b* abuts against the top plate 1012 of the main case 1, the movable plate 3*b* will not move downward any more along the sliding slots, and the compartment door 22*b* may not be rotated with respect to the main case 1 at this position, such that the medical article 30 can be positioned properly. In addition, since the height of the compartment door 22*b* is adjustable, it further enables the monitor 100 to be used in combination with a function extension module or other monitors, which further allows the medical device to perform a variety of tasks. When the medical article 30 is inserted into the accommodation compartment 20*b*, the inner surface of the support plate 4*b* abuts against the medical article to position the medical article 30 in a preset position inside the accommodation compartment 20b of the monitor 100.

It may be understood that in an embodiment, the medical article 30 is the function extension module 302 (as shown in FIG. 14). In a further embodiment, the medical article 30 is the adapter part 303 for the third-party device of the first embodiment. The adapter part 303 may be other medical accessories such as a cable.

It may be understood that a catch 221b as in the first embodiment is provided on the support plate 4b of the compartment door 22b and will not be described here again. The retaining plates 3b and the support plate 4b have a smooth transition therebetween which forms a rounded transition corner 222b to prevent the monitor 300 from damage caused by collision during use and make the monitor have a good visual effect. The rounded transition corner 22b mates with the rounded transition corner 104 of the main case 1, such that the assembly of the main case 1 and the accommodation compartment 20b may be considered as an integral design, the space occupied by the accommodation compartment 20b is reduced and the overall visual effect of the monitor 300 is further improved.

Figure 16:
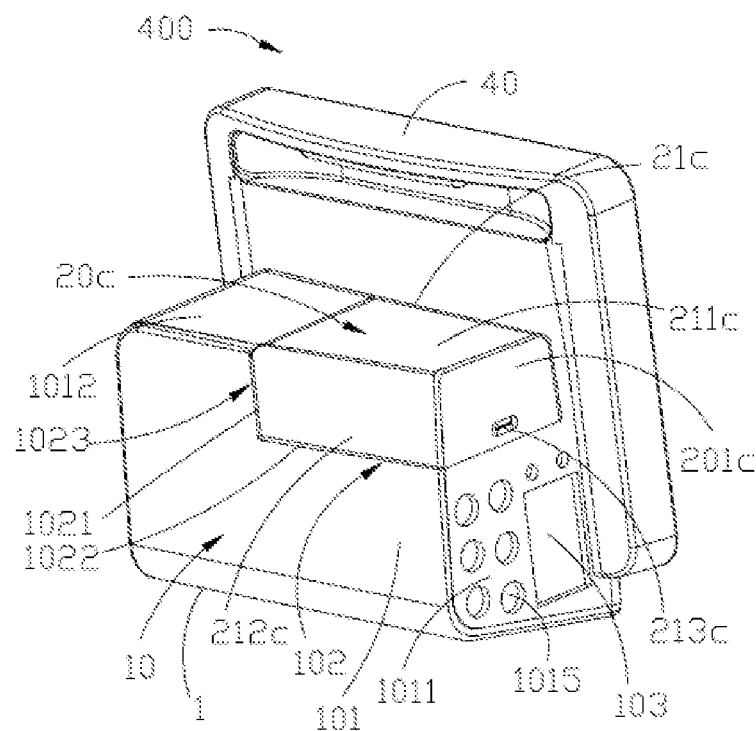
FIG. 16 is a schematic structural diagram of the monitor provided according to a fourth embodiment of this disclosure.
Figure 17:
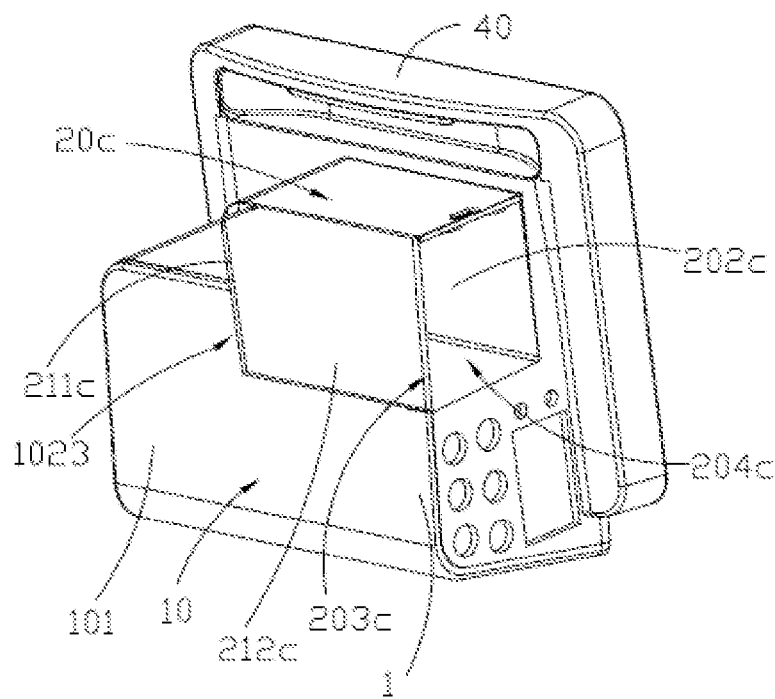
FIG. 17 is a view of an operating state of the monitor of FIG. 16.

Referring to FIGS. 16 and 17, a medical device 400 provided according to a fourth embodiment of this disclosure is shown. In this embodiment, the medical device 400 has a similar structure to the structure of the medical device 100 of the first embodiment, except that an accommodation compartment 20c of the medical device 400 in the fourth embodiment is removably disposed on the main case 1.

The main case 1 is provided with the first accommodation recess 102 for accommodating the accommodation compartment 20c. The accommodation recess 102 includes a recess wall 1021 connected to the top plate 1012 of the main case 1 and a recess bottom 1022 connected to the recess wall 1021 and the side plate 1011 of the main case 1. The recess bottom 1022, the recess wall 1021 and the top plate 1012 of the main case 1 form a step surface 1023. The accommodation compartment 20c is disposed on the step surface 1023 and is located on the recess bottom 1021 of the main case 1.

The accommodation compartment 20c includes an exposed compartment outer wall 201c and a compartment inner wall 202c corresponding to the outer wall. The compartment inner wall 202c of the accommodation compartment 20c is provided with several connection interfaces for connection to the medical device 400, where the connection interfaces include a wireless interface and/or a wired interface. The accommodation compartment 20c includes a compartment body 21c. An opening 203c for inserting the medical article is provided on one side of the compartment body 21c. The compartment body 21c includes a top plate 211c opposite the opening 203c and a side plate 212c extending downward vertically from an edge of the top plate 211c. The top plate 211c and the side plate 212c of the compartment body 21c jointly enclose an accommodation space 204c for accommodating the medical article.

In this embodiment, the shape and the area of the recess bottom 1022 of the main case 1 are both identical to those of the opening 203c of the accommodation compartment 20c, and the height of the side plate 212c of the accommodation compartment 20c is equal to the height of the recess wall 1021 of the accommodation recess 102, such that when the medical article is not inserted in the accommodation compartment 20c, the compartment outer wall 201c of the accommodation compartment 20 is connected to the chamber outer wall 101 of the accommodation chamber 103.

In this embodiment, the movable connection portion is the accommodation compartment 20c having a magnetic attraction structure or a sliding guide structure to enable the accommodation compartment 20c to be movably connected to the main case 1, such that the accommodation compartment is movable relative to the main case 1 and the accommodation compartment 20c has a variable accommodation space for accommodating the medical article 30.

It may be understood that in an embodiment, when the medical article is not inserted in the accommodation compartment 20c, the chamber outer wall 101 of the main case 1 is flush with the compartment outer wall 201c of the accommodation compartment 20c. Particularly, in this embodiment, the outer surface of the top plate 211c of the accommodation compartment 20c forms one compartment outer wall 201c of the accommodation compartment 20c, and the outer surface of the side plate 212c of the accommodation compartment 20c forms another compartment outer wall 201c of the accommodation compartment 20c. When the accommodation compartment 20c abuts against the recess bottom 1022 of the main case 1 at the end with the opening 203, the compartment outer wall 201c formed by the outer surface of the top plate 211c of the accommodation compartment 20c is flush with the chamber outer wall 101 formed by the outer surface of the top plate 1012 of the main case 1, and the compartment outer wall 201 formed by the outer surface of the side plate 212c of the accommodation compartment 20c forms is flush with the chamber outer wall 101 formed by the outer surface of the side plate 1011 of the main case 1, such that the host part 10 has a complete outer wall, which further improves the aesthetics of the medical device 400 and reduces the space occupied by the accommodation compartment 20c.

In a further embodiment, if the medical article needs to be inserted into the accommodation compartment 20c, the side plate 212c and part of the top plate 211c of the accommodation compartment 20c abut against the step surface 1023, such that the medical article can be inserted through the opening 203c of the accommodation compartment 20c. It can be understood that the user may select the accommodation compartment 20c adapted to the dimensions of the medical article based on the size of the medical article according to actual conditions.

Alternatively, a catch 213c as in the first embodiment is provided on the side plate 212c of the compartment body 21c and will not be described here again.

Figure 18:
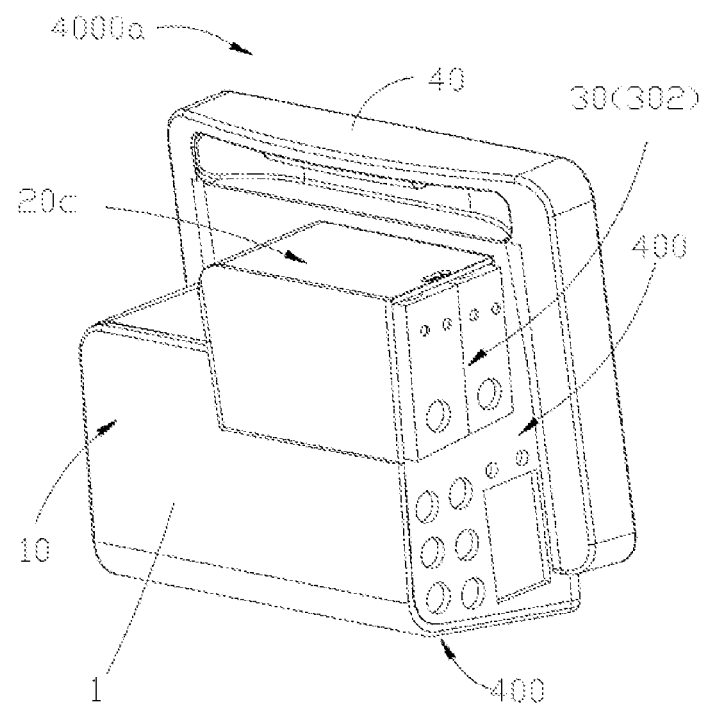
FIG. 18 is a schematic structural diagram of a medical device provided according to a fourth embodiment of this disclosure.

Referring to FIG. 18, in an embodiment, a first implementation of the fourth embodiment of this disclosure provides a medical device 4000a, where the medical device 4000b includes a monitor 400. The medical article 30 is the function extension module 302 of the first embodiment.

Figure 19:
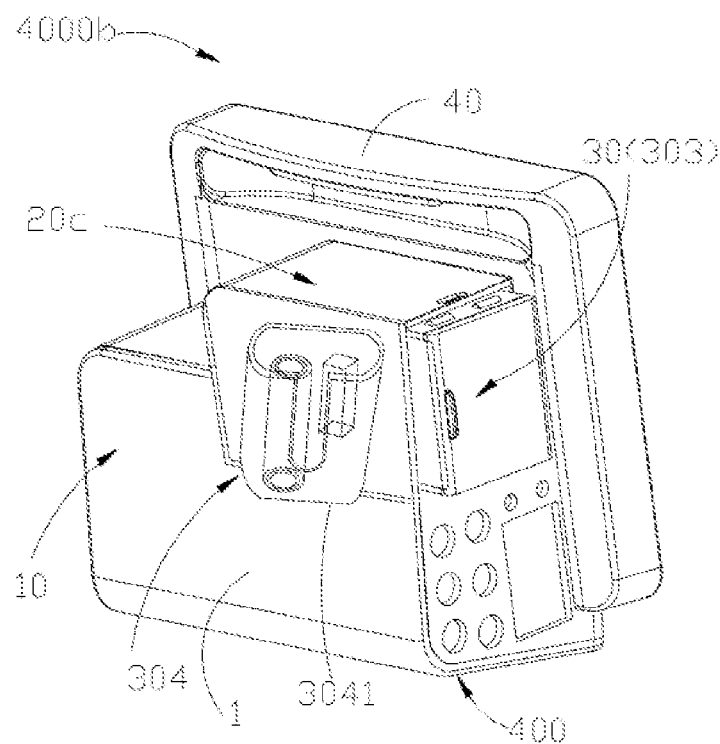
FIG. 19 is a further schematic structural diagram of a medical device provided according to a fourth embodiment of this disclosure.

Referring to FIG. 19, in a further embodiment, a second implementation of the fourth embodiment of this disclosure provides a medical device 4000b. The medical device 4000b includes the monitor 400, and the medical article 30 is the adapter part 303 for a third-party device 304 of the first embodiment. In this embodiment, the third-party device 304 is a blood pressure measuring device. Alternatively, the adapter part 303 may be sleeved with a first storage box 3031, and the third-party device 304 is sleeved with a second storage box 3041, such that the medical article 30 of the medical device 400 are accommodated better and the overall visual effect of the medical device 400 is further improved.

In this embodiment, the medical device 400 is provided with the removable accommodation compartment 20c, such that the user may select an accommodation compartment 20c having a different dimension according to actual needs.

In this way, the medical device 100 can be used in combination with the function extension module or other medical devices, which allows the medical device to perform a variety of tasks. In this embodiment, when the medical article 30 is not inserted in the accommodation compartment 20c, the side plate 212c of the accommodation compartment 20c is flush with the side plate 1011 of the main case 1, and the top plate 211c of the accommodation compartment 20c is flush with the side plate 1012 of the main case 1, such that the accommodation compartment 20c is disposed in a hidden manner relative to the main case 1 and the space occupied by the accommodation compartment 20c is further reduced. If the medical article 30 needs to be inserted in the accommodation compartment 20c, a section of the accommodation compartment 20c that is provided with the opening 203c is placed to face away from the step surface and face the side plate 1011 of the main case 1 to enable the medical article 30 to be inserted. Further, the medical article 30 may be selected according to actual needs to enable the medical device 400 to have a variety of functions.

Figure 20:
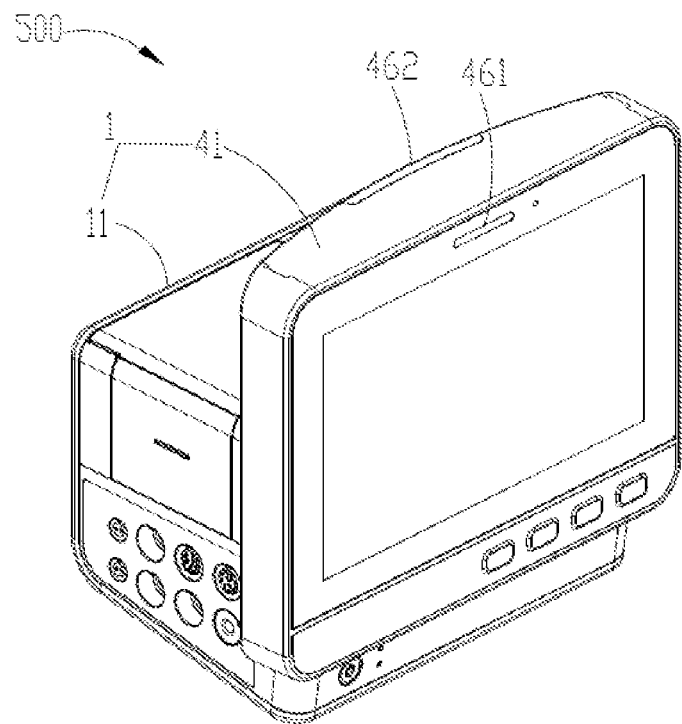
FIG. 20 is a schematic structural diagram of a monitor provided according to a fifth embodiment of this disclosure.
Figure 21:
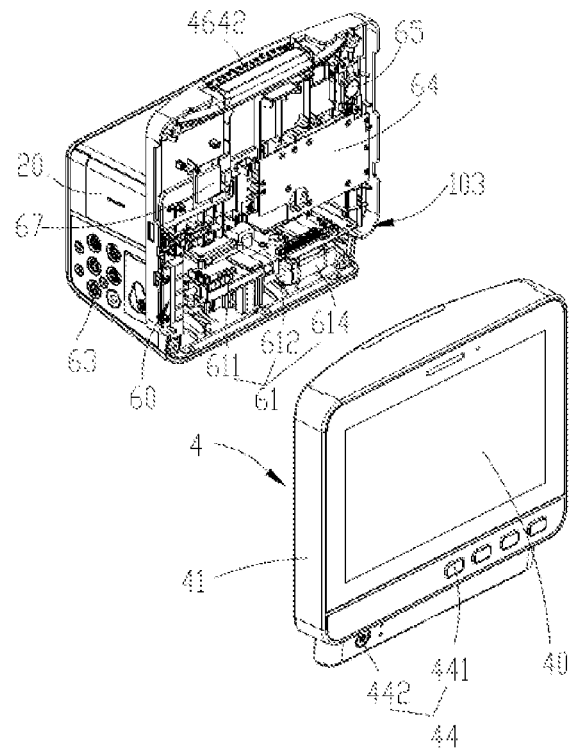
FIG. 21 is an exploded schematic diagram of the structure of the monitor of FIG. 20.
Figure 22:
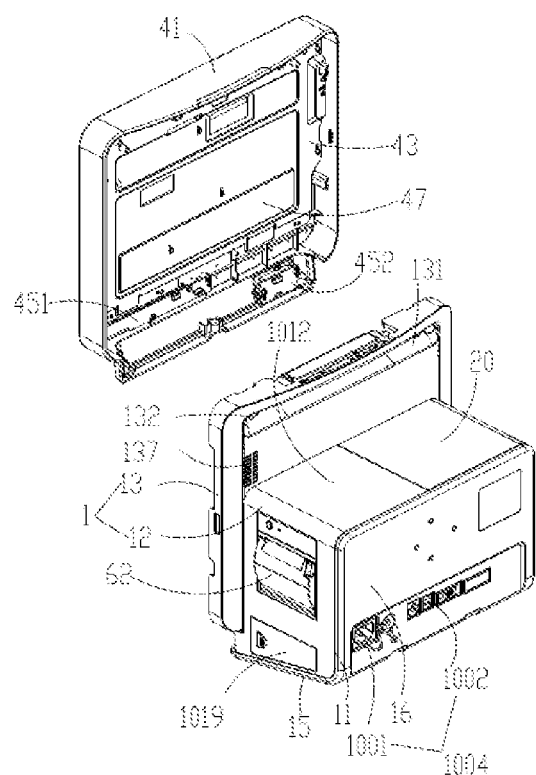
FIG. 22 is a view of the monitor of FIG. 20 from another perspective.

As shown in FIGS. 20-22, a more detailed internal structure description is provided for the above embodiments of this disclosure, where the detailed internal structure is shown according to a schematic structural diagram of a monitor 500 in an embodiment in FIGS. 20 to 22. In this embodiment, the monitor 500 is similar to the monitor 100 in structure, but this embodiment focuses on describing the details of the external structure and the internal structure of the main case in the above embodiments. The main case 1 includes a front case 41 and a back case 11 which are engaged with each other. In one embodiment, the front case 41 and the back case 11 are mated to be fixed together in an engagement manner. In a further embodiment, the front case 41 and the back case 11 may also be mated to be fixed together in a manner such as screw locking. The front case 41 and the back case 11 jointly enclose an accommodation chamber 103 for accommodating several functional modules 60.

In this embodiment, the several functional modules 60 include a screen assembly 4, a main bracket assembly 61, a printing recorder 62, a parameter panel 63, a function extension module 64, a loudspeaker assembly 65, a power module 35 (see FIG. 35), and an Internet of Things module 67, etc. In other embodiments, the several functional modules 60 may not include the function extension module 64, that is, the function extension module 64 can be omitted in the monitor 500. The main bracket assembly 61 is located at the bottom of the accommodation chamber 103 of the back case 11. The main bracket assembly 61 includes a main bracket 611 and a multi-functional integrated circuit board 612 disposed on the main bracket 611. The multi-functional integrated circuit board 612 may include a circuit board which is integrated with all of a main control board function, a parameter board function and an extended interface function, or the multi-functional integrated circuit board 612 may include a plurality of circuit boards, each of which is integrated with some of the main control board function, the parameter board function and the extended interface function. The main bracket 611 and the multi-functional integrated circuit board 612 are arranged in a stacked manner. The multi-functional integrated circuit board 612 is disposed on a side of the main bracket 611 away from a bottom plate 1013 (a bottom plate 1013 shown in FIG. 35) of the back case 11. The printing recorder 62, the parameter panel 63, the function extension module 64, the loudspeaker assembly 65, and the power module 66 are all disposed in the accommodation chamber 103 and are disposed on a side of the multi-functional integrated circuit board 612 facing away from the main bracket 611. The function extension module 64 is taken as an example for installation instructions herein. For other function extension modules which may not be mounted on the main bracket assembly 61, they may also be mounted inside the accommodation chamber 103 of the monitor following the mounting manner of the function extension module 64. The function extension module 64 includes but is not limited to: a cardiac output (CO) measurement module, a microfluidic carbon dioxide module, an IBP measurement module, a continuous cardiac output (CCO) measurement module, an AG anesthesia module, an oxygen measurement module, a BIS EEG measurement module, and an ICG electrical impedance cardiography module. A module for respiratory gas measurement, which may be referred to as a gas detection module, for example includes a carbon dioxide module.

By using the structural layout design in the above embodiments, the transfer monitoring standby time of the monitor can be improved. In the same functional configuration, compared to traditional mobile or portable mobile monitors, the volume of the whole machine is reduced by about 20%, which greatly reduces the volume of the monitor, and effectively utilizes the internal space of the monitor to realize a variety of parameter extension function detections besides the measurement of basic parameters and to support a variety of power input.

Screen Assembly

Figure 23:
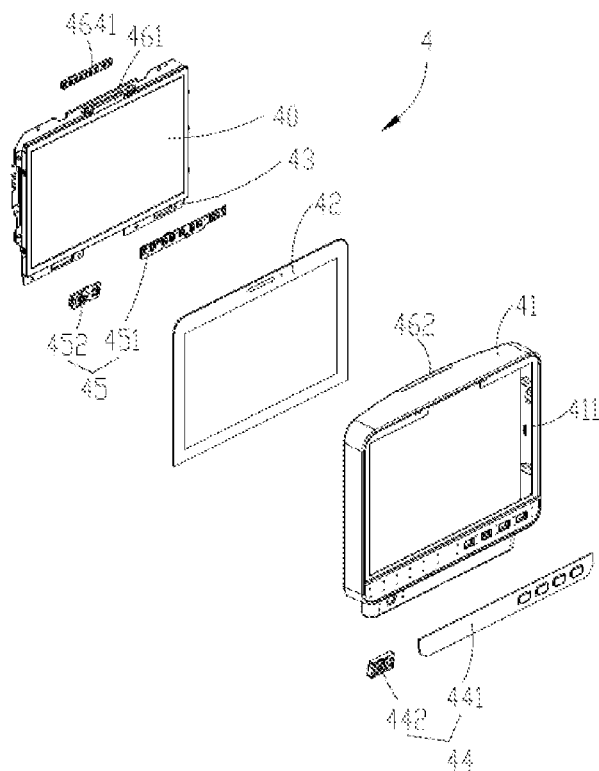
FIG. 23 is an exploded schematic diagram of the structure of a screen assembly of the monitor of FIG. 20.

As shown in FIGS. 21-23, in this embodiment, the front case 41 is internally provided with a screen assembly 4. The screen assembly 4 is fixed to the front case 41. The screen assembly 4 includes a touch screen 42, a display screen 40 disposed on a rear face of the touch screen 42, and a main control board of the screen assembly 43 electrically connected to the display screen 40. A front face of the front case 41 is provided with a window 411, and the touch screen 42, the display screen 40 and the main control board of the screen assembly 43 are all mounted in the window 411 of the front case 41. The touch screen 42 is used for a user to input control instructions to realize human-computer interaction. For example, the display screen 40 may correspondingly display contents such as a menu switch or a pop-up switch for a parameter setting window when the touch screen 42 responds to the gesture touch by the user. The display screen 40 may also be used to display data information monitored by the monitor 500 and processed image information, such that the user can more intuitively know the monitored information. The main control board of the screen assembly 43 is used to receive the control instructions inputted by the touch screen 42 and transmit the control instructions to the multi-functional integrated circuit board 612, and control the display screen 40 to correspondingly display in response to the control of the multi-functional integrated circuit board 612. The touch screen 42 is disposed at an outer side of the display screen 40, and the touch screen 42 and the display screen 40 are integrated to form a touch display screen with touch input and display output functions. In addition, in one of the embodiments, the screen assembly 4 may be reinforced by a sheet metal plate 47 after it is mounted to the front case 41, such that the screen assembly 4 is located between the front case 41 and the sheet metal plate 47. A combination of the front case 41 and the screen assembly 4 is further mounted to the back case 11, and correspondingly it is possible to enhance the mechanical fixation, improve the mechanical anti-fall strength, protect the screen assembly, and improve the stability. Moreover, it may also be used as the grounding of the circuit board, which may be used to release interferences to improve the stability and anti-interference performance of the circuit.

The front case 41 is also provided with a function key 44. In this embodiment, the function key 44 is disposed at the bottom of the front face of the front case 41, that is, the function key 44 is located under the touch screen 42. In this embodiment, the function key 44 may be a mechanical button or knob. In this embodiment, the function key 44 includes several menu keys 441 and a power key 442. The menu keys 441 are used for menu switch, or pop-up switch for parameter setting window. The power key 442 may control the activation of the monitor 500. It may be understood that in other embodiments, the function key 44 may also be disposed in other positions on the front case 41, such as on a bottom face, a top face, or a side face.

In this embodiment, the main control board of the screen assembly 43 is disposed on the whole rear face of the front case 41. A function key circuit board 45 connected to the function key 44 is arranged in the position, corresponding to the function key 44, on the main control board of the screen assembly 43. The function key circuit board 45 includes a menu key circuit board 451 connected to the menu key 441 and a power key circuit board 452 connected to the power key 442. In one embodiment, the menu key circuit board 451 and the power key circuit board 452 are separately disposed on the main control board of the screen assembly 43, that is, the several menu key(s) 441 and the power key(s) 442 may be separately mounted on the front case 41. In a further embodiment, the menu key circuit board 451 and the power key circuit board 452 may be combined into an integrated board and are disposed at the bottom of the front face of the main control board of the screen assembly 43. It may be understood that in other embodiments, the main control board of the screen assembly 43 may also be disposed at part of the rear face of the front case 41, and the menu key circuit board 451 and the power key circuit board 452 are mounted on the main control board of the screen assembly 43 or connected to the main control board of the screen assembly 43 by a cable.

Referring to FIGS. 20-22 again, further, the front case 41 is provided with a first alarm indicator 461. In this embodiment, the first alarm indicator 461 is disposed on the front face of the front case 41. A first indicator circuit board 4641 electrically connected to the first alarm indicator 461 is provided in the position, corresponding to the first alarm indicator 461, on the main control board of the screen assembly 43. The first indicator circuit board 4641 is disposed at the top of the front face of the main control board of the screen assembly 43. Further, in order to improve the visible range of the alarm light, the back case 11 is also provided with a second alarm indicator 462 and a second indicator circuit board 1621 electrically connected to the second alarm indicator 462. The second alarm indicator 462 is disposed on a top face of the back case 11. Alternatively, in a further embodiment, the first alarm indicator 461 may also be disposed at the common border between the top face and the front face of the front case 41, and the second alarm indicator 462 is disposed at the common border between the top face and a rear face of the back case 11. As such, when the first alarm indicator 461 and the second alarm indicator 462 emit the alarm light at the same time, the alarm light has a 360-degree visibility, facilitating medical care personnel to quickly find the monitor 500 which emits the alarm light. In other embodiments, at least one of the first alarm indicator 461 and the second alarm indicator 462 may also be arranged to protrude from the top face of the front case 41, such that 360-degree viewing of the alarm indicator light emitted from at least one of the first alarm indicator 461 and the second alarm indicator 462 is possible for the medical care personnel, which further reduces the difficulty and workload of the medical care personnel.

Alarm Indicator

Figure 24:
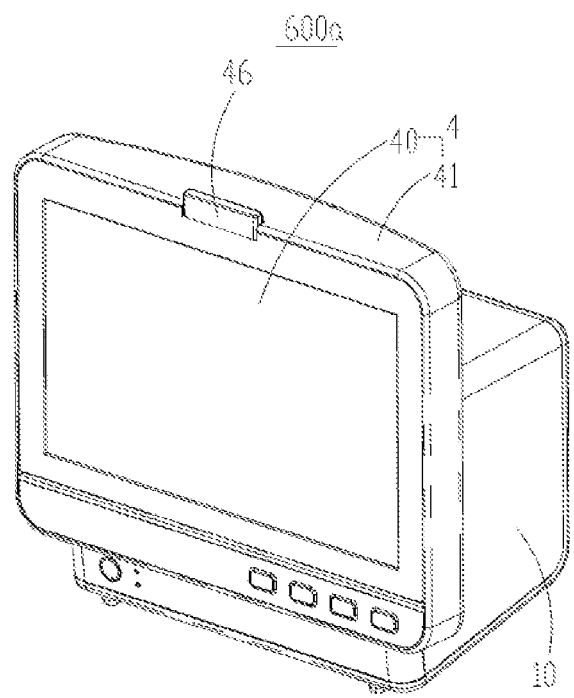
FIG. 24 is a schematic structural diagram of a first implementation of an alarm indicator of the monitor of FIG. 20.

Referring to FIG. 24, it is a schematic structural diagram of a first implementation of an alarm indicator 46 of a monitor 600 provided according to this disclosure. The monitor 600 includes the host part 10 and the screen assembly 4 disposed on a front face of the host part 10. The screen assembly 4 is provided with at least one alarm indicator 46. The light emitted from the at least one alarm indicator 46 is visible from at least two orientations.

Preferably, the light emitted from the at least one alarm indicator 46 is visible from at least three orientations. Further, in order to enlarge the visible range of the light rays emitted from the alarm indicator 46, a portion of the screen assembly 4 higher than the host part 10 is provided with the at least one alarm indicator 46.

The screen assembly 4 includes the display screen 40 and the front case 41 for accommodating the display screen 40. The display screen 40 is disposed on the front face of the front case 41. The alarm indicator 46 is arranged to protrude from an outer wall of the front case 41. Particularly, in this embodiment, there is one alarm indicator 46. The alarm indicator 46 is disposed at the common border between the front face and the top face of the front case 41 and is higher than the top face of the front case 41. The alarm indicator 46 and the front case 41 are located in the same plane on a front side close to the display screen 40, that is, at least one exposed outer wall of the alarm indicator 46 is connected to the front face of the front case 41. The alarm indicator 46 is located in the middle at the top end of the front case 41.

In this embodiment, the light emitted from the alarm indicator 46 is visible from five orientations, that is, the light emitted from the alarm indicator 46 is irradiated toward the outside of the monitor 600 from a top face orientation, a front face orientation, a rear face orientation, a left side face orientation, and a right side face orientation of the screen assembly 4. It may be understood that the term "orientation" in this disclosure refers to the orientation corresponding to a respective surface of the screen assembly 4 when the light emitted from the alarm indicator 46 may be emitted outward from the respective surface of the screen assembly 4 with the screen assembly 4 of the monitor 600 as the center. That is, the light emitted outward from the alarm indicator 46 from the respective surface of the screen assembly 4 can be seen by the user when the user is located in an orientation facing the respective surface.

It may be understood that in a further embodiment, the alarm indicator 46 may also be arranged to directly protrude from the top face of the front case 41. As such, when the alarm indicator 46 emit the alarm indicator light, the alarm indicator light has a 360-degree visibility, facilitating the medical care personnel to quickly find the monitor 600 which emits the alarm indicator light, and further reducing the difficulty and workload of the medical care personnel. In other embodiments, the alarm indicator 46 may also be arranged to protrude from other surfaces of the front case 41, and a plurality of alarm indicators 46 may also be disposed on the outer wall of the front case 41 in a combination.

Figure 25:
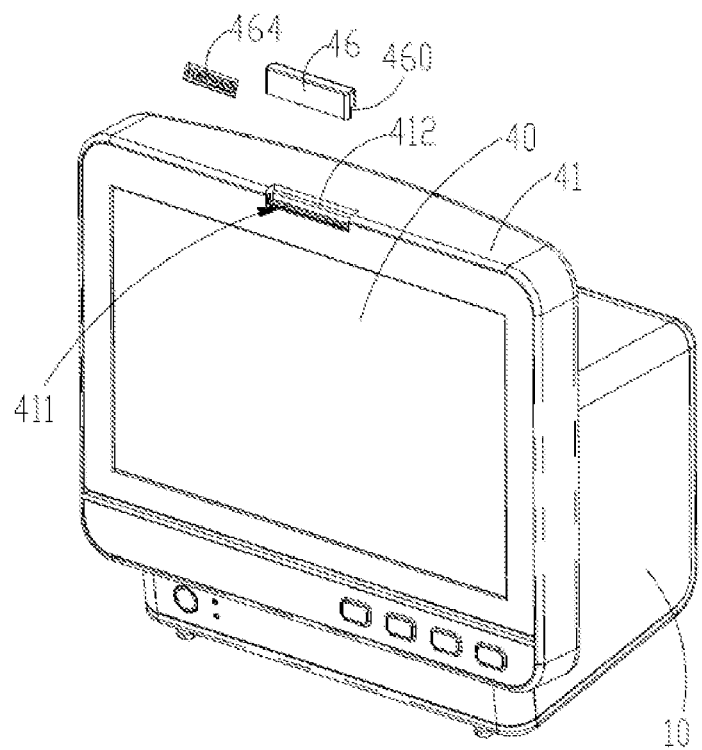
FIG. 25 is an exploded schematic diagram of the structure of the monitor of FIG. 24.

As shown in FIG. 25, the front case 41 is provided with an accommodation recess 411 for accommodating the alarm indicator 46. The accommodation recess 411 is internally provided with an engaging block 412, and the alarm indicator 46 is provided with an engaging recess 460 mating with the engaging block 412. The alarm indicator 46 is fixedly disposed on the front case 41. In other embodiments, the alarm indicator 46 may also be connected to the front case 41 by means of engaging, magnetic connection or other connection members, which is not limited here.

It may be understood that the length of the alarm indicator 46 extending along the surface of the front case 41 is larger than the depth of the accommodation recess 411 in the front case 41.

It may be understood that the alarm indicator 46 may be elongated, L-shaped, or semicircular. The alarm indicator 46 is used to emit the alarm indicator light when the monitor 600 monitors that a physiological parameter exceeds a certain range or the operation of a parameter measuring module is abnormal, for example, a wire is disconnected or the power supply is interrupted. The alarm indicator may be configured to light red, yellow and other colors; also, the alarm indicator light may flash or stay on. As such, the medical care personnel can determine whether the monitor 600 is abnormal according to the operation state of the alarm indicator 46 and can find the abnormal monitor 600 within a short time. The alarm indicator 46 is connected to the host part 10 via the alarm indicator circuit board 464. The alarm indicator circuit board 464 is disposed inside the accommodation recess 411.

Figure 26:
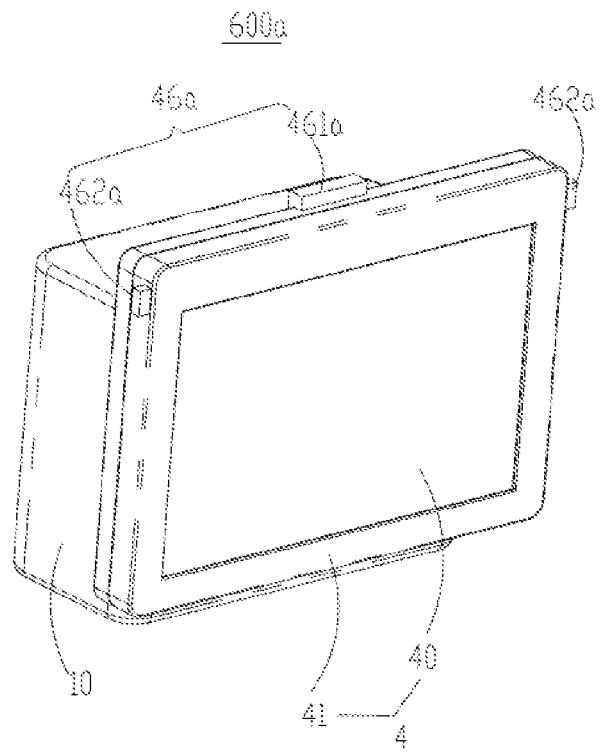
FIG. 26 is a schematic structural diagram of a second implementation of the alarm indicator of the monitor of FIG. 20.

Referring to FIG. 26, it is a schematic structural diagram of a second implementation of an alarm indicator 46a of a monitor 600a provided according to this disclosure. In this embodiment, the monitor 600a includes three alarm indicators 46a arranged to protrude from the outer wall of the front case 41. One of the alarm indicators 461a is arranged at the common border between the rear face and the top face of the front case 41 and is higher than the top face of the front case 41, and the other two of the alarm indicators 462a are respectively arranged to protrude from either side face of an upper side of the front case 41.

In this embodiment, the alarm indicator 461a is located in the middle at the top end of the front case 41. The alarm indicator 461a is disposed on a back side of the screen assembly 4, and the two alarm indicators 462a are disposed on a front side of the screen assembly 4. Particularly, the alarm indicator 461a is located on a side of the front case 41 close to the rear face of the display screen 40, and the two alarm indicators 462a are respectively located on a side of either side face of the front case 41 close to the front face of the screen assembly 4, that is, the alarm indicator 461a and the two alarm indicators 462a are in different planes on the sides close to the display screen 40. As such, when the 3 alarm indicators 46a emit the alarm indicator light, the alarm indicator light has a 360-degree visibility, enlarging the visible range of the alarm indicator light and further enabling the medical care personnel to quickly find the monitor which emits the alarm light. The two alarm indicators 462a are symmetrically disposed on the front case 41 relative to a vertical symmetry plane of the display screen 40. Of course, in other embodiments, there is multiple, rather than only one, alarm indicators located at the common border between the rear face and the top face as well as a left side face of the case, at the common border between the rear face and the top face as well as a right side face thereof, at the common border between the front face and the top face as well as the left side face, and/or at the common border between the front face and the top face as well as the right side face.

Figure 27:
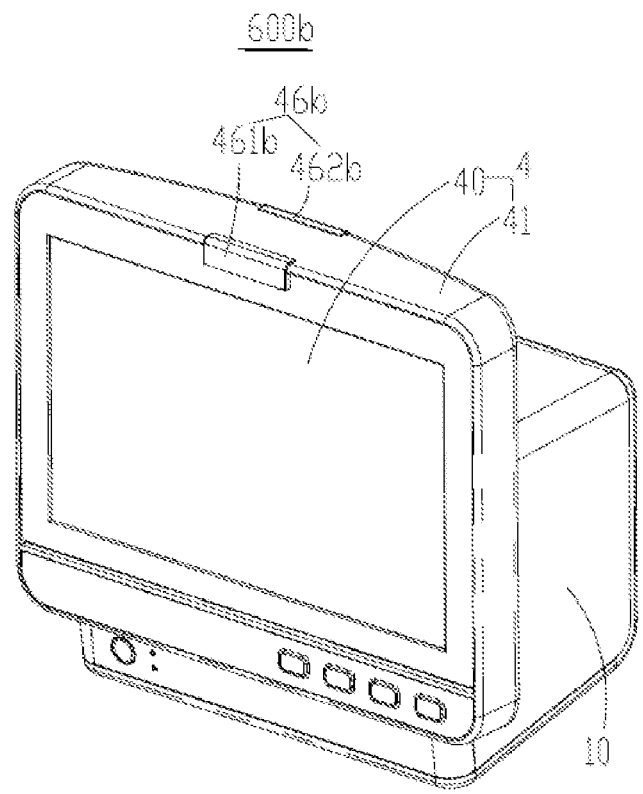
FIG. 27 is a schematic structural diagram of a third implementation of an alarm indicator of the monitor of FIG. 20.
Figure 28:
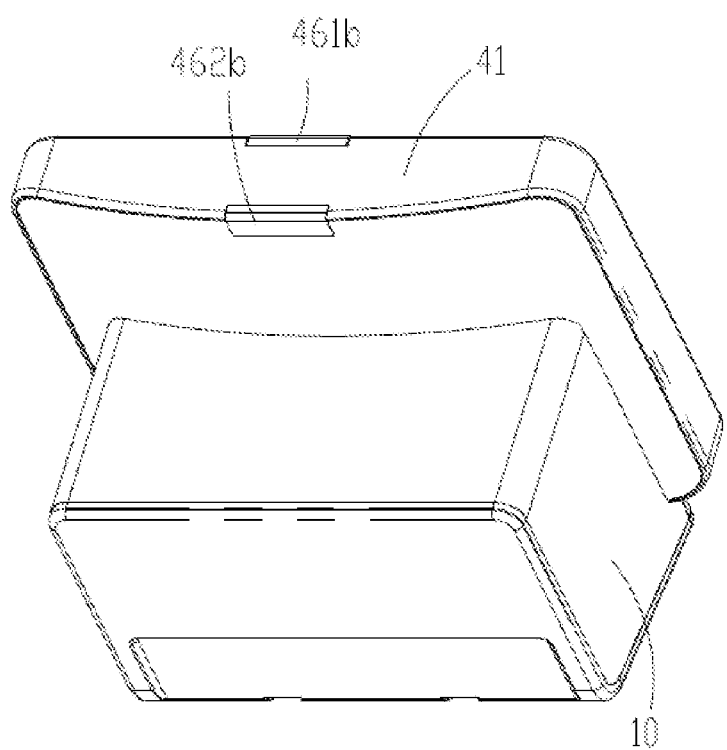
FIG. 28 is a view of the monitor of FIG. 27 from another perspective.

Referring to FIGS. 27 and 28, they are schematic structural diagrams of a third implementation of an alarm indicator 46b of a monitor 600b provided according to this disclosure. In this embodiment, the monitor 3000 includes two alarm indicators 46b arranged opposite each other, where the two alarm indicators 46b are embedded in the front case 41, and outer walls of the two alarm indicators 46b are connected to and flush with the outer wall of the front case 41.

In this embodiment, the alarm indicator 461b is disposed on the front side of the screen assembly 4, and the alarm indicator 462b is disposed on the back side of the screen assembly 4. Both of the two alarm indicators 46b (31b, 32b) are located in the middle at the top end of the front case 41. One of the alarm indicators 461b is disposed at the common border between the front face and the top face of the front case 41, and the other one of the alarm indicators 462b is disposed at the common border between the rear face and the top face of the front case 41. As such, when the 2 alarm indicators 46b emit the alarm indicator light, the visible range of the alarm indicator light is enlarged, and the medical care personnel can quickly find the monitor which emits the alarm light. The light emitted from the two alarm indicators 46b is visible from three orientations, that is, the light lays emitted from the two alarm indicators 46b are irradiated toward the outside of the monitor 3000 from the front face orientation, the top face orientation, and the rear face orientation of the front case 41.

In this embodiment, the alarm indicator 461b and the alarm indicator 462b are embedded in the front case 41 and are exposed to a housing 22. The front case 41 and the alarm indicator 461b are located in the same plane on the side close to the display screen 40. The front case 41 and the alarm indicator 462b are located in the same plane on the side close to the host part 10. The front case 41, the alarm indicator 461b and the alarm indicator 462b are located in the same plane on the upper side close to the display screen 40. As such, the front case 41 forms a complete outer wall, such that the risk of collision in a small and jammed space due to an irregular outer wall may be eliminated, or difficulties in mounting caused by an irregular outer wall are eliminated.

Particularly, the alarm indicator 461b includes at least two exposed outer walls. One of the exposed outer walls of the alarm indicator 461b is connected to and flush with the front face of the front case 41, i.e., located in the same plane as the front face of the front case 41, and the other one of the exposed outer walls of the alarm indicator 461b is connected to and flush with the top face of the front case 41, i.e., located in the same plane as the top face of the front case 41. The alarm indicator 462b includes at least two exposed outer walls. One of the exposed outer walls of the alarm indicator 462b is connected to and flush with the rear face of the front case 41, i.e., located in the same plane as the rear face of the front case 41, and the other one of the exposed outer walls of the alarm indicator 462b is connected to and flush with the top face of the front case 41, i.e., located in the same plane as the top face of the front case 41.

Figure 29:
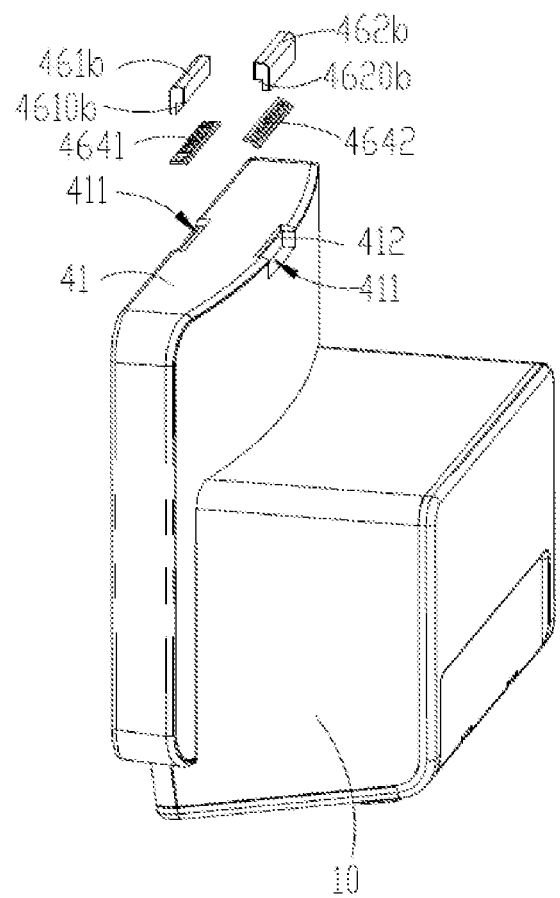
FIG. 29 is an exploded schematic diagram of the structure of the monitor of FIG. 27.

As shown in FIG. 29, the alarm indicator 461b is connected to the host part 10 via an alarm indicator circuit board 4641, and the alarm indicator 462b is connected to the host part 10 via an alarm indicator circuit board 4642. Two opposite accommodation recesses 411 are provided in the middle of the upper side of the front case 41. One of the accommodation recesses 411 accommodates the alarm indicator 461b and the alarm indicator circuit board 4641, and the other of the accommodation recesses accommodates the alarm indicator 462b and the alarm indicator circuit board 4642. Each of the accommodation recesses 411 is internally provided with an engaging block 412, and the front housing of the alarm indicators 461b, 461b are respectively provided with engaging recesses 4610b, 4620b mating with the corresponding engaging blocks 412. The alarm indicator circuit boards 4641, 4642 are respectively fixed in the housing of the alarm indicators 461b, 462b, the lengths of the engaging recesses 4610b, 4620b extending along the surface of the front case 41 are greater than the depths of the accommodation recesses 411, such that the alarm indicator 461b and the alarm indicator 462b are higher than the outer wall of the front case 41 after they are embedded into the front case 41. Therefore, in one of the embodiments, by configuring the length of the case of the alarm indicator extending along the surface of the front case to be greater than the depth of the accommodation recess in the front case, the alarm indicators may be higher than the outer wall of the front case after they are embedded into the front case. Therefore, the length of at least one of the at least one alarm indicator extending along the surface of the front case is greater than the depth of the accommodation recess in the front case.

Figure 30:
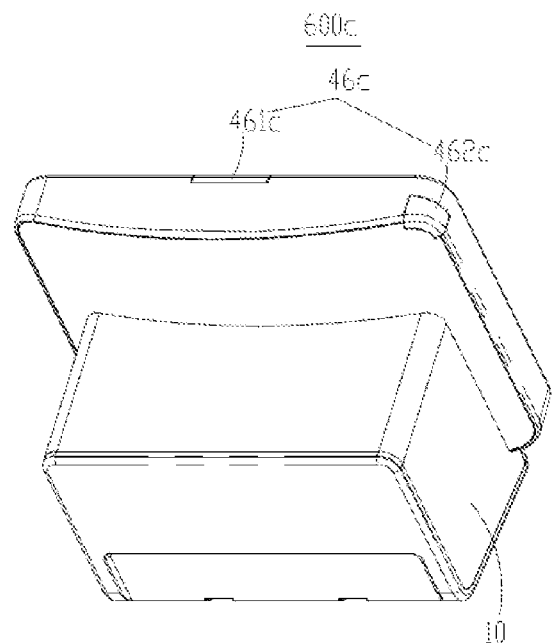
FIG. 30 is a schematic structural diagram of a fourth implementation of an alarm indicator of the monitor of FIG. 20.

As shown in FIG. 30, it is a schematic structural diagram of a fourth implementation of an alarm indicator 46c of a monitor 600c provided according to this disclosure. In this embodiment, two alarm indicators 46c are arranged in a staggered manner, and one of the alarm indicators 462c is disposed on the left rear side of the front case 41.

In this embodiment, one of the alarm indicators 461c is disposed at the common border between the front face and the top face of the front case 41, and the other one of the alarm indicators 462c is disposed at the common border between the rear face and the top face as well as the side face of the front case 41. Since the two alarm indicators 46c are arranged in a staggered manner, the visible range of the alarm indicator light is enlarged, and the medical care personnel can quickly find the monitor which emits the alarm light. It may be understood that in other embodiments, the alarm indicator 462c may also be disposed at the right rear side of the front case 41, and the alarm indicator 462c is correspondingly disposed at the common border between the rear face and the side face of the front case 41.

Figure 31:
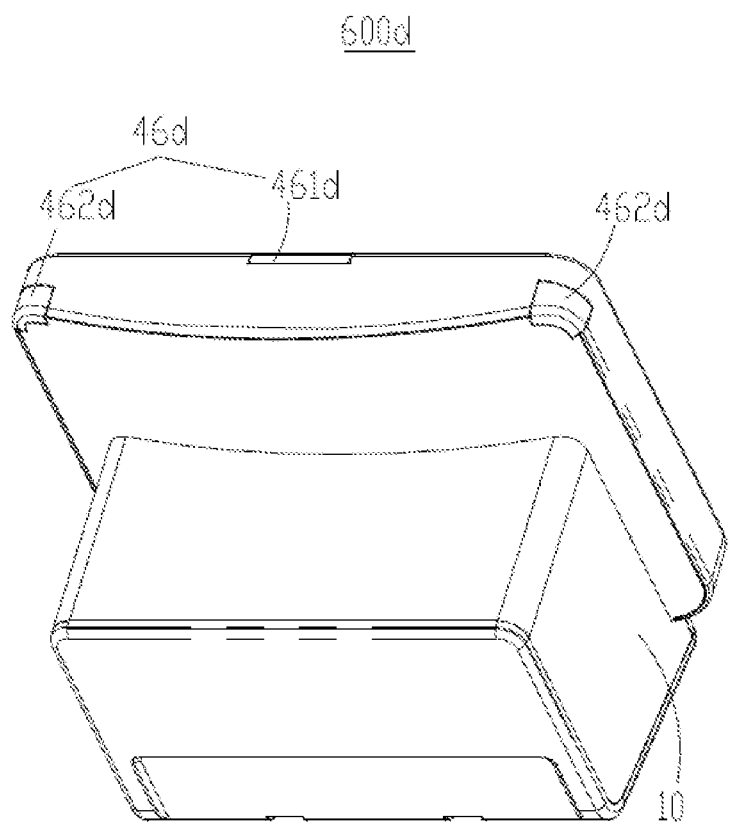
FIG. 31 is a schematic structural diagram of a fifth implementation of an alarm indicator of the monitor of FIG. 20.

As shown in FIG. 31, it is a schematic structural diagram of a fifth implementation of an alarm indicator 46d of a monitor 600d provided according to this disclosure. In this embodiment, one alarm indicator 462d is correspondingly disposed on each of the left rear side and the right rear side of the front case 41.

In this embodiment, one of the alarm indicators 461d is disposed at the common border between the front face and the top face of the front case 41, one of the alarm indicators 462d is disposed at the common border between the rear face and the top face as well as the left side face of the front case 41, and the other alarm indicator 462d is disposed at the common border between the rear face and the top face as well as the right side face of the front case 41.

Figure 32:
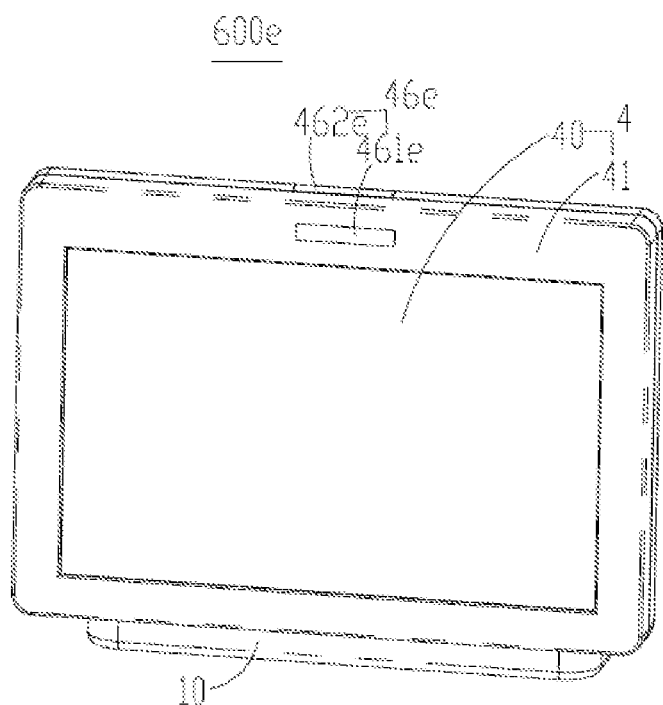
FIG. 32 is a schematic structural diagram of a sixth implementation of an alarm indicator of the monitor of FIG. 20.
Figure 33:
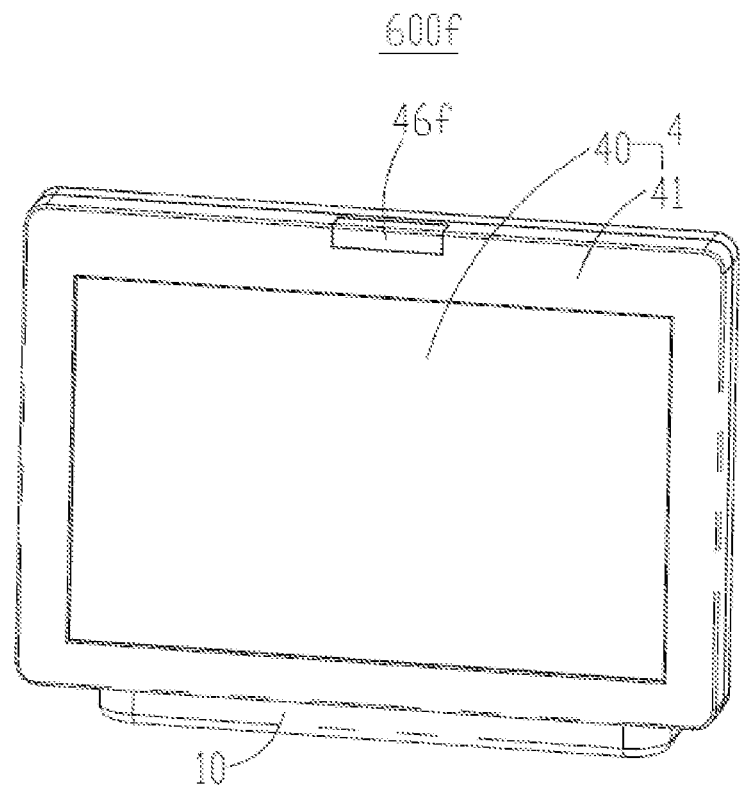
FIG. 33 is a schematic structural diagram of a seventh implementation of an alarm indicator of the monitor of FIG. 20.
Figure 34:
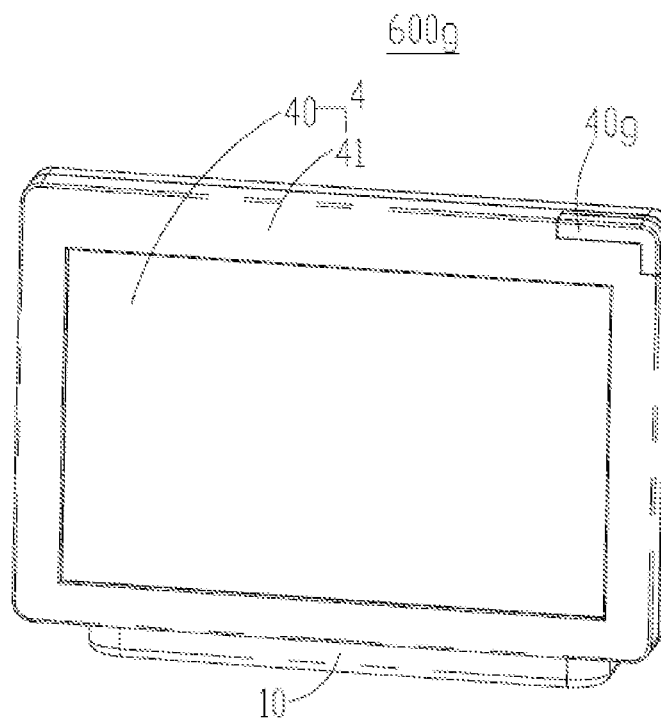
FIG. 34 is a schematic structural diagram of an eighth implementation of an alarm indicator of the monitor of FIG. 20.

Alternatively, in other embodiments, the user may design the alarm indicator according to the placement position of the monitor. For example, when the host part of the monitor is close to a wall or is blocked by a barrier, the alarm indicator is designed to allow a larger visible range of the alarm indicator. As shown in FIGS. 32-34, only one alarm indicator is provided on the front side of the screen assembly of the monitor.

A schematic structural diagram of a sixth implementation of an alarm indicator 46e of a monitor 600e provided according to this disclosure is shown in FIG. 32. Two alarm indicators 46e of the monitor 600e are embedded in the front case 41 and are exposed at the front face of the front case 41. In this embodiment, the two alarm indicators 46e are both disposed in the middle at the top of the host part 20. One of the alarm indicators 461e is disposed on the front face of the front case 41, that is, the alarm indicator 461e and the front case 41 are located in the same plane on the front sides close to the display screen 40. One of the alarm indicators 462e is disposed on the top face of the front case 41, that is, the alarm indicator 462e and the front case 41 are located in the same plane at the top face. It may be understood that in other embodiments, either of the alarm indicators 461e, 462e of the monitor 600e can be designed in combination with the arrangement of any of the alarm indicators of the monitors in the first to fifth embodiments described above, such that the light emitted from the alarm indicators of the monitor 600e is visible from at least two orientations.

A schematic structural diagram of a seventh implementation of an alarm indicator 46f of a monitor 600f provided according to this disclosure is shown in FIG. 33. The alarm indicator 46f of the monitor 600f is embedded in the front case 41 and is exposed at the front face and the top face of the front case 41, that is, the alarm indicator 46f is disposed at the common border between the front face and the top face of the front case 41. In one embodiment, the alarm indicator 46f is disposed in the middle at an upper side of the screen assembly 4. In a further embodiment, the alarm indicator 46f is disposed in other positions at the upper side of the screen assembly 4. In other embodiments, the alarm indicator 46f may also be disposed at the common border between the front face and the side face, between the top face and the rear face, and between the rear face and the side face of the front case 41.

A schematic structural diagram of an eighth implementation of an alarm indicator 46g of a monitor 600g provided according to this disclosure is shown in FIG. 34. The alarm indicator 46g of the monitor 600g is embedded in the front case 41 and are exposed at the front face, the top face and the right side face of the front case 41. In one embodiment, the alarm indicator 46g is located on the right front side of the display screen 40, and the alarm indicator 46g is disposed at the common border between the front face and the top face as well as the right side face of the front case 41. In a further embodiment, the alarm indicator 46g is located on the left front side of the display screen 40, and the alarm indicator 46f is disposed at the common border between the front face and the top face as well as the left side face of the front case 41. In other embodiments, the alarm indicator 46g is located on the left rear side or the right rear side of the display screen 40, and the alarm indicator 46f is disposed at the common border between the rear face and the top face as well as the left side face, or between the rear face and the top face as well as the right side face of the front case 41.

The term "alarm indicator" herein refers to an integral mechanism containing at least one light-emitting lamp bead.

For the monitor provided according to the embodiments of this disclosure, by providing at least one alarm indicator on the screen assembly, the light emitted from the at least one alarm indicator is visible from at least two orientations, enlarging the visible range of the alarm indicator light emitted from the alarm indicator and further enabling the medical care personnel to quickly find the monitor which emits the alarm light, such that the work difficulties and workloads of the medical care personnel are reduced.

Back Case

Figure 35:
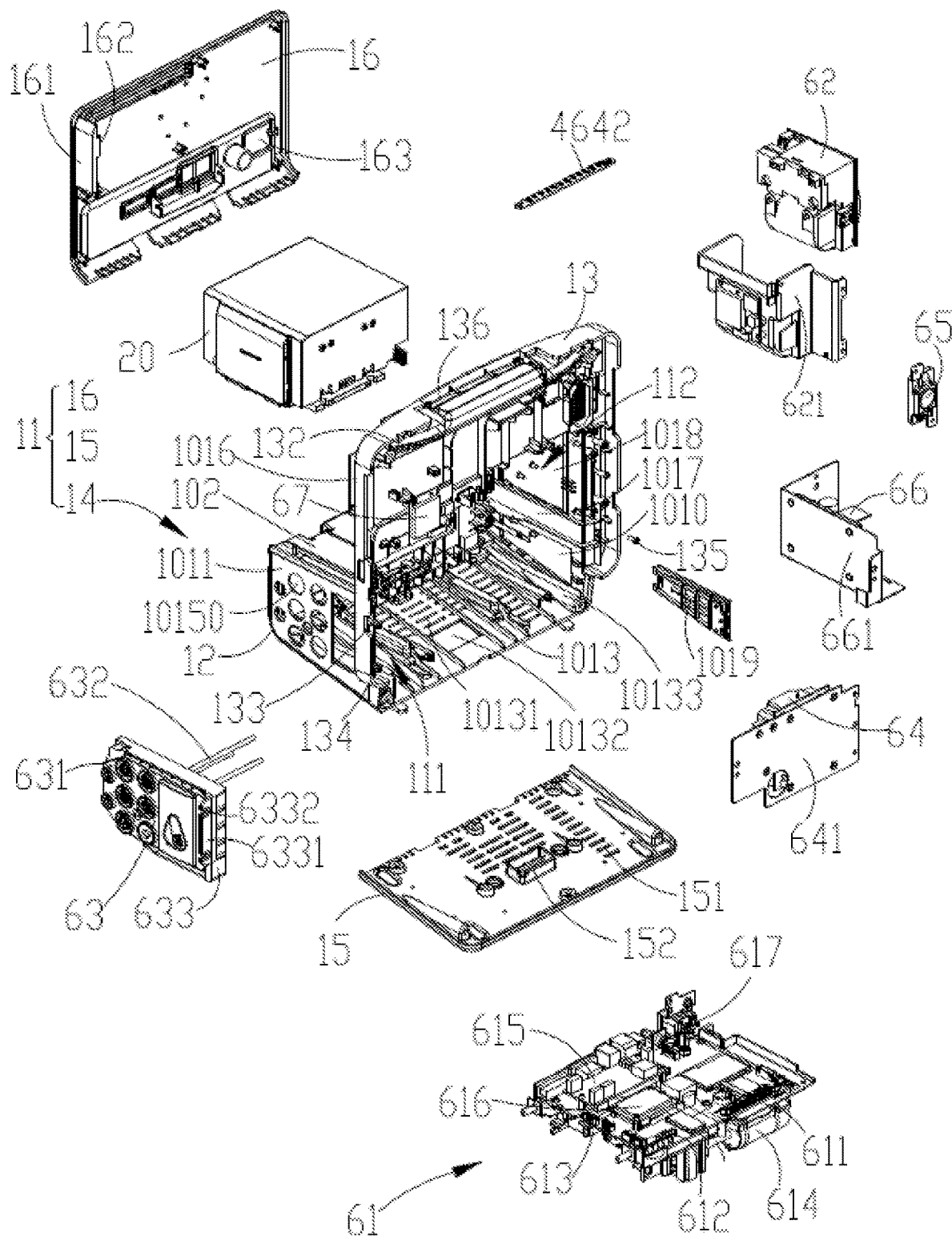
FIG. 35 is an exploded schematic diagram of the structure of a second portion of the monitor of FIG. 20.

As shown in FIG. 35, the back case 11 includes a back case main body 14, a first decorative cover 15 disposed at the bottom of the back case main body 14, and a second decorative cover 16 disposed at a back side of the back case main body 14. The second decorative cover 16 is connected to the first decorative cover 15, and is fixed to the back case main body 14. In this embodiment, the first decorative cover 15 and the second decorative cover 16 may be fixed to the back case main body 14 by means of a mounting structure. Here, the mounting structure may be a screw, a fastener, a magnetic attraction structure, such that the first decorative cover 15 and the second decorative cover 16 are removably fixed to the back case main body 14. It may be understood that any mounting structure suitable for the connection between the back case main body and the first and second decorative covers can be used in the embodiments of this disclosure. In this embodiment, the back case main body 14 is a box for accommodating functional elements such as the main bracket assembly 61, the printing recorder 62, the parameter panel 63, the function extension module 64, the loudspeaker assembly 65, and the power module 66.

The first decorative cover 15 is provided with several heat dissipation holes 151 in communication with the accommodation chamber 103. An electrical adapter 152 for inserting an external device is also provided in the middle of the first decorative cover 15. In one embodiment, the external device is an external battery box. In a further embodiment, the external device may also be a power conversion unit.

The second decorative cover 16 is disposed on the back side of the back case main body 14. An extended plate extends from the second decorative cover 16 toward the side of the back case main body 14. The monitor 500 further comprises an accommodation compartment 20 for accommodating the medical article. The extended plate 161 is provided with a catching block 162 for catching the accommodation compartment 20 at the edge of a side thereof away from the second decorative cover 16, where the catching block 162 extends toward an inner side of the back case main body 14 and in a direction parallel to the direction of the second decorative cover 16. Several orifices 163 for inserting an external device (such as a power plug) are provided at the bottom of the second decorative cover 16. The second decorative cover 16 is connected to an end of the first decorative cover 15 facing away from the front case 41, to an outer wall of the back case main body 14, and to the compartment outer wall of the accommodation compartment 20, respectively. As such, the back case 11 forms a complete outer wall, such that the risk of collision in a small and jammed space due to an irregular outer wall may be eliminated, or difficulties in mounting caused by an irregular outer wall will be eliminated.

The back case main body 14 includes a box body structure 12 and a connection frame 13 engaged with the front case 41. The box body structure 12 is disposed on a side of the connection frame 13 facing away from the front case 41. The top of the box body structure 12 is recessed to form a recess 102 for accommodating the accommodation compartment 20. The box body structure 12 is internally provided with the accommodation chamber 103, and the accommodation chamber 103 includes a first accommodation chamber 111 and a second accommodation chamber 112 in communication with the first accommodation chamber 111. The recess 102 is disposed outside the first accommodation chamber 111 and the second accommodation chamber 112. The second accommodation chamber 112 is in communication with the first accommodation chamber 111 to form an inverted "7"-shaped structure. A chamber wall of the second accommodation chamber 112 is connected to a recess wall of the recess 102 side by side. The second accommodation chamber 112 and the accommodation compartment 20 are placed side by side and are located above the first accommodation chamber 111 (in other words, the second accommodation chamber 112 and the accommodation compartment 20 are stacked above the first accommodation chamber 111), and the second accommodation chamber 112 and a recess space of the recess 102 are arranged side by side above the first accommodation chamber 111. The accommodation compartment 20 is also disposed above first accommodation chamber 111 after it is housed in the recess 102. The length of the first accommodation chamber 111 is greater than or equal to the length of the second accommodation chamber 112 plus the length of the accommodation compartment 20. The length here refers to the length extending in the arrangement direction of the menu keys 441 in FIG. 23, or the length extending in a horizontal direction.

In this embodiment, the box body structure 12 includes a bottom plate 1013, a top plate 1012 (see FIG. 22) disposed opposite the bottom plate 1013, a back side plate 1016 disposed between the bottom plate 1013 and the top plate 1012, and a first side plate 1011 and a second side plate 1017 disposed between the bottom plate 1013 and the top plate 1012 and opposite each other. The bottom plate 1013, the top plate 1012, the back side plate 1016, the first side plate 1011 and the second side plate 1017 jointly enclose the box body structure 12 to accommodate the main bracket assembly 61, and the internal space of the main bracket assembly is the accommodation chamber 103.

The bottom plate 1013 of the box body structure 12 is provided with several heat dissipation holes 10131 corresponding to the several heat dissipation holes 151 of the first decorative cover 15. The bottom plate 1013 is provided with one or more openings 10132 at a position corresponding to the electrical adapter 152 of the first decorative cover 15 so as to connect the external device to the monitor 500. Two inclined support blocks 10133 are respectively provided on two opposite sides of the bottom plate 1013. Each of the support blocks 10133 extends in the width direction of the bottom plate 1013 (i.e., the arrangement direction from the back case 11 to the front case 41). The height of each of the support blocks 10133 gradually increases from the back side plate 1016 in a direction away from the back side plate 1016, such that the main bracket assembly 61 is obliquely disposed inside the accommodation chamber 103 relative to the bottom plate 1013 of the back case main body 14. It can be seen that in one of the embodiments, the main bracket assembly 61 is obliquely disposed at the bottom of the accommodation chamber 103. As such, the center of gravity of the monitor 500 is located at the interface between the front case 41 and the back case 11. A handle 131 is arranged at the interface between the front case 41 and the back case 11 of the monitor 500. For example, the handle 131 is arranged on a rear face of the connection frame 13. When the monitor 500 is lifted, the forced direction of the handle 131 of the monitor 500 and the direction of gravity of the monitor 500 are located in the same vertical plane, facilitating the stability of the center of gravity of the whole monitor 500. In one of the embodiments, as shown in FIG. 22, the handle 131 may be embedded into the back case, and is smoothly connected to an outer wall face of the back case. The handle 131 may also be formed integrally with the back case. It can be seen that in this embodiment, an independent handle structure is not used, but the handle is integrated with the back case structure, thereby saving space and reducing the volume of the whole machine.

Referring to FIG. 22 again, the back side plate 1016 of the box body structure 12 is provided with openings for fixedly arranging several connection interfaces 1004 passaging therethrough. The connection interfaces 1004 are wireless interfaces and/or wired interfaces. The wireless interfaces included in the connection interfaces 1004 may be, but is not limited to, a parallel interface, Wifi, Bluetooth or Ethernet.

The wired interface included in the connection interfaces 1004 may be, but is not limited to, a serial interface, a power interface, a USB interface, a printing recorder interface, a headphone interface or a multi-function data interface. The power interface includes a DC power interface and an AC power interface. It may be understood that the types of the connection interfaces 1004 are suitable for other embodiments of this disclosure. As shown in FIG. 22, a plurality of interfaces such as the power interface, the USB interface, a cable interface and the multi-function data interface are horizontally arranged, and may also arranged horizontally at a position close to the bottom plate 1013. The DC power interface herein includes a cigarette lighter DC input interface. In this embodiment, the connection interfaces 1004 includes a power interface 1001 and a communication interface 1002.

As shown in FIG. 35, several orifices 10150 are provided at the position, corresponding to the parameter panel 63, on the first side plate 1011 of the box body structure 12 for connection to the external device and for passage and fixation of a parameter measurement accessory socket fixed on the parameter panel 63. The parameter panel 63 includes a fixing plate for a plurality of sockets connected to the parameter measurement accessories. The parameter measurement accessories here include accessories for detecting ECG respiration, blood oxygen, blood pressure, temperature, etc., and these parameter measurement accessories may include a pre-sampling circuit, or may only include components such as related sensors, cuffs, instead of the pre-sampling circuit. ECG respiration, blood oxygen, blood pressure, temperature, etc. are physiological parameters or physiological data.

The second side plate 1017 of the back case 11 is provided with an opening 1018 for the printing recorder 62 to pass. A side of the second side plate 1017 close to the bottom plate 1013 is provided with a battery compartment door 1019 snap-fitted to the second side plate 1017. The position, corresponding to the battery compartment door 1019, on the second side plate 1017 is provided with an opening 1010 for inserting an external battery. The battery compartment door 1019 is connected to and flush with the second side plate 1017. As such, the back case main body 14 forms a complete outer wall, such that the risk of collision in a small and jammed space due to an irregular outer wall may be eliminated, or difficulties in mounting caused by an irregular outer wall are eliminated. In addition, when the monitor 500 is powered off, the external battery may be inserted into the box body structure 12 of the back case main body 14 through the opening 1010, such that the monitor 500 may still be used continuously, that is, the monitor 500 may operate independently from a DC power source, when there is a short-term power supply interruption, the DC power source is cut off by mistake, the patient is changed to another bed or the monitor is moved.

In this embodiment, the connection frame 13 is connected to ends of the top plate 1012, the first side plate 1011 and the second side plate 1017 and extends toward a side away from the bottom plate 1013. The top of a side of the connection frame 13 away from the front case 41 is recessed to form the handle 131. Several heat dissipation holes 132 in communication with the accommodation chamber 103 are provided in a position, corresponding to the handle 131, on the connection frame 13. In this embodiment, an inner side wall of the connection frame 13 is provided with several protruding fixed columns 133. The end at a free end of each fixed columns 133 is provided with a screw hole 134. Various functional modules, such as the printing recorder 62, the parameter panel 63 and the function extension module 64, are fixed to the connection frame 13 by means of locking members 135. Particularly, the locking members 135 are used to be locked in the screw hole 134 of the fixed column 133 after passing through a mounting bracket of the functional module. The locking members 135 for example are screws or pins. It may be understood that the fixed columns 133 and the locking members 135 are located outside a snap-fit area on the connection frame 13 for snap-fitted with the front case 41. An top end of the connection frame 13 is provided with an engaging recess 136 for accommodating a second alarm indicator panel 4642. Several loudspeaker holes 137 are provided in the position, corresponding to the loudspeaker assembly 65, on the connection frame 13.

In this embodiment, the main bracket assembly 61 and the parameter panel 63 are both accommodated inside the first accommodation chamber 111, and the printing recorder 62, the function extension module (such as the function extension module 64) and the power module 66 are all accommodated inside the second accommodation chamber 112. The loudspeaker assembly 65 is disposed on the connection frame 13. In this embodiment, the power module 66 is an AC/DC module.

Main Bracket Assembly

Figure 36:
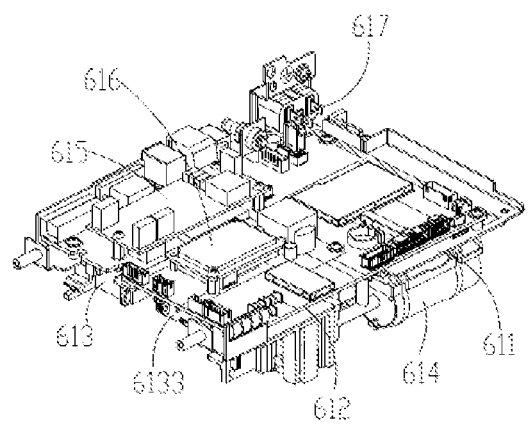
FIG. 36 is a schematic structural diagram of a first implementation of a main bracket assembly of the monitor of FIG. 35.
Figure 37:
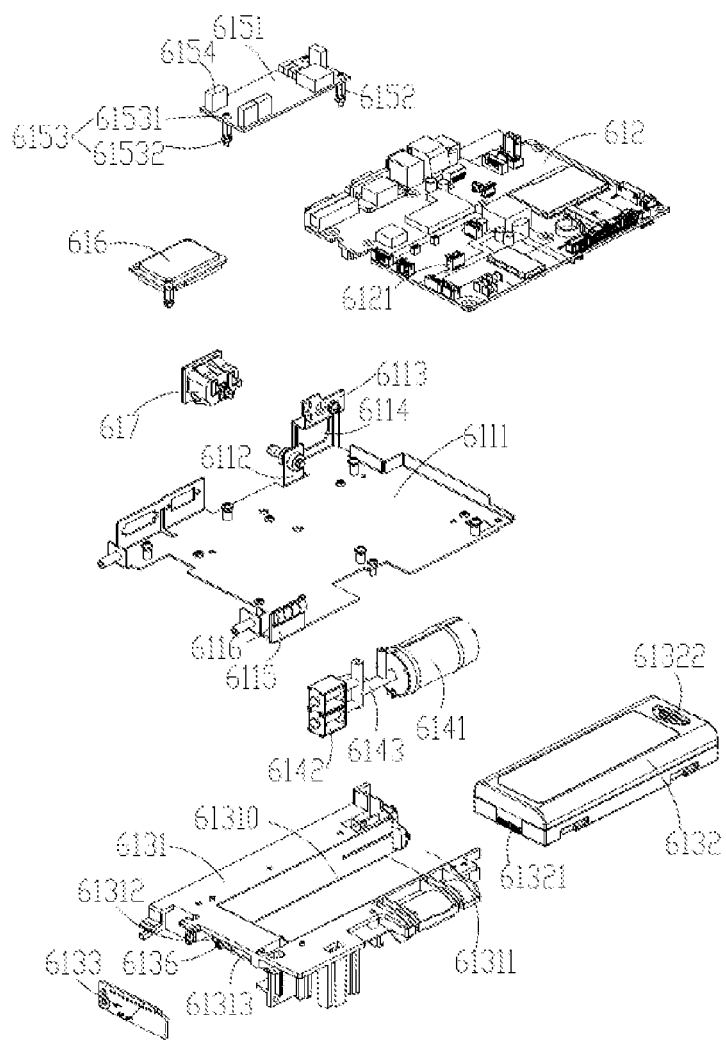
FIG. 37 is an exploded schematic diagram of the structure of the main bracket assembly of FIG. 36.
Figure 38:
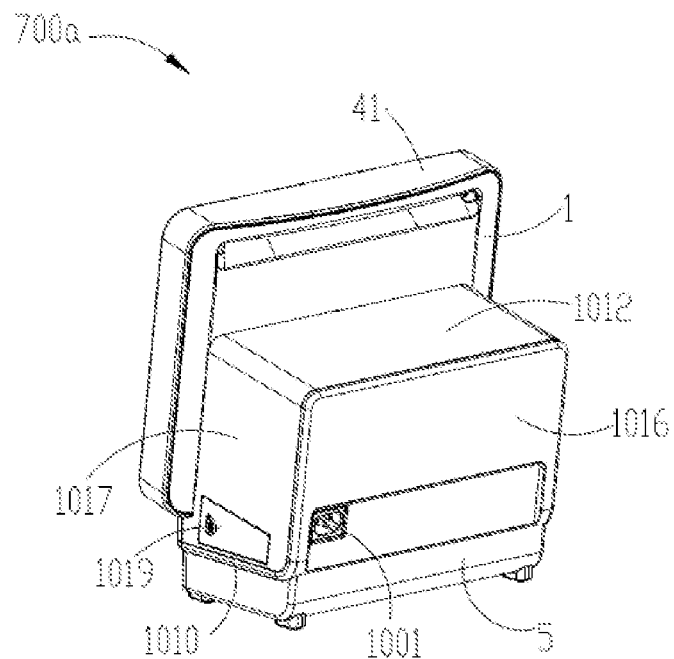
FIG. 38 is a schematic structural diagram of a first implementation of an external battery pack of a monitor provided according to a sixth embodiment of this disclosure.
Figure 39:
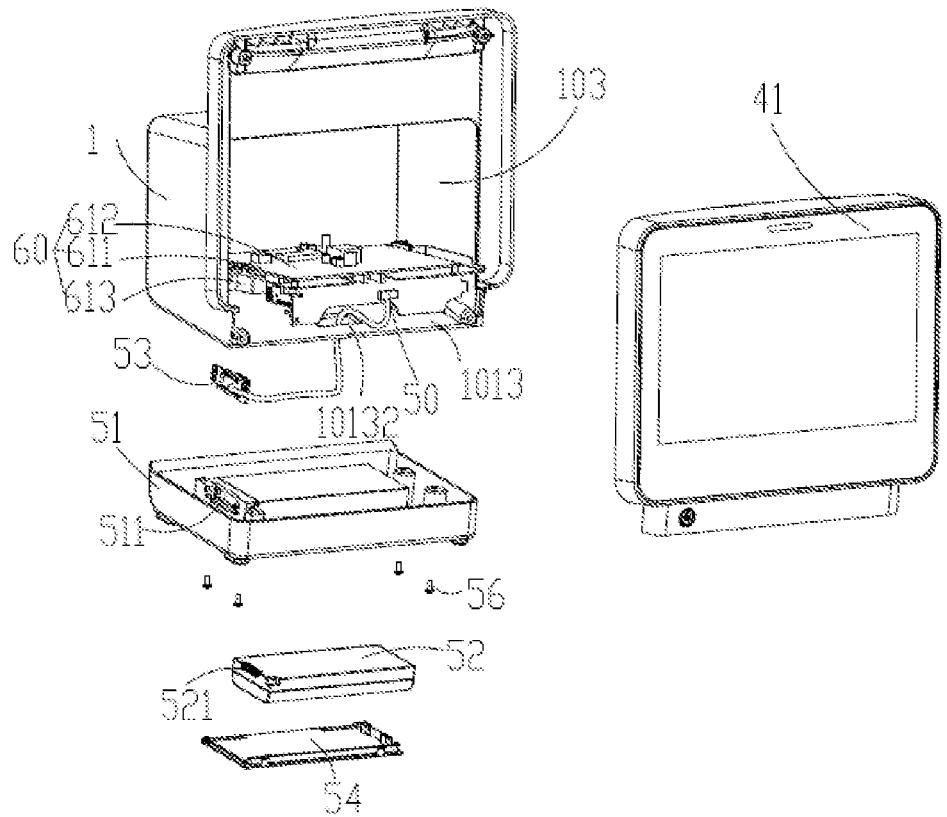
FIG. 39 is an exploded structural diagram of the monitor of FIG. 38.
Figure 40:
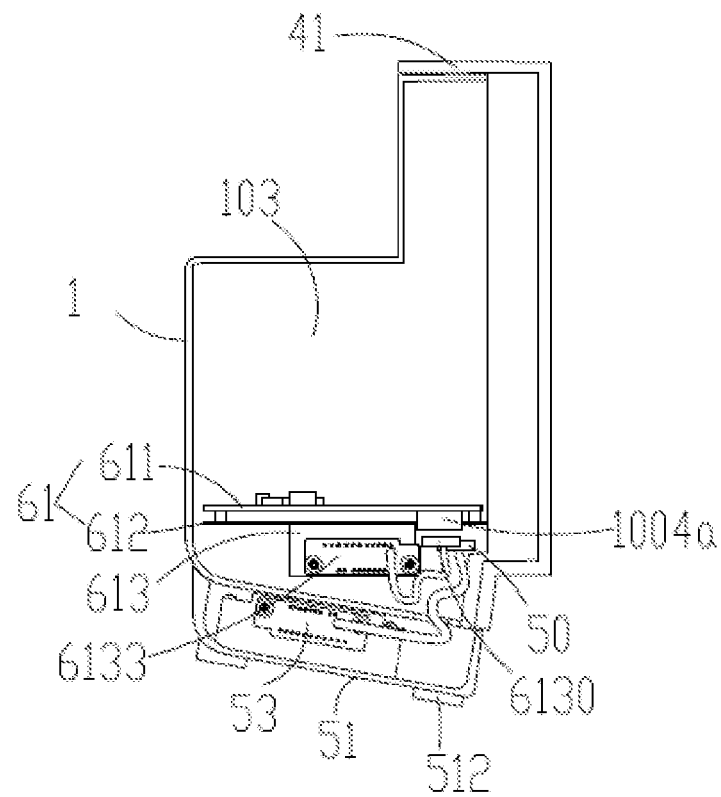
FIG. 40 is a partial section view of the monitor of FIG. 38.
Figure 41:
FIG. 41 is a schematic structural diagram of a main bracket assembly of the monitor of FIG. 40.
Figure 41:
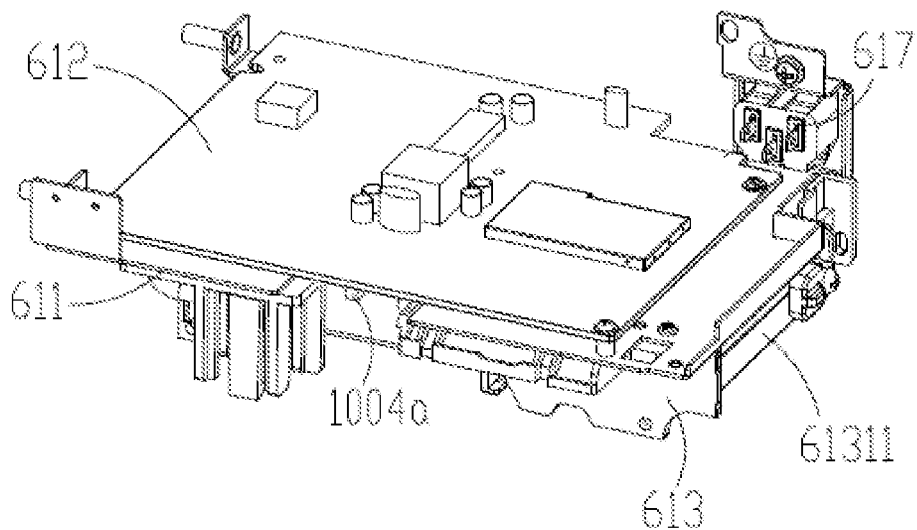
Figure 42:
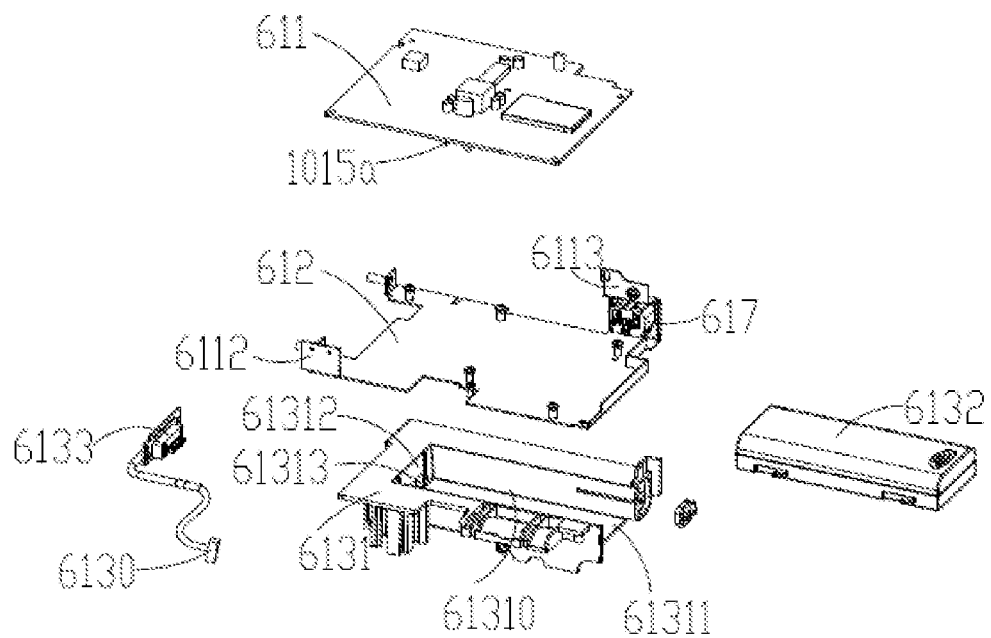
FIG. 42 is an exploded structural diagram of the main bracket assembly of the monitor of FIG. 41.

As shown in FIGS. 35-37, a main bracket assembly 61 is fixed on the back case 11, and the main bracket assembly 61 is perpendicular to the screen assembly 4. The main bracket assembly 61 includes the main bracket 611, the multi-functional integrated circuit board 612, a built-in battery box 613, a pump valve assembly 614 and a power socket 617. The main bracket assembly 61 further includes a first parameter extension board 615 and a second parameter extension board 616. The multi-functional integrated circuit board 612, the first parameter extension board 615, the second parameter extension board 616 and the power socket 617 may be disposed above the main bracket 611. The built-in battery box 613 and the pump valve assembly 614 are disposed under the main bracket 611. The main bracket 611, the multi-functional integrated circuit board 612, the built-in battery box 613, the pump valve assembly 614, the first parameter extension board 615, the second parameter extension board 616 and the power socket 617 are connected as a whole to form the main bracket assembly 61 of an integral structure, and are fixed on the back case 11. The first parameter extension board 615 and the second parameter extension board 616 may be fastened to the multi-functional integrated circuit board 612 for measurement of extension parameters. As shown in FIG. 37, the main bracket 611 may be a metallic material, for example, a sheet metal plate, and the main bracket 611 or the main bracket assembly is fixed at the bottom of the back case 11 and is placed approximately horizontally or slightly obliquely. The main bracket 611 is connected to the sheet metal plate 47 for fixing the screen assembly 4 to form a vertical bracket for forming a support keel structure in a plastic case of the monitor, which can enhance the mechanical stability of the whole machine, improve the anti-fall strength and improve the stability. Also, the main bracket 611 may also be used as the grounding of the circuit board, which may be used to release interferences to improve the stability and anti-interference performance of the circuit.

The main bracket 611 includes a support plate 6111 and a carrying plate 6113 disposed on a side of the support plate 6111 away from the front case 41. The main bracket assembly 61 is fixed to the back case 11 by means of the locking connection between the carrying plate 6113 and the back case 11 that is implemented by the locking members. The support plate 6111 is used for supporting the multi-functional integrated circuit board 612, and the carrying plate 6113 is used for mounting the power socket 617. The carrying plate 6113 is provided with an opening 6114 for the power socket 617 to pass. An end of the main bracket 611 corresponding to the screen assembly 4 of the front case 41 is provided with an extended plate 6115. The extended plate 6115 is provided with a grounding tab 6116. In this embodiment, the main bracket 611 is fixed on the back case 11 by means of the carrying plate 6113. Alternatively, the edge of the main bracket 611 extends several connection plates 6112, where each of the connection plates 6112 is fixedly fixed to the back case 11 by means of the locking members so as to further improve the stability of the main bracket 611 fixed on the back case 11. In this embodiment, the locking members are screws or pins. The main bracket 611 is a sheet metal bracket.

It may be understood that the multi-functional integrated circuit board 612 is a circuit board which is integrated with at least the main control board function, the parameter board function, communication switching, a power supply function and the extended interface function, that is, the multi-functional integrated circuit board is integrated with three different types of circuit boards. As such, various board card structures of the monitor 500 are simplified, and the whole structure of the monitor 500 is greatly simplified, the weight is reduced, and the whole machine is ensured to be compact and portable. The main control board is used to coordinate and control the various board cards and devices of the monitor 500. It may be understood that in one embodiment, the multi-functional integrated circuit board 612 is a one-piece circuit board formed by integrating the main control board, the parameter board, and the extended interface. In a further embodiment, the multi-functional integrated circuit board 612 may also be a circuit board formed by splicing the main control board, the parameter board, and the extended interface.

In this embodiment, the main control board is used to control the data interaction and control signal transmission between the parameter board and the communication board, transfer the physiological data to the display screen 40 for display, or receive a user control instruction inputted from the touch screen 42 or a physical input interface such as a keyboard and keys. Alternatively, the main control board may also output a control signal about how to acquire the physiological parameters. The parameter board is mainly used to connect the parameter measurement accessories to obtain the acquired physiological parameter signals, and may include measurement circuits for at least two types of physiological parameters. The parameter board may be, but is not limited to, a physiological parameter measurement circuit (module), a human physiological parameter measurement circuit (module), or a sensor for acquiring human physiological parameters, etc. Particularly, the parameter board obtains a physiological sampled signal related to a patient from an external physiological parameter monitoring accessory through the extended interface, and processes the physiological sampled signal and then get physiological data for giving an alarm and display. The extended interface may also be used to output the control signal about how to acquire the physiological parameters output from the main control board to the external physiological parameter monitoring accessory via a respective interface, thus achieving the monitoring and control of the physiological parameters of the patient.

In this embodiment, the multi-functional integrated circuit board 612 is disposed on the support plate 6111 of the main bracket 611. The multi-functional integrated circuit board 612 is fixed to the main bracket 611 via the mounting structure. A side of the multi-functional integrated circuit board 612 facing away from the main bracket 611 is provided with several board connectors 6121, 6121. These board connectors 6121 include some of at least one pin connector electrically connected to the parameter panel 63, a connector electrically connected to a gas detection module (a mainstream carbon dioxide module and/or a sidestream carbon dioxide module), a power socket, a serial interface, a power interface, a USB interface, a printing recorder interface, a headphone interface, an Internet of Things module interface and a multi-function data interface.

In this embodiment, the built-in battery box 613 is arranged to be isolated from or away from the function extension module 64 to avoid the problem of a reduced measurement accuracy of the function extension module 64 due to the influence of the heat generated by the built-in battery box 613 on the function extension module. The built-in battery box 613 is arranged parallel to the pump valve assembly 614, and is disposed on a side close to the front case 41. The built-in battery box 613 and the pump valve assembly 614 are disposed on a face of the main bracket 611 facing away from the multi-functional integrated circuit board 612, and are fixed to the main bracket 611 via the mounting structure. In other embodiments, the built-in battery box 613 may also be separately fixed to the bottom plate 1013 of the back case main body 14, and the pump valve assembly 614 may also be fixed to the built-in battery box 613.

It may be understood that the built-in battery box 613 and the pump valve assembly 614 are both located at the bottom of the back case 11. Since the built-in battery box 613 and the pump valve assembly 614 which are relatively heavy are disposed at the bottom of the back case 11 and the battery 6132 is disposed parallel to the pump valve assembly 614, the center of gravity of the whole monitor 500 is close to its geometric center. In addition, since the distance between the built-in battery box 613 as well as the pump valve assembly 614 and the parameter panel 63 is short, the possibility of introducing interferences through a long cable is reduced.

The built-in battery box 613 includes a box body 6131 mounted on the main bracket 611, a battery 6132 accommodated inside the box body 6131, and a battery interface board 6133 electrically connected to the battery 6132 and the multi-functional integrated circuit board 612.

The built-in battery box 613 is fixed to the main bracket 611, and encloses a first battery compartment 61310 to accommodate the battery 6132 together with the main bracket 611. The box body 6131 includes an open end 61311 in communication with the opening 1010, and a stop end 61312 arranged opposite the open end 61311. The battery interface board 6133 is disposed on the stop end 61312. The open end 61311 of the built-in battery box 613 is an end close to a battery compartment door 1019 and is just opposite the battery compartment door 1019 to facilitate insertion of the battery 6132.

A side of the battery 6132 close to the stop end 61312 is provided with a battery interface 61321. A top face at a side of the battery 6132 away from the stop end 61312 is provided with an operating port 61322 to facilitate the user to remove the battery 6132 from the box body 6131. The stop end 61312 is provided with an opening 61313, and the battery interface board 6133 is electrically connected to the battery interface 61321 of the battery 6132 through the opening 61313. The battery interface board 6133 is removably fixed to the box body 6131. In this embodiment, the battery interface board 6133 is fixed to the box body 6131 by means of several locking members 2134.

It may be understood that the built-in battery box 613 may provide all required power conversion and distribute required power to the monitor 500. As such, when there is a short-term power supply interruption, the DC power source is cut off by mistake, the patient is changed to another bed or the monitor is moved, the monitor 500 may operate independently from the DC power source. Alternatively, the built-in battery box 613 may be internally provided with one or more batteries 6132. The monitor 500 automatically charges the battery 6132 in the built-in battery box 613 when it is normally powered by the AC power source. In addition, the battery 6132 is preferably a rechargeable battery, such as a storage battery. In this embodiment, the battery 6132 is a lithium battery. It may be understood that battery 6132 is electrically connected to the AD/DC module via the battery interface board 6133. The AD/DC module is used for voltage conversion, lithium battery charging management, and power supply for the various board cards and devices of the monitor 500. The AD/DC module may be connected to the battery 6132, the printing recorder 62, the parameter panel 63, the function extension module 64, and the multi-functional integrated circuit board 612 via a cable.

The pump valve assembly 614 includes an air pump 6141, a valve body 6142, and an air pipe 6143 connected to the air pump 6141 and the valve body 6142. The air pump 6141 realizes the connection in air path between the air pipe 6143 and the corresponding parameter panel 63 via the valve body 6142. In this embodiment, the pump valve assembly 614 realizes the power supply and control connection to the parameter panel 63 and the function extension module 64 via the cable. In other embodiments, the pump valve assembly 614 may also use existing configurations. In this embodiment, the pump valve assembly 614 is fixed to the box body 6131 of the built-in battery box 613. In other embodiments, the pump valve assembly 614 may also be separately fixed to the bottom plate 1013 of the back case 11 or mounted on a side of the multi-functional integrated circuit board 612 close to the front case 41.

Referring to FIG. 35 again, the main bracket 611 is guided to be inserted into a chamber of the back case 11 by the support block 10133 disposed on the bottom plate 1013, and is arranged obliquely relative to the bottom plate 1013. There is an included angle between the main bracket 611 and the bottom plate 1013, and because of this oblique arrangement, an included angle space is formed between the main bracket 611 and the bottom plate 1013 for housing the pump valve assembly 614 and/or the built-in battery box 613. Therefore, related functional devices are arranged in the limited internal space of the monitor as much as possible, thereby reducing the volume of the whole machine.

As shown in FIG. 37, the first parameter extension board 615 and the second parameter extension board 616 are disposed on a side of the multi-functional integrated circuit board 612 facing away from the main bracket 611. The first parameter extension board 615 and the second parameter extension board 616 are connected to the multi-functional integrated circuit board 612 via board-to-board connectors. The first parameter extension board 615 and the second parameter extension board 616 are arranged at intervals. It may be understood that the first parameter extension board 615 and the second parameter extension board 616 are respectively used to connect extension accessories. The extension accessories are connected to the multi-functional integrated circuit board 612 via the first parameter extension board 615 and/or the second parameter extension board 616 to implement the functions of the extension accessories. The extension accessories may be physiological monitoring accessories, including at least one accessory device or measuring circuit for measuring physiological parameters such as ECG signal, blood oxygen signals, blood pressure signals, body temperature, and respiration.

The first parameter extension board 615 includes a first board body 6151, a first support rod 6152 disposed under the first board body 6151, and several locking members 6153 for connecting the first board body 6151 and the multi-functional integrated circuit board 612. The first support rod 6152 is a hollow barrel-shaped structure. In this embodiment, the locking member 6153 includes a screw 61531 and a nut 61532 mating with the screw 61531. One end of the screw 61531 is engaged with the nut 61532 after passing through the first support rod 6152 and the multi-functional integrated circuit board 612. The first board body 6151 and the multi-functional integrated circuit board 612 are arranged in parallel to avoid scratching with the multi-functional integrated circuit board 612. A side of the first board body 6151 facing away from the multi-functional integrated circuit board 612 is provided with several first connection blocks 6154 that can be plugged into extension slots of the physiological monitoring accessories.

The second parameter extension board 616 has a similar structure to the structure of the first parameter extension board 615 and will not be described redundantly in this step. The difference is that the size and the arrangement of various elements of the second parameter extension board 616 are different from the first parameter extension board 615 to adapt to different physiological monitoring accessories.

Printing Recorder

As shown in FIG. 35, the printing recorder 62 is disposed on a side of the second accommodation chamber 112 away from the recess 102. The printing recorder 62 is a thermo-sensitive printing recorder, and is used to print the data information monitored by the monitor 500 and the processed image information. In this embodiment, the printing recorder 62 is correspondingly disposed at the position of the opening 1018 of the second side plate 1017 and is fixed to the connection frame 13 by means of a fixing bracket 621. In other embodiments, the printing recorder 62 may also be fixed to the second side plate 1017 by means of the fixing bracket 621. The printing recorder 62 passes through the opening 1018 of the second side plate 1017 and exposes from the back case 11. As such, the printing recorder 62 does not need to be fixed by virtue of the main bracket 611 in the monitor 500, so the error in manufacturing or deformation of the main bracket 611 will not affect the use of the printing recorder 62, the mechanism of the main bracket 611 is simplified, and the installation and maintenance of the printing recorder 62 is facilitated. The printing recorder 62 is connected to the multi-functional integrated circuit board 612 via a cable.

Parameter Panel

The parameter panel 63 is disposed on a side of the first accommodation chamber 111 corresponding to the recess 102. The parameter panel 63 is provided with several parameter monitoring interfaces 631 corresponding to the orifices 10150 of the first side plate 1011, and each parameter monitoring interface 631 is electrically connected to the multi-functional integrated circuit board 612 and the pump valve assembly 614 via a cable 632. The parameter panel 63 is fixed to the connection frame 13 of the back case 11 by means of a parameter bracket 631. In other embodiments, the parameter panel 63 may also be fixed to the first side plate 1011 by means of the mounting structure. In a particular embodiment, the parameter panel 63 is engaged to the parameter bracket 631. A connection plate 6331 extends perpendicularly outward from an end of the parameter bracket 631 away from the cable 632. The connection plate 6331 is provided with several through holes 6332, locking holes 6025 are provided in positions, corresponding to the through holes 6332, in the connection frame 13, and the locking members 135 are locked into the locking holes 6025 of the connection frame 13 after passing through the through holes 6332, such that the parameter panel 63 is fixedly connected to the back case 11.

Function Extension Module

The function extension module 64 (such as a carbon dioxide module) may be disposed on a side in the second accommodation chamber 112 close to the front case 41, and is fixedly disposed on the connection frame 13 of the back case 11. In one embodiment, the function extension module 64 is disposed between the parameter panel 63 and the printing recorder 62, and is at a distance from the parameter panel 63 greater than that from the printing recorder 62, such that the function extension module 64 is accommodated inside the second accommodation chamber 112 to achieve a more compact monitor 500. In a further embodiment, the function extension module 64 may also be disposed at a position, corresponding to the recess 102, on the connection frame 13, or at a position, corresponding to the accommodation compartment 20, on the back case 11, such that the function extension module 64 is accommodated inside the first accommodation chamber 111 in such a way that the function extension module is at a distance from the parameter panel 63 smaller than that from the printing recorder 62, so as to shorten the length of a cable for connecting the parameter panel 63 and the function extension module 64.

In the embodiment as shown in FIGS. 21 and 35, the function extension module 64 (such as the carbon dioxide module) may also be fixed to the connection frame 13 by means of a hanger bracket 641. In order to save more space occupied, a side of the hanger bracket 641 where the function extension module is fixed on is located in the second accommodation chamber 112, a side of the hanger bracket 641 facing away from the function extension module faces the front case 41, and the hanger bracket 641 is fixed to the back case 11 and in particular to the connection frame 13 of the back case 11. The function extension module 64 may be a mainstream carbon dioxide module, a sidestream carbon dioxide module, or a microfluidic carbon dioxide module. In other embodiments, the function extension module 64 may also include the mainstream carbon dioxide module, the sidestream carbon dioxide module and the microfluidic carbon dioxide module. It may be understood that since the function extension module 64 is sensitive to temperature, the function extension module 64 is away from assemblies that generate a large amount of heat, such as the built-in battery box 613. It can be seen that all gas detection modules for gas measurement may be fixed using the above-mentioned installation method of the function extension module 64, so as to avoid close contact with a heat dissipation source in a narrow space within the monitor. Therefore, in some embodiments, the function extension module (such as the function extension module 64) may be hung in an accommodation space above the main bracket assembly 61 and is located in the accommodation chamber 103. Of course, in some embodiments, the mainstream function extension module 641 and/or the sidestream function extension module 642 may also be directly fixed to the connection frame 13 of the back case 11 and is hung in the accommodation space above the main bracket assembly 61. The accommodation space here refers to a space which is in the accommodation chamber 103 and above a face of the main bracket assembly 61 facing away from the bottom plate 1013 of the back case main body 14, i.e., a space which is in the accommodation chamber 103 and above a face of the main bracket assembly 61 facing away from the bottom of the accommodation chamber 103.

Loudspeaker Assembly

The loudspeaker assembly 65 is used to output an alarm sound, or a prompt sound indicative of the operation state of the monitor 500. The loudspeaker assembly 65 is electrically connected to the multi-functional integrated circuit board 612 and is fixed to the connection frame 13 of the back case 11.

Power Module

In this embodiment, the power module 66 is disposed on a side in the second accommodation chamber 112 close to the recess 102, and is separately fixed to the back case main body 14 by means of a power bracket 661. In one embodiment, the power module 66 is fixed by an internal side of the recess wall of the recess 102 by means of the power bracket 661 and is located in the second accommodation chamber 112. The power module 66 is used for the conversion of alternating current and direct current. The power module 66 and the printing recorder 62 are arranged side by side or opposite each other. In this embodiment, the power bracket 661 is generally L-shaped. One end of the fixing bracket 621 is fixed to the back side plate 1016 of the box body structure 12, and the other end of the fixing bracket 621 is fixed to the recess wall of the recess 102. In other embodiments, the power bracket 661 may also be separately fixed to the back side plate 1016 of the back case main body 14, to the recess wall of the recess 102 connected to the second accommodation chamber 112, to the connection frame 13, or to the main bracket 611. The power module 66 is connected to the multi-functional integrated circuit board 612 via a cable or a board-to-board connector.

In summary, in order to reduce the space and avoid the cable tangling, at least one of the power module 66, the printing recorder 62 and the function extension module 64 is located in the accommodation space above the main bracket assembly 61. In one of the embodiments, one of the power module 66, the printing recorder 62 and the function extension module 64 may be hung and fixed in the second accommodation chamber 112.

Internet of Things Module

In addition, as shown in FIG. 35, the monitor 500 further includes the Internet of Things module 67. The Internet of Things module 67 is fixed to the connection frame 13 of the back case 11 and is electrically connected to the multi-functional integrated circuit board 612. In this embodiment, the Internet of Things module 67 can be disposed by the internal side of the recess wall of the recess 102, such that the Internet of Things module 67 is accommodated inside the box body structure 12. Alternatively, the Internet of Things module 67 can be fixed by the internal side of the recess wall of the recess 102 facing the screen assembly 4, and is located inside the accommodation chamber 103 at the position above the function extension module 64. Of course, in some embodiments, the Internet of Things module 67 may also be integrated above the main bracket assembly 61.

External Battery Pack

As shown in FIGS. 37-42, these are schematic structural diagrams of a monitor 700a provided according to a sixth embodiment of this disclosure. The monitor 700a further includes a connection interface 1004a disposed on the functional module 60 and an external battery box 5 for removable connection to the connection interface 1004*a*. The external battery box 5 is used to power the functional module 60 when being connected to the connection interface 1004*a*.

In this embodiment, the functional module 60 includes the multi-functional integrated circuit board 612, where the multi-functional integrated circuit board is a circuit board which is integrated with at least the main control board function, the parameter board function, and the extended interface function, that is, the multi-functional integrated circuit board is integrated with at least three different types of circuit boards. As such, various board card structures of the monitor 700*a* is simplified, and the whole structure of the monitor 700*a* is greatly simplified, the weight is reduced, and the whole machine is ensured to be compact and portable. The main control board function includes at least one main processor and at least one memory for performing data reception and display processing. The parameter board function includes at least one parameter measurement circuit, and the parameter measurement circuit includes one of a blood oxygen measurement circuit, a blood pressure measurement circuit, an ECG respiration measurement circuit, etc. The extended interface circuit includes interface circuits such as a power interface, a data output interface, a network interface.

The external battery box 5 is disposed outside of the accommodation chamber 103 and is fixed on the back case 11. The back case 11 includes the bottom plate 1013 and the top plate 1012 arranged opposite each other, the back side plate 1016 connecting the bottom plate 1013 and the top plate 1012 and facing away from the front case 41, and two second side plates 1017 arranged opposite each other and connecting the bottom plate 1013, the top plate 1012 and the back side plate 1016.

In one embodiment, the external battery box 5 is fixed to the bottom plate 1013 by means of a mounting structure 56. It may be understood that the mounting structure 56 here is, for example, but not limited to a screw, a fastener, or a magnetic attraction structure, and is suitable for the mounting structure in the following embodiments. In other embodiments, the external battery box 5 may also be fixed to the top plate 1012, the back side plate 1016 or the second side plates 1017.

The external battery box 5 includes a connection member 50 connected to the connection interface 1004*a*. It may be understood that in this embodiment, the connection member 50 is a wire-to-board connector, and the connection interface 1004*a* is a board connector mating with the wire-to-board connector. In other embodiments, the connection member 50 may also be a connecting cable, and the connection interface 1004*a* is a cable interface mating with the connecting cable.

The bottom plate 1013 is provided with a first opening 10132 for the connection member 50 to pass. In a particular embodiment, the connection interface 1004*a* is disposed at a position, corresponding to the first opening 10132, on the multi-functional integrated circuit board 612. In other embodiments, the connection interface 1004*a* may also be disposed on a side of the multi-functional integrated circuit board 612 close to the back side plate 1016, and a second opening is provide in a position, corresponding to the connection interface 1004*a*, on the back side plate 1016.

The external battery box 5 further includes a box body 51, and a battery 52 and a battery interface board 53 disposed in the box body 51. The battery 53 is connected to the connection member 50 by means of the battery interface board 53.

The external battery box 51 further includes a cover 54 snap-fitted with the box body 51. The box body 51 and the cover 54 are engaged to form a sealed battery compartment 511, and the battery 52 is accommodated inside the battery compartment 511. A side wall of the battery compartment 511 is provided with an opening 512 for inserting the battery interface board 53.

In this embodiment, the monitor 700*a* further includes the built-in battery box 613 disposed inside the accommodation chamber 103. The built-in battery box 613 includes a connection member 6130 electrically connected to the connection interface 1004*a*. In this embodiment, the connection member 6130 has a structure identical to the structure of the connection member 50 of the external battery box 5, and will not be described here redundantly. The built-in battery box 613 further includes the box body 6131 for accommodating the battery 6132 and the battery interface board 6133. The battery 6132 is connected to the connection member 6130 by means of the battery interface board 33.

In this embodiment, the built-in battery box 613 is disposed on a side of the main bracket 611 facing away from the multi-functional integrated circuit board 612. The main bracket 611 includes the support plate 6111 for supporting the multi-functional integrated circuit board 612, the connection plate 6112 extending upward from a left side at the edge of the support plate 6111, and the carrying plate 6113 extending upward from a right rear side at the edge of the support plate 6111 and for mounting a socket 617. In this embodiment, the box body 6131 is fixed on the main bracket 611 by means of the mounting structure, and the main bracket 611 is fixed on the back case 11 by means of the connection plate and/or the carrying plate 6113. In other embodiments, the box body 6131 may also be directly fixed on the back case 11 by means of the mounting structure.

The box body 6131 and the support plate 6111 of the main bracket 611 enclose the battery compartment 61310 to accommodate the battery 6132. The opening 1010 is provided in a position, corresponding to the built-in battery box 613, on the second side plate 1017 of the back case 11, and the battery 6132 is inserted into the box body 6131 through the opening 1010. The box body 6131 includes the open end 61311 in communication with the opening 1010, and the stop end 61312 opposite the open end 61311. The battery interface board 6133 is disposed on the stop end 61312. The stop end 61312 is provided with the opening 1010 for inserting the battery interface board 6133. The back case 11 is provided with the battery compartment door 1019 at the opening 1010 for covering the opening 1010 or exposing the opening 1010.

It may be understood that the monitor 700*a* further includes the socket 617 for connection to the DC power source. When the socket 617 of the monitor 700*a* is connected to the AC power source, the battery 6132 in the built-in battery box 613 and the battery 52 in the external battery box 5 will be automatically charged until they are fully charged, such that the monitor 700*a* may operate independently from the DC power source and it is possible to maintain the monitor 700*a* to continuously detect vital signs for a long time, when there is a short-term power supply interruption, the DC power source is cut off by mistake, the patient is changed to another bed or the monitor is moved.

Figure 43:
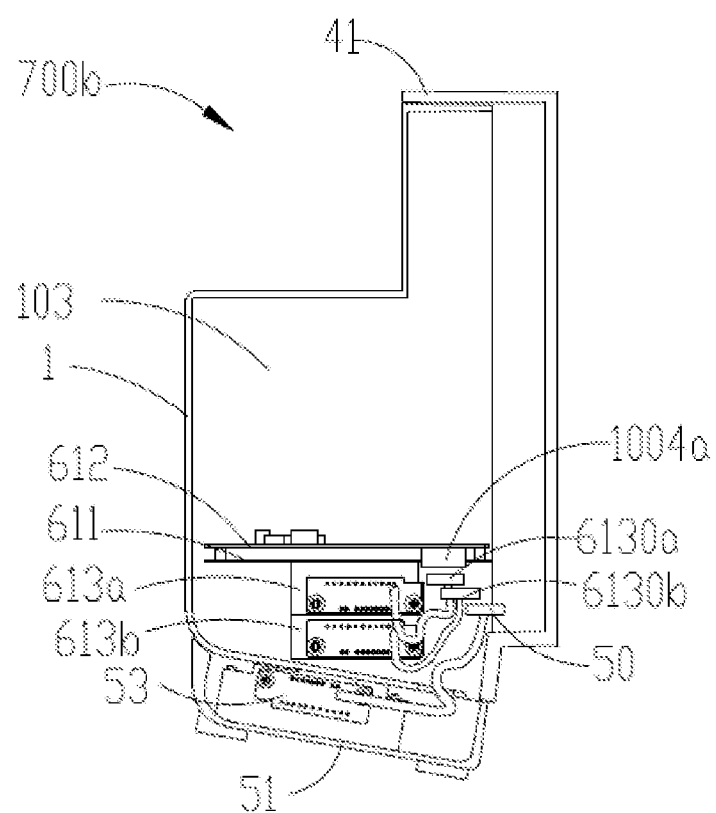
FIG. 43 is a partial section view of a second implementation of an external battery pack of a monitor provided according to a sixth embodiment of this disclosure.
Figure 44:
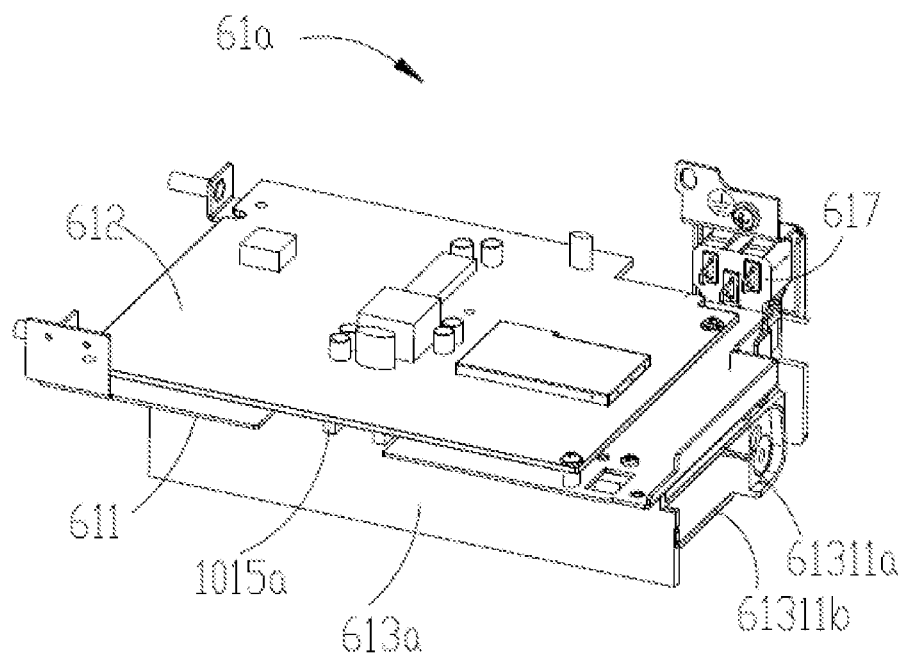
FIG. 44 is a schematic structural diagram of the main bracket assembly of the monitor of FIG. 43.
Figure 45:
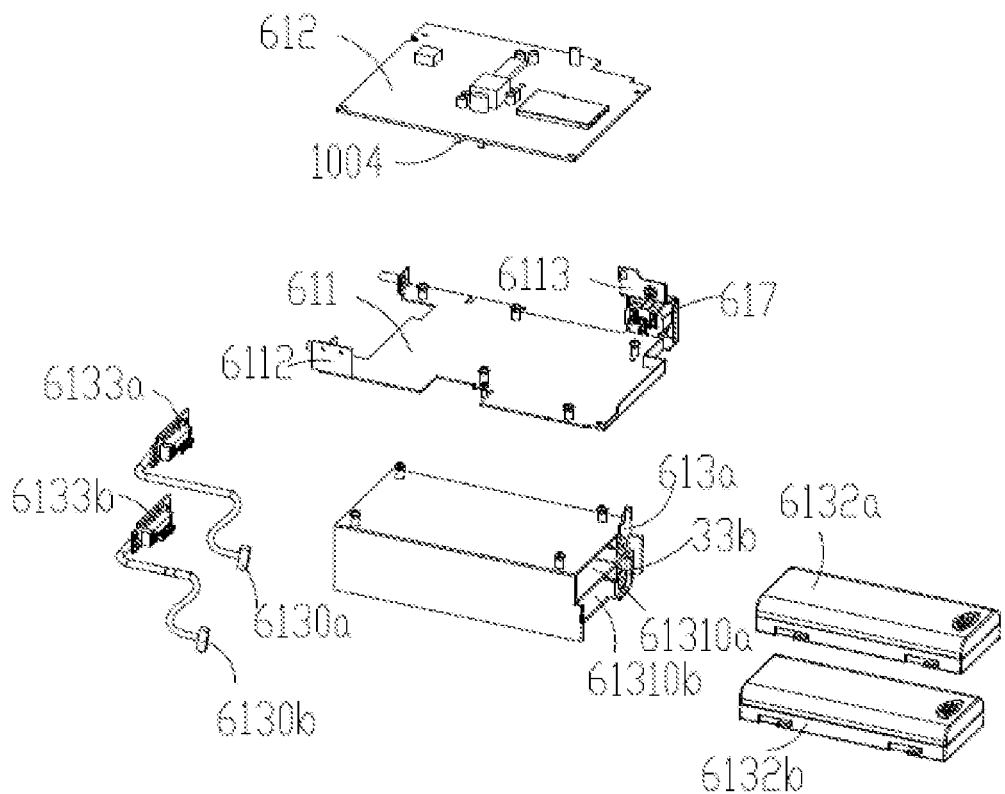
FIG. 45 is an exploded structural diagram of the main bracket assembly of the monitor of FIG. 44.

Referring to FIGS. 43-45, the second embodiment of this disclosure provides another monitor 200. In the second embodiment, the monitor 200 has a similar structure similar to the structure of the monitor 700*ab* of the first embodiment, except that in the second embodiment, the main bracket assembly 61a is different from the main bracket assembly 61 in the first embodiment. That is, the main bracket assembly 61a includes a first built-in battery box 613a and a second built-in battery box 613b, and the first built-in battery box 613a and the second built-in battery box 613b are arranged in a stacking manner.

The first built-in battery box 613a and the second built-in battery box 613b are integrally formed, that is, a first box body 6131a and a second box body 6131b are integrally formed. In other embodiments, the first built-in battery box 613a and the second built-in battery box 613b are detachably sleeved together. The first built-in battery box 613a and the second built-in battery box 613b are fixed on a side of the main bracket 611 facing away from the multi-functional integrated circuit board 612 by means of the mounting structure.

In this embodiment, the first built-in battery box 613a includes a connection member 6130a electrically connected to the connection interface 1004a. The second built-in battery box 613b includes a connection member 6130b electrically connected to the connection interface 1004a.

The first built-in battery box 613a further includes a first battery 6132a and a first battery interface board 6133a. The first battery 6132a is connected to the connection member 6130a by means of the first battery interface board 6133a. The first built-in battery box 613a includes a battery compartment 61310a for accommodating the first battery 6132a. The first built-in battery box 613a includes an open end 61311a in communication with the opening 1010, and a stop end opposite the open end 61311a, and the battery interface board 6133a is disposed on the stop end. The stop end is provided with an opening for inserting the battery interface board 6133.

The second built-in battery box 613b has a structure identical to the structure of the first built-in battery box 613a, and will not be described here redundantly. When the battery compartment door 1019 covers the opening 1010 of the second side plate 1017, the battery compartments 61310a and 61310b of the first built-in battery box 613a and the second built-in battery box 613b are closed to fix the first battery 6132a and the second battery 6132b.

It may be understood that in one embodiment, the first battery 6132a and the second battery 6132b are respectively movably mounted in the first built-in battery box 613a and the second built-in battery box 613b. For example, a first battery compartment 61310a and a second battery compartment 61310b may be internally provided with elastic gripper to facilitate the removal of the first battery 6132a and the second battery 6132b from the first built-in battery box 613a and the second built-in battery box 613b. In addition, in other embodiments, the first battery 6132a and the second battery 6132b may also be fixedly mounted in the first built-in battery box 613a and the second built-in battery box 613b.

Figure 46:
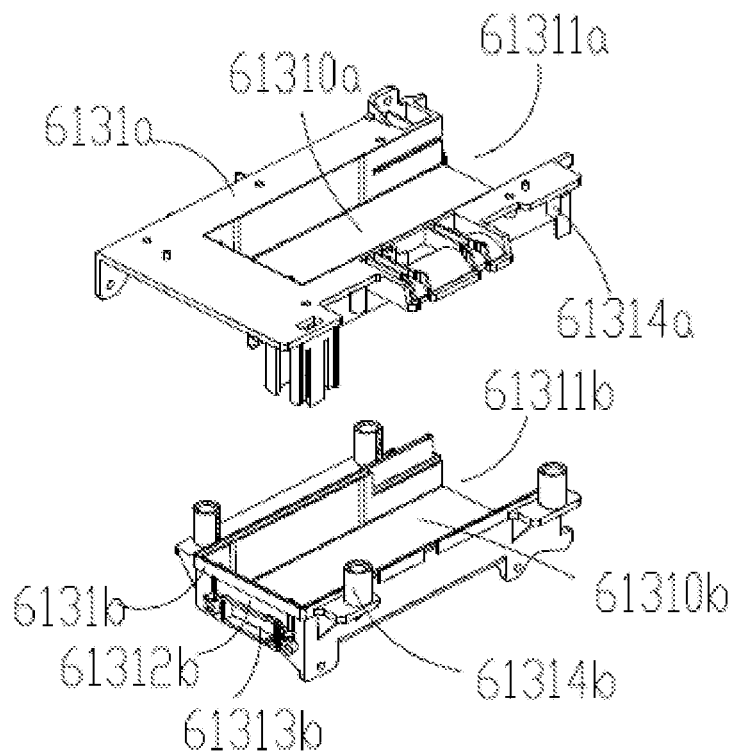
FIG. 46 is a further schematic structural diagram of a box body of the main bracket assembly of the monitor of FIG. 45.

Referring to FIG. 46, FIG. 46 shows a schematic structural diagram of the structure of the first box body 6131a and the second box body 6131b provided according to a further implementation of this disclosure. The first box body 6131a and the second box body 6131b are detachably sleeved together. Particularly, the first box body 6131a is provided with several connection rods 61314a at the periphery of the battery compartment 61310b, and the second box body structure 332a is provided with several sleeves 61314b mating with the connection rods 61314a.

The first box body 6131a and the main bracket 611 enclose the first battery compartment 61310a to accommodate a first external battery, and the second built-in battery box 613b is disposed on the first built-in battery box 613a and encloses the second battery compartment 61310b for accommodating a second external battery with the first built-in battery box 613a.

Alternatively, in other embodiments, the back case may be provided with an opening for inserting an external battery, and the opening is internally provided with a connection interface electrically connected to the external battery. After the external battery is inserted into the opening, a wiring is inserted into an electrical interface inside the monitor for switching. Further, the monitor may fix the external battery to the back case by means of an enclosure, where the enclosure serves as an external battery compartment externally.

For the monitor provided according to the embodiments of this disclosure, by adding an external battery box that is removably disposed on the back case of the monitor, a power source can be provided when the power supply for the monitor is interrupted, such that the monitor can continuously operate for a long time, and can monitor vital signs for a long distance and a long time. In addition, the external battery box is removably disposed on the monitor, which is more flexible in use and brings a lot of convenience to monitoring work. Further, the accommodation chamber of the monitor is internally provided with one or more built-in battery boxes, that is, the monitor has both a built-in battery box and an external battery box, such that the monitor has a more durable time of endurance and can monitor vital signs for a long distance and a long time.

Accommodation Compartment

Figure 47:
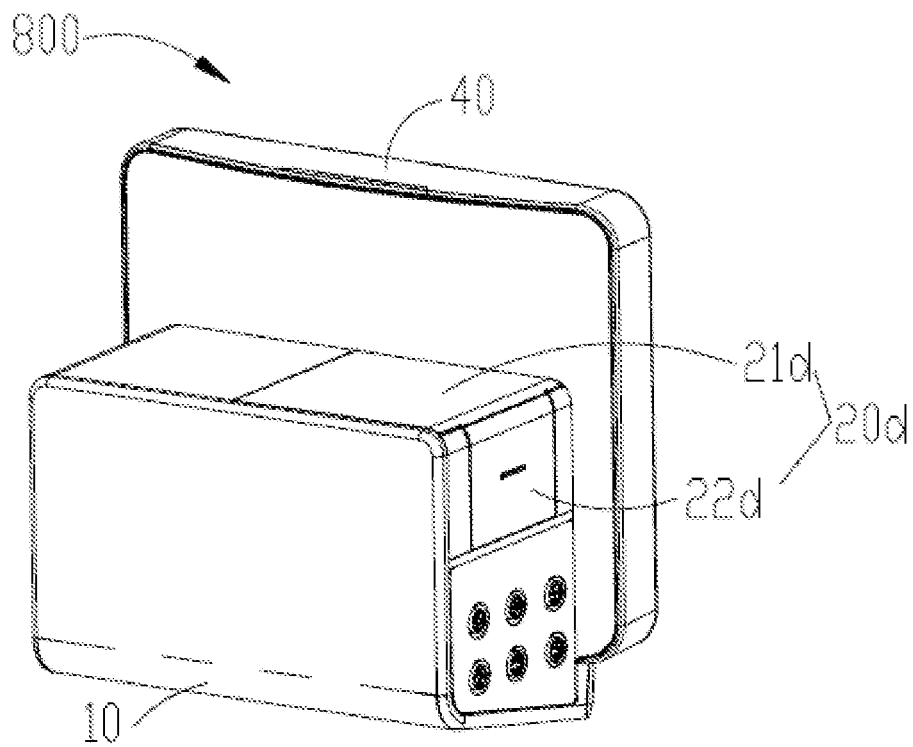
FIG. 47 is a schematic structural diagram of a first implementation of an accommodation compartment of a monitor provided according to a seventh embodiment of this disclosure.

As shown in FIG. 47, it is a schematic structural diagram of the first implementation of the accommodation compartment 20d of a monitor 800 provided according to embodiments of this disclosure. The monitor 800 includes a host part 10 and an accommodation compartment 20d disposed on the host part 10. The host part 10 obtains a parameter measurement signal from a parameter measurement accessory attached to a human body and outputs the parameter measurement signal to a display screen for display. The accommodation compartment 20d includes a compartment body 21d and a compartment door 22d. The compartment door 22d is movably connected to the compartment body 21d. When the compartment door 22d is turned over toward the interior of the compartment body 21d and abuts against the compartment body 21d, an available space is formed between the compartment door 22d and the compartment body 21d, thereby improving the space utilization of the monitor 800.

Compartment Door of the Accommodation Compartment

Figure 48:
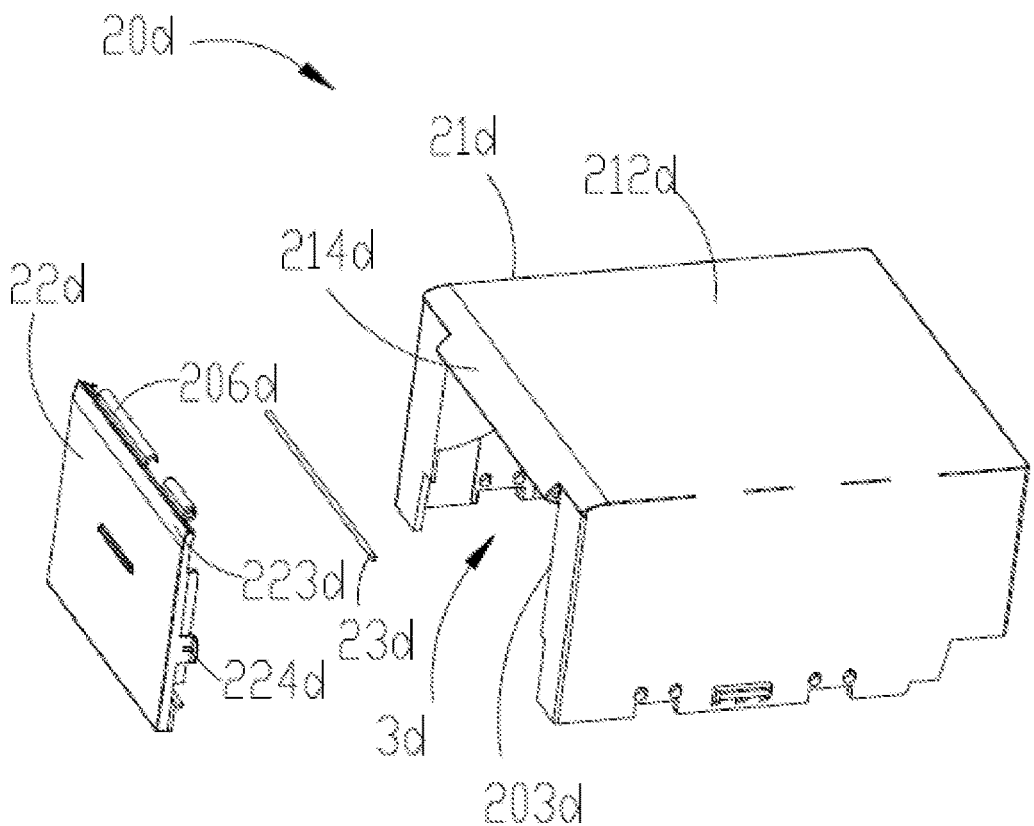
FIG. 48 is an exploded perspective view of the accommodation compartment of the monitor of FIG. 47.
Figure 49:
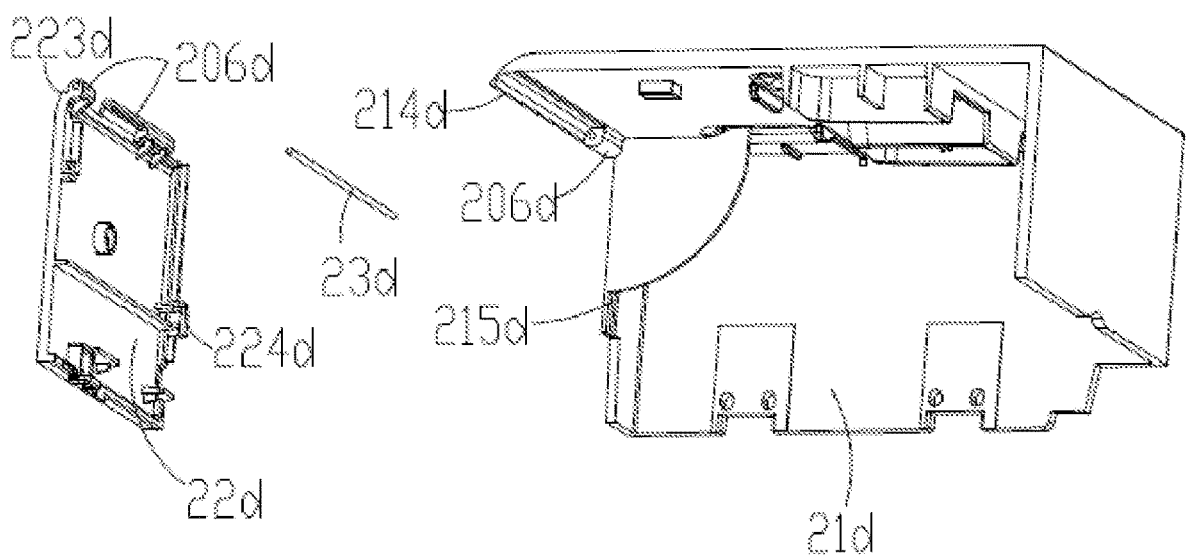
FIG. 49 is an exploded perspective view of a partial structure of the accommodation compartment of the monitor of FIG. 48 from another perspective.

Referring to FIGS. 48 and 49, FIGS. 48 and 49 show schematic structural diagrams of the accommodation compartment 20d or the movable compartment body 2a provided according to the first implementation of this disclosure. The accommodation compartment 20d or the movable compartment body 2a includes the compartment body 21d. The compartment body 21d includes a top plate 212d, and the compartment door 22d is movably connected to the top plate 212d. When the compartment door 22d is turned over toward the interior of the compartment body 21d and abuts against the top plate 212d, an available space 208e is formed between the compartment door 22d and the top plate 21d (see FIG. 54).

In this implementation, the accommodation compartment 20d is used to house a box body of the medical article, where the medical article includes, but is not limited to, a parameter measurement function extension module, a storage box for a medical article, a physiological parameter monitoring accessory, or an adapter module for a third-party device. The physiological parameter monitoring accessory includes at least one accessory device for measuring physiological parameters such as ECG signals, blood oxygen signals, blood pressure signals, body temperature, and respiration. In this implementation, the monitor 800 may be a portable monitor. The portable monitor further includes a display screen 40 used for a user to input control instructions to realize human-computer interaction. For example, in response to the user's gesture touch, the display content such as menu switch or pop-up switch for parameter setup window may be correspondingly displayed on the display screen 40. The display screen 40 may also be used to display data information monitored by the monitor 800 and processed image information, such that the user knows the monitored information more intuitively. It may be understood that, in other implementations, the monitor 800 may also be another type of monitor, for example, a monitor in which a host and a display are physically separated.

In this implementation, the accommodation compartment 20d is of a semi-open chamber structure. The accommodation compartment 20d further includes a connection member 23d, and the compartment door 22d is movably connected to a top plate 212d of the compartment body 21d via the connection member 23d. The connection member 23d is removably disposed on the compartment body 21d and the compartment door 22d, and the compartment door 22d can turn relative to the connection member 23d.

The compartment body 21d is provided with an accommodation space 3d that accommodates the medical article. The compartment body 21d is provided with an opening 203d at a position corresponding to the compartment door 22d, and the medical article 30 passes through the opening 203d and is electrically connected to the host part 10. The opening 203d of the compartment body 21d can be closed or exposed by the compartment door 22d. When the compartment door 22d is in an open state, the medical article can enter and exit the accommodation space 3d of the compartment body 21. When the compartment door 22d covers the opening 203d, the compartment door 22d is connected to and flush with a side plate of the main case 10, which can prevent dust from entering the accommodation compartment 20d to result in inconvenient cleaning.

Figure 50:
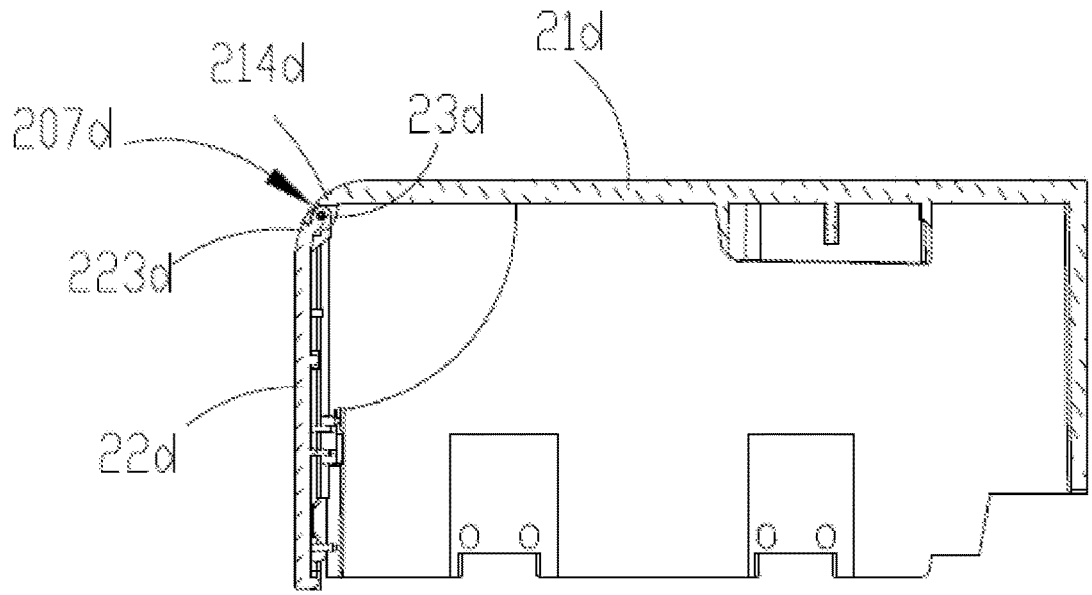
FIG. 50 is a section view of the accommodation compartment of the monitor of FIG. 47 with a compartment door in a closed state.
Figure 51:
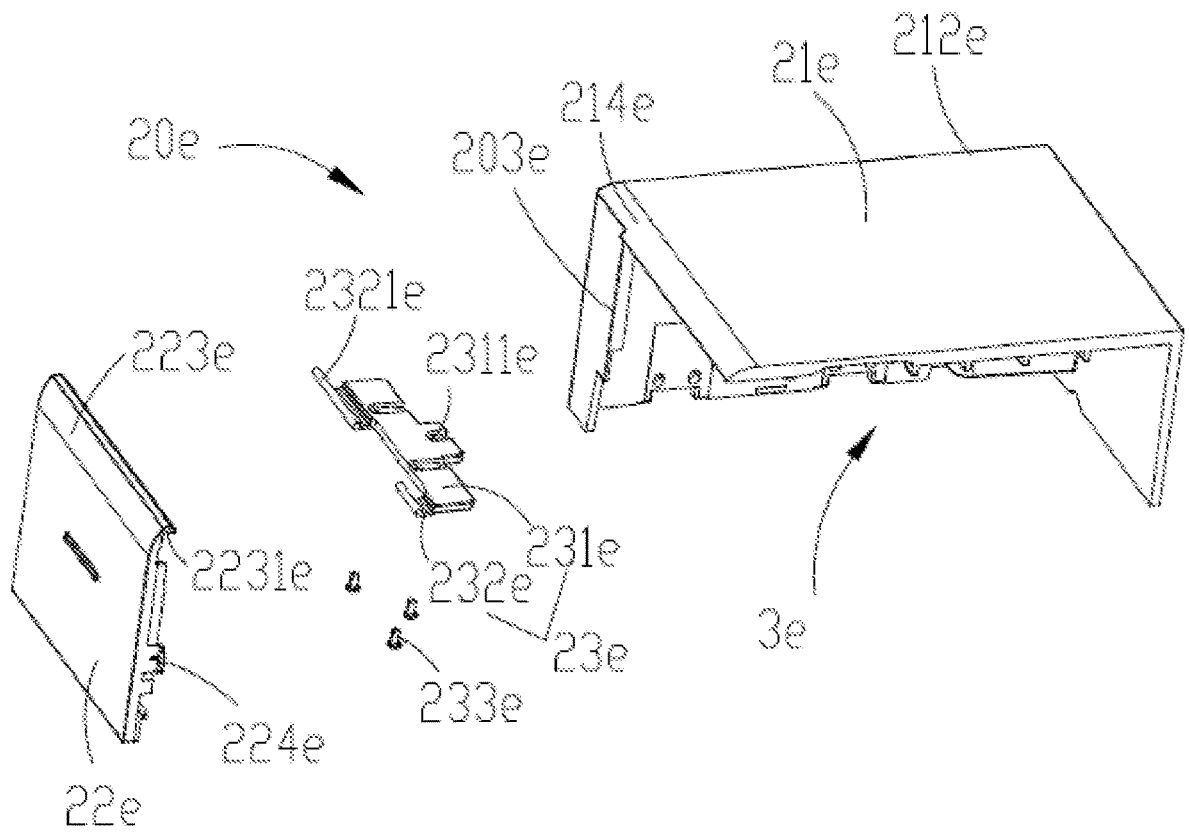
FIG. 51 is an exploded perspective view of a second implementation of an accommodation compartment of a monitor provided according to a seventh embodiment of this disclosure.
Figure 52:
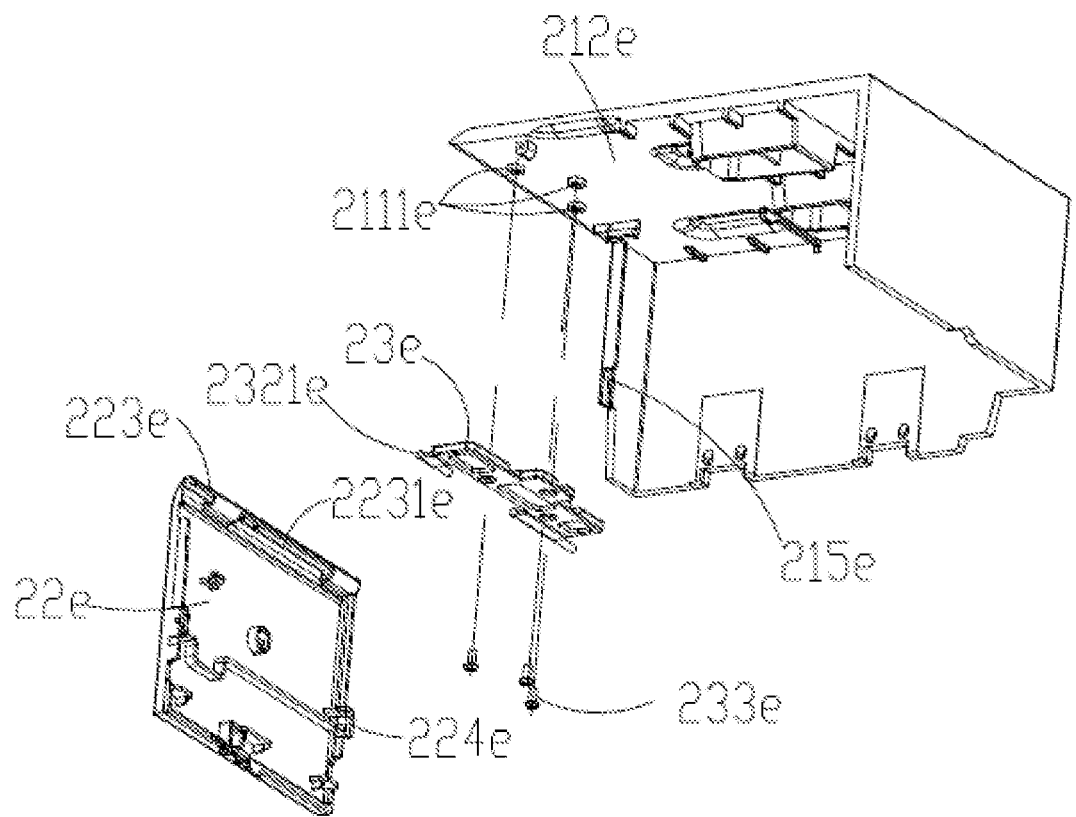
FIG. 52 is an exploded perspective view of a partial structure of the accommodation compartment of the monitor of FIG. 51 from another perspective.

The end of the top plate 212d of the compartment body 21d close to the compartment door 22d extends downward to form an arc-shaped bend 214d. Alternatively, in order to enlarge the available space that is enclosed by the compartment body 21d and the compartment door 22d when the compartment door 22d is in an open state, the top of the compartment door 22d is provided with an arc-shaped bend 223d extending toward the bend 214d. An inner side of the bend 214d of the compartment body 21d and a free end of the bend 223d of the compartment door 22d are provided with several cylinders 206d staggered with each other. The connection member 23d passes through the several cylinders 206d such that the compartment door 22d is movably connected to the compartment body 21d. It may be understood that the inner side of the bend 214d refers to a side face of the bend 214d facing the accommodation space 3d of the compartment body 21d, and the free end of the bend 223d refers to the end of the compartment door 22d close to the top plate 212d. In this embodiment, the connection member 23d is a pivot. As shown in FIG. 50, when the compartment door 22d is connected to the compartment body 21d, a lateral surface of the bend 214d of the compartment door 22d of the compartment body 21d is connected to a lateral surface of the bend 223d of the compartment door 22d to form a continuous curved surface 207d (as shown in FIG. 50).

It can be understood that, in this embodiment, the bend 214d of the compartment body 21d and the bend 223d of the compartment door 22d extend toward each other. Therefore, after the compartment door 22d is turned over toward the interior of the accommodation space 3d relative to the compartment body 21d, the compartment door 22d and the top plate 212d of the compartment body 21d are not completely superimposed, that is, an available space is formed between the compartment door 22d and the top plate 212d of the compartment body 21d to improve the space utilization of other elements. For example, a retaining structure or an engaging structure, such as a magnetic attraction structure, is provided between the top plate 212d and the compartment door 22d.

Alternatively, in order to further enlarge the available space that is enclosed by the compartment body 21d and the compartment door 22d when the compartment door 22d is in the open state, the axis of rotation about which the compartment door 22d moves relative to the compartment body 21d is located on one side of the central axis of the connection member 23d away from the compartment body 21d. It can be understood that, in this embodiment, the central axis of the connection member 23d refers to the axis of rotation about which the compartment door 22d moves relative to the connection member. The axis of rotation is parallel to the central axis such that the compartment door 22d turns relative to the compartment body 21d. The axis of rotation about which the compartment door 22d moves relative to the compartment body 21d is aligned with the overlapping between the compartment door 22d and the compartment body 21d. The axis of rotation about which the compartment door 22d moves relative to the compartment body 21d is located at the connection position between the lateral surface of the compartment body 21d and the lateral surface of the compartment door 22d.

Further, at least one side wall of the compartment door 22d is provided with a hook 224d, and at the position where the compartment body 21d corresponds to the hook 224d, a bar 215d that stops against the hook 224d is provided so as to prevent the compartment door 22d from turning outward when the opening 203d of the compartment body 21d is closed. The hook 224d is generally L-shaped.

Referring to FIGS. 51 to 54, these are schematic structural diagrams of an accommodation compartment 20e provided according to the second implementation of this disclosure. In the second implementation, a connection member 23e of the accommodation compartment 20e is fixedly disposed on a top plate 212e of the compartment body 21e, and the compartment door 22e is movably connected to the connection member 23e.

In this implementation, the connection member 23e is a profiled plate. The connection member 23e includes a fixed portion 231e and a hinged portion 232e. The fixed portion 231e of the connection member 23e is fixed to the top plate 212e of the compartment body 21e by means of the mounting structure 233e, and the hinged portion 232e of the connection member 23e is hinged to the compartment door 22e. Alternatively, the hinged portion 232e and the top plate 212e of the compartment body 21e are located in the same plane on the side close to the compartment door 22e. The mounting structure 233e is, for example, but not limited to a screw, a magnetic attraction structure, glue, etc. In this implementation, the mounting structure 233e includes several locking members, for example, screws or pins, and the middle of the fixed portion 231e is provided with several through holes 2311e through which the locking members pass. The top plate 212e of the compartment body 21e is provided with locking holes 2111e corresponding to the several through holes 2311e. The locking members pass through the locking holes 2311e and are locked in the locking holes 2111e, such that the connection member 23e is fixed connected to the compartment body 21e.

The hinged portion 232e is a first hooked head 2321e bent toward the top plate 212e and provided at the end of the fixed portion 231 close to an open end 212e. The top of the compartment door 22e is provided with an arc-shaped bend 223e extending toward the bend 214e. An inner side of the free end of the bend 223e is provided with a second hooked head 2211e that mates with the first hooked head 2321e of the hinged portion 232e and turns relative to the first hooked head 2321e. A gap 215e is formed between the hinged portion 232e and the top plate 212e, such that the bend 223e of the compartment door 22e is inserted into the gap 215e and is hinged to the first hooked head 2321e.

Alternatively, an end face of an extreme end of the first hooked head 2321e is substantially arc-shaped, and the face of the second hooked head 2211e that mates with the first hooked head 2321e is also circular arc-shaped, so as to improve the flexibility of movement of the compartment door 22e relative to the compartment body 21e.

Figure 53:
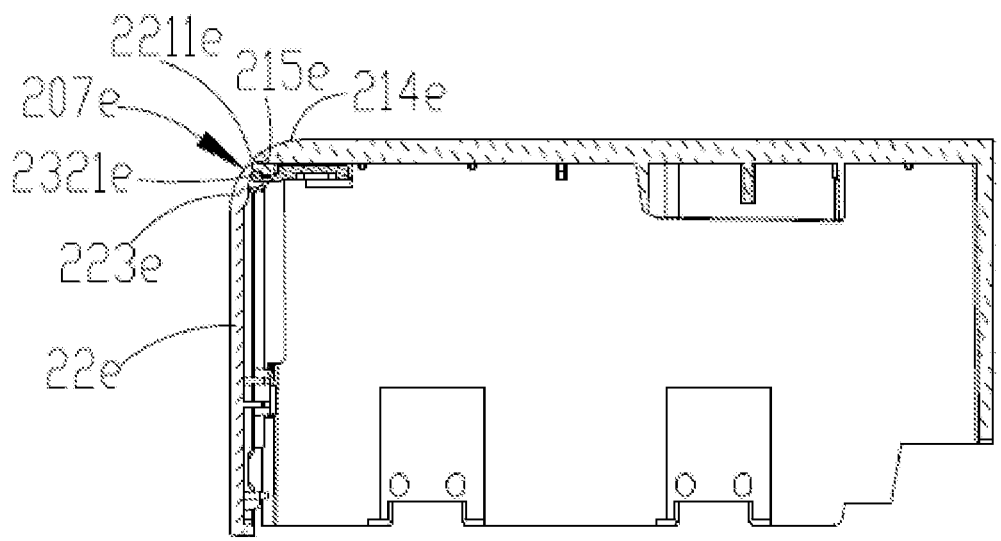
FIG. 53 is a section view of the accommodation compartment of the monitor of FIG. 51 with a compartment door in a closed state.
Figure 54:
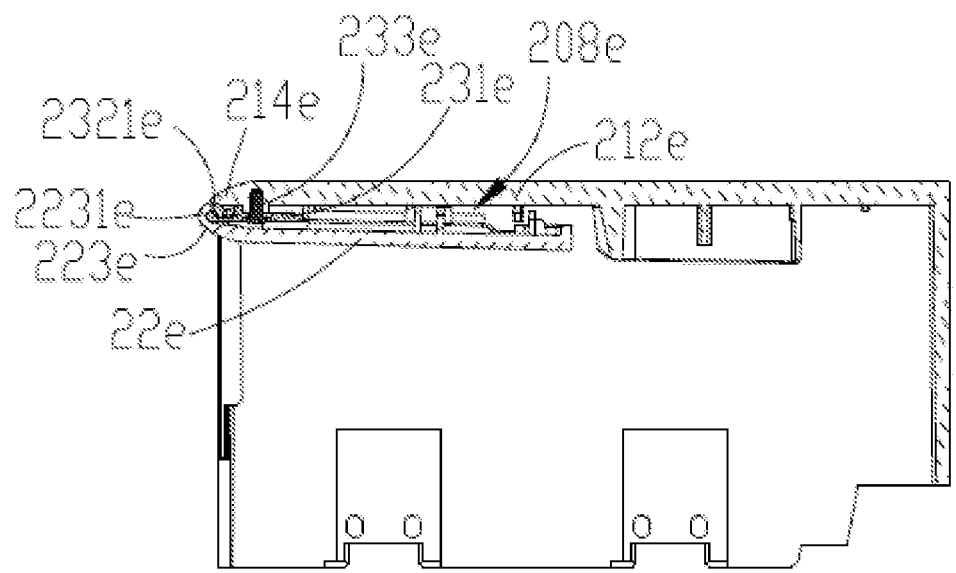
FIG. 54 is a section view of the accommodation compartment of the monitor of FIG. 51 with a compartment door in an open state.

Referring to FIGS. 53 and 54, FIG. 53 shows a section view of the accommodation compartment 20e with the compartment door 22e in a closed state, and FIG. 54 shows a section view of the accommodation compartment 20e with the compartment door 22e in an open state. When the opening 203e of the compartment body 21e is covered by the compartment door 22e, the lateral surface of the bend 214e of the compartment door 22e of the compartment body 21e is connected to the lateral surface of the bend 223e of the compartment door 22e to form a continuous curved surface 207e. When the opening 203e of the compartment body 21e is covered by the compartment door 22e, the first hooked head 2321e supports the second hooked head 2211e of the bend 223e of the compartment door 22e, such that the compartment door 22e is hinged to the hinged portion 232e. When the compartment door 22e exposes the opening 203e of the compartment body 21e, an available space 208e is formed between the compartment door 22e and the top plate 212e of the compartment body 21e. It may be understood that the thickness of the bend 223e of the compartment door 22e is slightly greater than or equal to the gap value of the gap 215e, such that the bend 223e of the compartment door 22e is clamped between the top plate 212e and the first hooked head 2321e. Particularly, when the compartment door 22e is turned over toward the interior of the accommodation compartment 20e and abuts against the top plate 212e of the compartment body 21e, the first hooked head 2321e supports the bend 223e of the compartment door 22e, and the internal surface of the bend 214e of the compartment body 21e stops against the lateral surface of the bend 223e of the compartment door 22e, such that the compartment door 22e is clamped between the top plate 212e and the first hooked head 2321e.

Alternatively, the axis of rotation about which the compartment door 22e moves relative to the compartment body 21e is located on a side of the central axis of the first hooked head 2321e away from the compartment body 21e. The central axis of the first hooked head 2321e refers to the axis of rotation about which the compartment door 22e moves relative to the first hooked head 2321e. The axis of rotation is parallel to the central axis such that the compartment door 22e turns relative to the compartment body 21e. The axis of rotation about which the compartment door 22e moves relative to the compartment body 21e is aligned with the overlapping between the compartment door 22e and the compartment body 21e. The axis of rotation about which the compartment door 22e moves relative to the compartment body 21e is located at the connection position between the lateral surface of the compartment body 21e and the lateral surface of the compartment door 22e.

Further, at least one side wall of the compartment door 22e is provided with a hook 224e, and at the position where the compartment body 21 corresponds to the hook 224e, a bar 215e that stops against the hook 224e is provided so as to prevent the compartment door 22e from turning outward when the opening 203e of the compartment body 21e is closed. The hook 224e is generally L-shaped.

Figure 55:
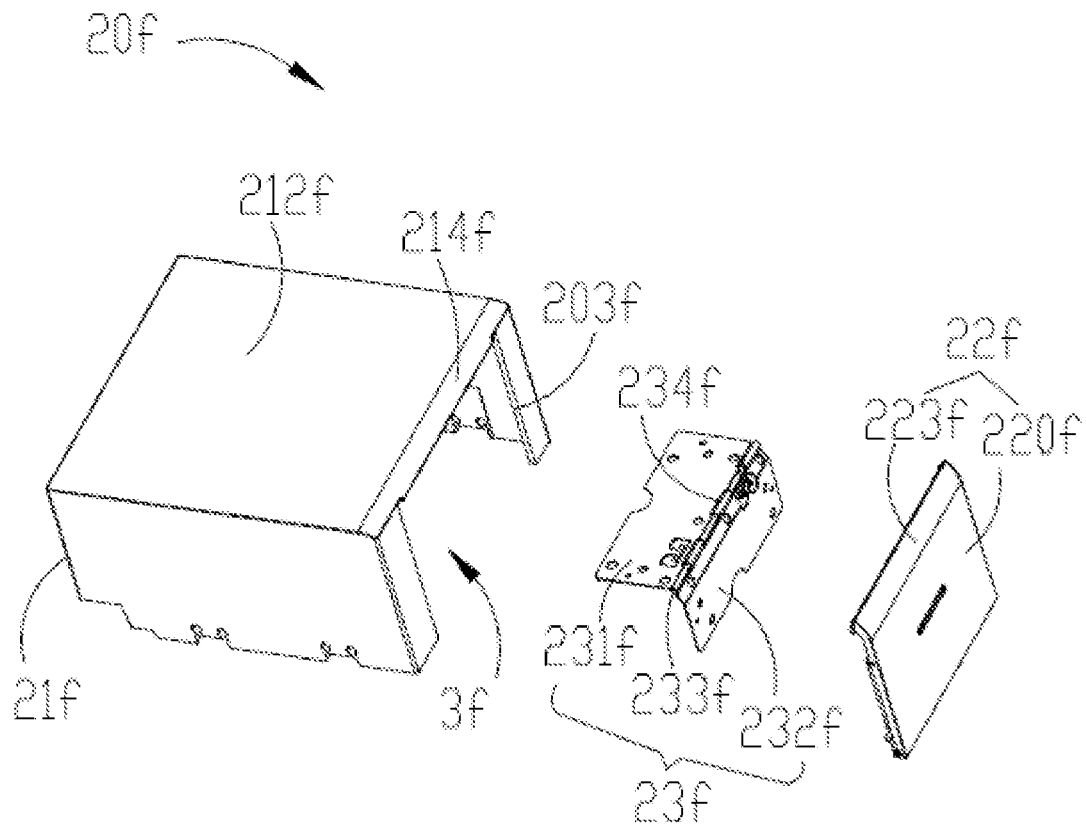
FIG. 55 is an exploded perspective view of a third implementation of an accommodation compartment of a monitor provided according to a seventh embodiment of this disclosure.
Figure 56:
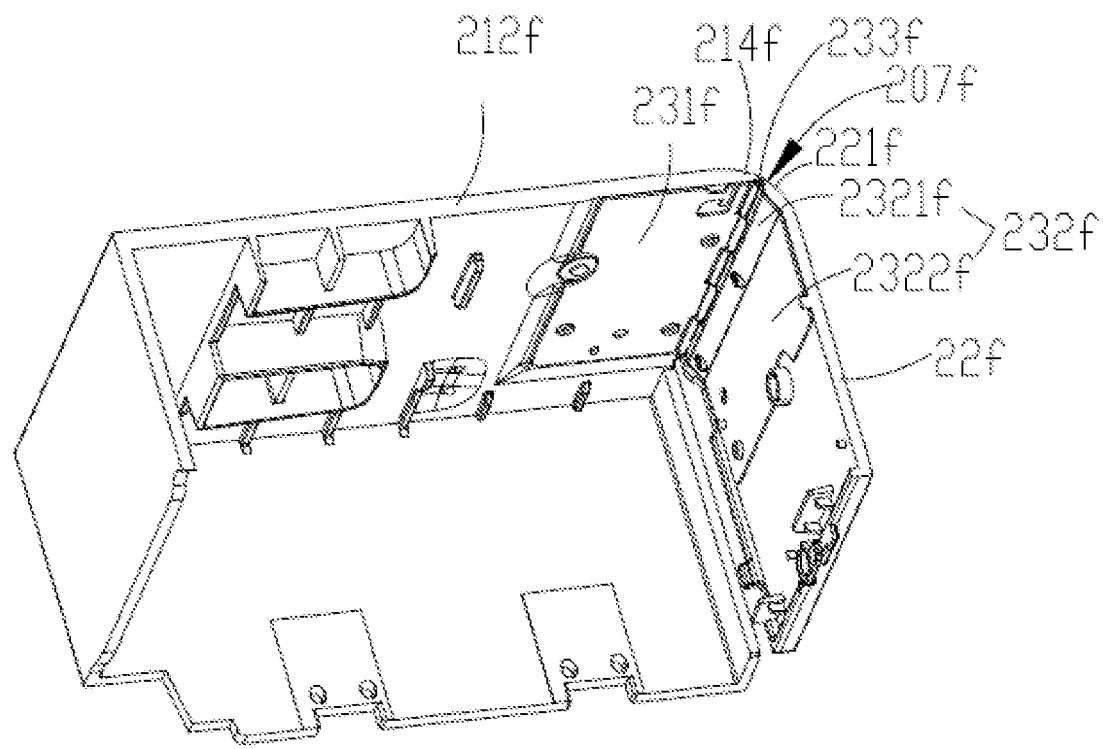
FIG. 56 is an exploded perspective view of a partial structure of the accommodation compartment of the monitor of FIG. 55 from another perspective.
Figure 57:
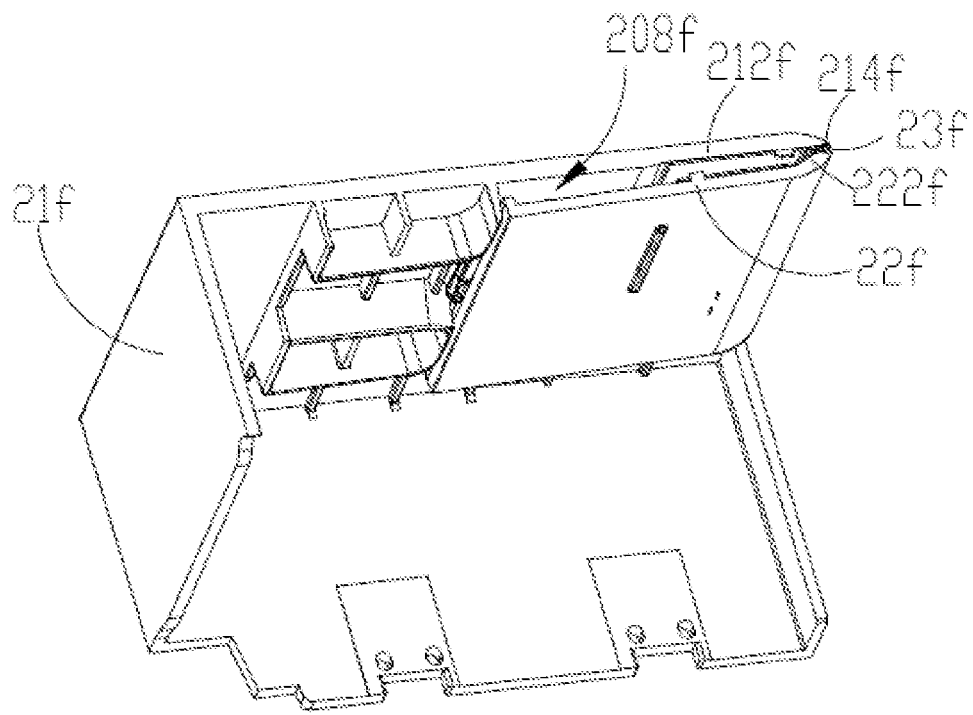
FIG. 57 is a schematic diagram of a partial structure of the accommodation compartment of the monitor of FIG. 55 with a compartment door in an open state.

Referring to FIGS. 55 to 57, FIG. 55 to FIG. 57 show schematic structural diagrams of the accommodation compartment 20f provided according to the third implementation of this disclosure. In the third implementation, a connection member 23f of the accommodation compartment 20f is fixedly disposed on a top plate 212f of the compartment body 21f and on the compartment door 22f, and the compartment door 22f is movably connected to compartment body 21f via the connection member 23f.

Particularly, in this implementation, the connection member 23f has a hinge structure. The connection member 23f includes a first hinge plate 231f, a second hinge plate 232f, and a pivot 233f connecting the first hinge plate 231f and the second hinge plate 232f. The first hinge plate 231f and the second hinge plate 232f are provided with several cylinders 206f staggered with each other. The pivot 233f passes through the several cylinders 206d, such that the first hinge plate 231f is movably connected to the second hinge plate 232f. The first hinge plate 231f is fixedly connected to the top plate 212f of the compartment body 21f by means of the mounting structure, and the first hinge plate 231f is fixed to the compartment door 22f by means of the mounting structure. In this implementation, the mounting structure is a screw. In other implementations, the mounting structure may also be a magnetic attraction structure, glue, a fastener, etc. Further, the first hinge plate 231f and the second hinge plate 232f may also be fixed to the compartment body 20f by means of welding.

The second hinge plate 232f is attached to the internal surface of the compartment door 22f, that is, the second hinge plate 232f has a non-planar structure. Two opposite faces of the second hinge plate 232f match with the shape of the internal surface of the compartment door 22f. It can be understood that the two opposite faces of the second hinge plate 232f are respectively a joint face attached to the internal surface of the compartment door 22f and a face away from the joint face. The compartment door 22f includes a body 220f. The bend 223f extends from the top end of the body 220f toward the bend 214f of the top plate 212f. Specifically, the second hinge plate 232f includes a first connection portion 2321f close to the cylinder 206f and a second connection portion 2321f fixedly connected to the first connection portion 2321f. The first connection portion 2321f is fixedly connected to the bend 223f of the compartment door 22f. The second connection portion 2321f is fixedly connected to the body 220f of the compartment door 22f. An included angle is formed between the first connection portion 2321f and the second connection portion 2321f. The included angle is an obtuse angle.

As shown in FIG. 56, when the opening 203f of the compartment body 21f is covered by the compartment door 22f, the lateral surface of the bend 214f of the compartment body 21f of the compartment door 22f is connected to the lateral surface of the bend 223f of the compartment door 22f to form a continuous curved surface 207f.

Referring to FIG. 57, FIG. 57 shows a section view of the accommodation compartment 20f with the compartment door 22f in the open state. When the compartment door 22f exposes the opening 203f of the compartment body 21f, an available space 208f is formed between the compartment door 22f and the top plate 212f of the compartment body 21f.

The axis of rotation about which the compartment door 22f moves relative to the compartment body 21f is located on one side of the central axis of the pivot 233f away from the compartment body 21f. The central axis of the pivot 233f refers to the axis of rotation about which the compartment door 22f moves relative to the pivot 233f. The axis of rotation is parallel to the central axis such that the compartment door 22f turns relative to the compartment body 21f. The axis of rotation about which the compartment door 22f moves relative to the compartment body 21f is aligned with the overlapping between the compartment door 22d and the compartment body 21d. The axis of rotation about which the compartment door 22f moves relative to the compartment body 21f is located at the connection position between the lateral surface of the compartment body 21f and the lateral surface of the compartment door 22f.

Figure 58:
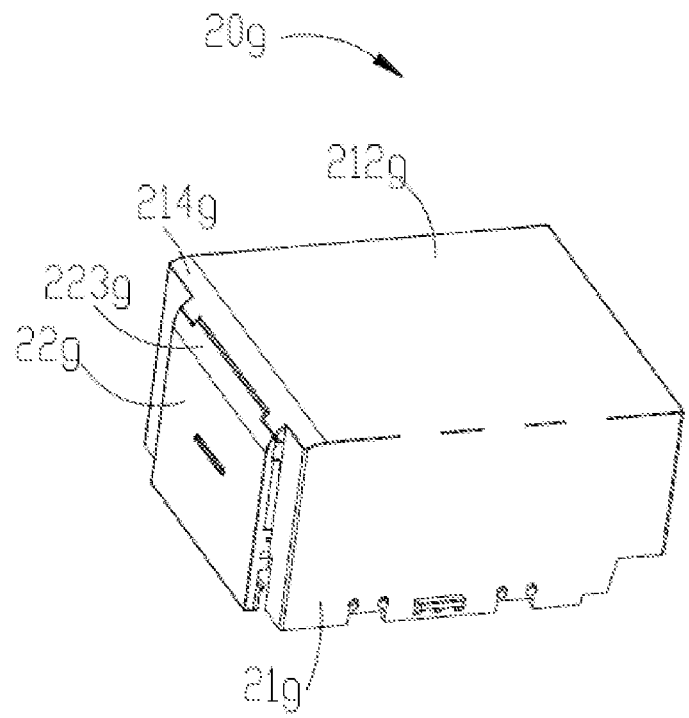
FIG. 58 is an assembled perspective view of a fourth implementation of an accommodation compartment of a monitor provided according to a seventh embodiment of this disclosure.
Figure 59:
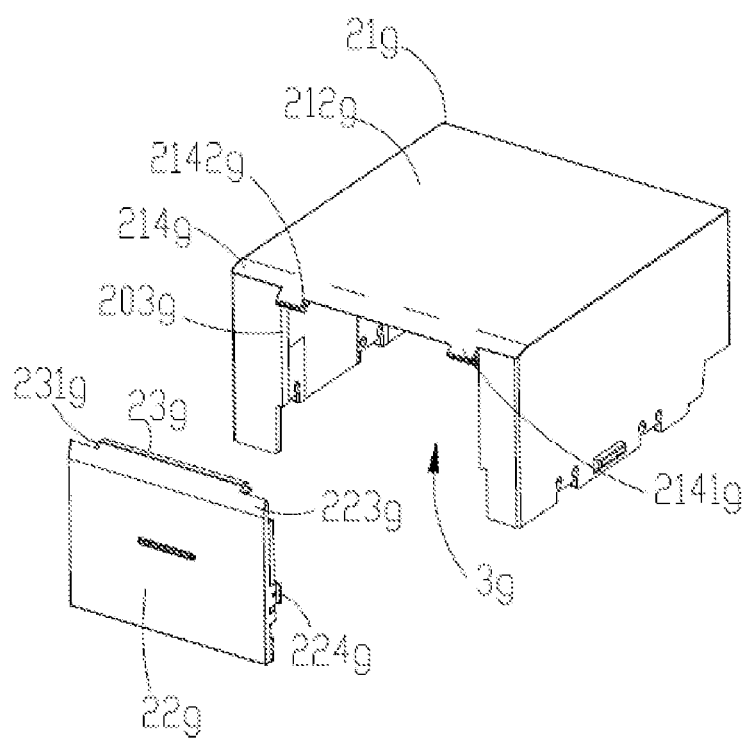
FIG. 59 is an exploded perspective view of the accommodation compartment of the monitor of FIG. 58.
Figure 60:
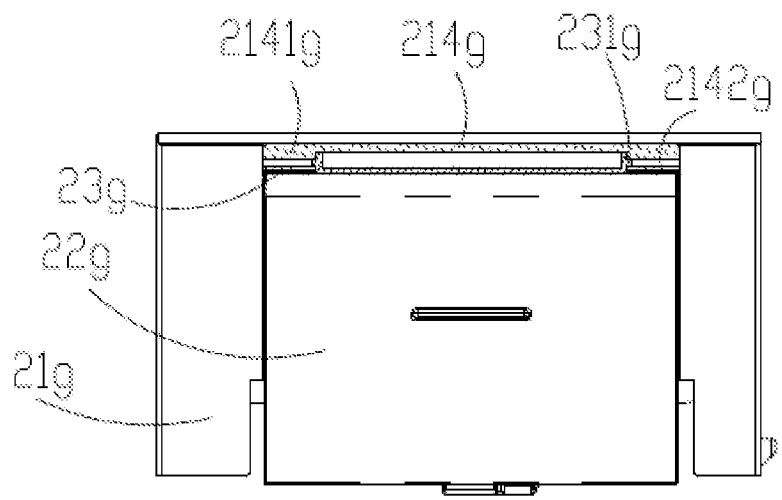
FIG. 60 is a section view of the accommodation compartment of the monitor of FIG. 58 with a compartment door in a closed state.

Referring to FIGS. 58 to 60, FIGS. 58 to 60 show schematic structural diagrams of the accommodation compartment 20g provided according to the fourth implementation of this disclosure. In this embodiment, a connection member 23g and a compartment door 22g of the accommodation compartment 20g are integrally formed.

Specifically, in this implementation, a free end of the top plate 212 of the compartment body 21g extends to form an arc-shaped bend 214g. Two opposite sides of the bend 214g respectively extend at an opening 203g to form two connection blocks 2141g. An accommodation space 3133g that accommodates the connection member 23g is formed between the two connection blocks 2141g.

Each of the connection blocks 2141g is axially provided with a connection hole 2142g. The top of the compartment door 22g is provided with an arc-shaped bend 223 extending toward the top plate 212d. The connection member 23g is provided in the middle of the free end of the bend 223. Two opposite sides of the connection member 23g are respectively axially provided with two connection rods 231 mating with the connection holes 2142g. It may be understood that the connection rod 231g may be made of an elastic material, such as plastic. In other implementations, the inner side of each of the connection blocks is axially provided with a connection rod, and two opposite sides of the connection member are respectively axially provided with two connection holes mating with the connection rod.

As shown in FIG. 60, the connection rods 231g of the connection member 23g are inserted into the connection holes 2142g of the connection blocks 2141g to connect the compartment door 22g to the compartment body 21g. The connection member 23g is clamped between the two connection blocks 2141g.

Alternatively, the axis of rotation about which the compartment door 22g moves relative to the compartment body 21g is located on one side of the central axis of the connection rod 231g away from the compartment body 21g. The central axis of the connection rod 231g refers to the axis of rotation about which the compartment door 22g moves relative to the connection rod 231. The axis of rotation is parallel to the central axis such that the compartment door 22g turns relative to the compartment body 21g. The axis of rotation about which the compartment door 22g moves relative to the compartment body 21g is aligned with the overlapping between the compartment door 22g and the compartment body 21g. The axis of rotation about which the compartment door 22g moves relative to the compartment body 21g is located at the connection position between the lateral surface of the compartment body 21g and the lateral surface of the compartment door 22g.

Compartment Body of Accommodation Compartment

Figure 61:
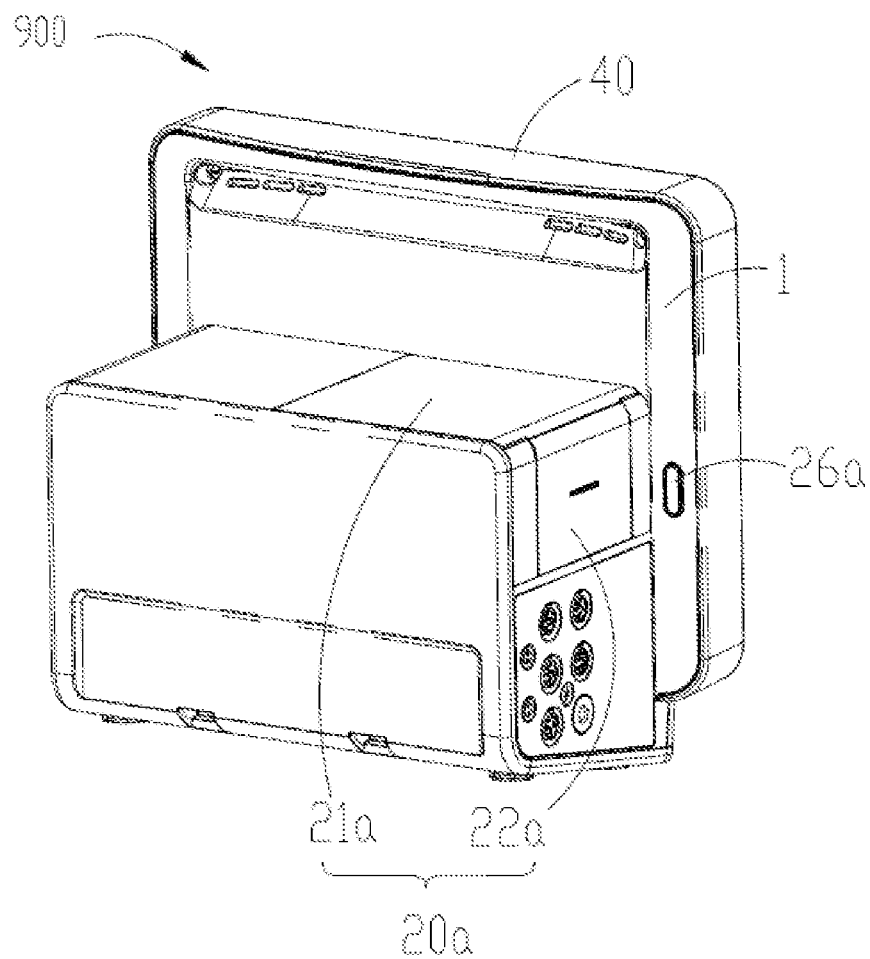
FIG. 61 is a schematic structural diagram of a first implementation of the accommodation compartment of a monitor provided according to an eighth embodiment of this disclosure.
Figure 62:
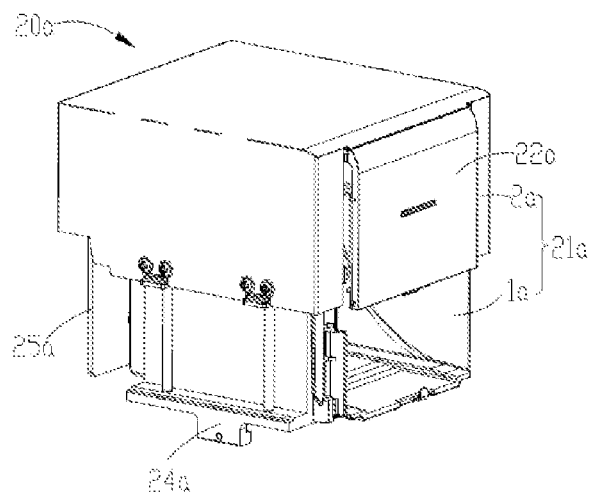
FIG. 62 is an assembled schematic diagram of the structure of the accommodation compartment of the monitor of FIG. 61.

As shown in FIGS. 61 and 62, these are schematic structural diagrams of the second implementation of the accommodation compartment 20a of the monitor 900 provided according to this disclosure. The compartment body 21a of the accommodation compartment 20a includes a compartment body 21a and a compartment door 22a, and the compartment body 21a includes a fixed compartment body 1a and a movable compartment body 2a movably sleeved over the fixed compartment body 1a.

Figure 63:
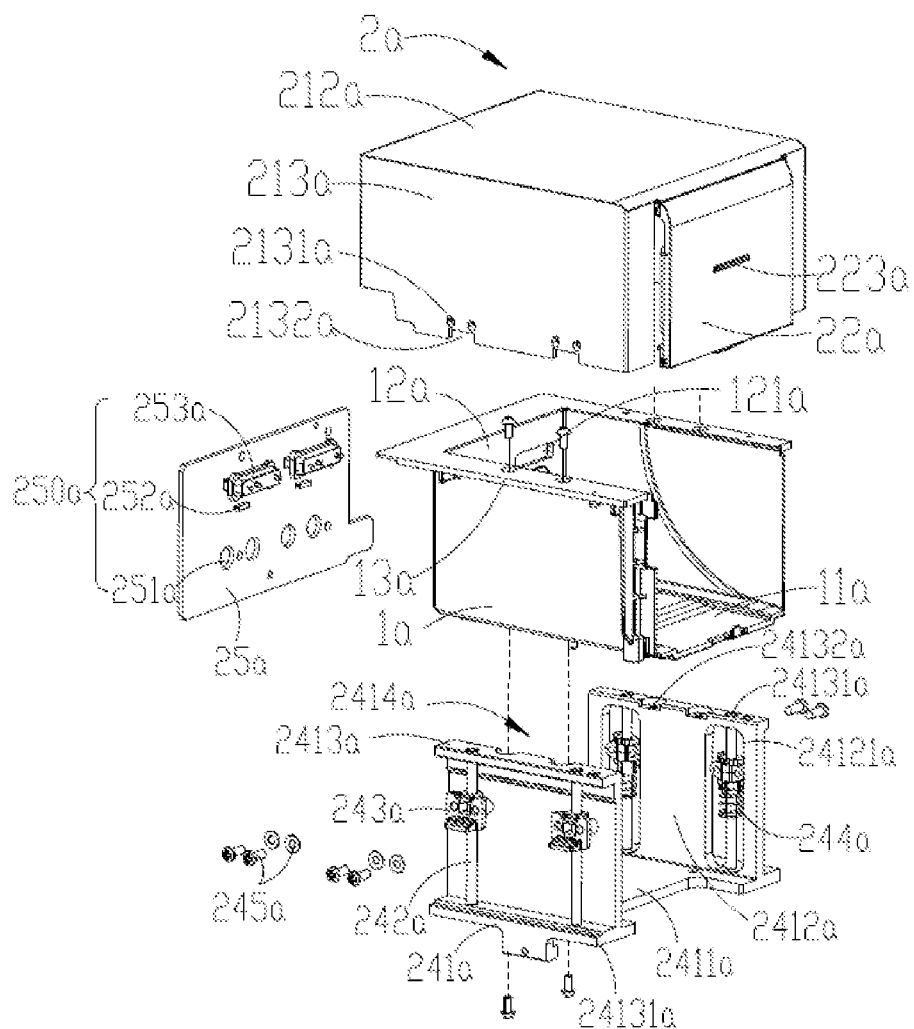
FIG. 63 is an exploded structural diagram of the accommodation compartment of the monitor of FIG. 62.

Further, as shown in FIGS. 62 and 63, the accommodation compartment 20a further includes a lifting support apparatus 24a and an interface communication board 25a. The lifting support apparatus 24a is used to support the compartment body 21a, the fixed compartment body 1a is fixedly connected to the lifting support apparatus 24a, and a movable compartment body 2a is movably connected to the lifting support apparatus 24a. The lifting support apparatus 24a is fixed to the main case 1 by means of the mounting structure 245a. The interface communication board 25a is arranged between the fixed compartment body 1a and the movable compartment body 2a, and the interface communication board 25a is fixed to the side plate 12a, parallel to the compartment door 22a, of the fixed compartment body 1a by means of the mounting structure 245a. In this embodiment, the mounting structure 245a is a screw or a pin.

The fixed compartment body 1a includes a bottom plate 11a, and a side plate 12a extending vertically upward from the bottom plate 11a. In this embodiment, a connection plate 13a extends from the top of the side plate 12a of the fixed compartment body 1a toward the outside of the accommodation compartment 20a. The connection plate 13a of the fixed compartment body 1a is fixed to the lifting support apparatus 24a by means of the mounting structure 245a, such that the fixed compartment body 1a is fixedly connected to the lifting support apparatus 24a.

It may be understood that the bottom plate 11a of the fixed compartment body 1a is the bottom plate 211a of the compartment body 21a. The bottom plate 11a of the fixed compartment body 1a is provided with a first retaining portion 111a, and the side plate 12a of the fixed compartment body 1a that is parallel to the compartment door 22a is provided with several orifices 121a and a second retaining portion 122a. The lateral surface of the compartment door 22a is provided with a third retaining portion 223a. The interface communication board 25a includes several functional interfaces 250a, and the several functional interfaces 250a pass through the orifices 121a and extend into the inside of the compartment body 21a. The medical article is correspondingly provided with several mating portions mating with the first retaining portion 111a, the second retaining portion 122a and the third retaining portion 223a. For example, the first retaining portion 111a, the second retaining portion 122a and the third retaining portion 223a together with the mating portions form structures of recesses and engaging blocks mating with each other.

The lifting support apparatus 24a includes a support frame 241a, several sliding guide columns 242a, and several movable connection portions 243a. The several sliding guide columns 242a are embedded in the support frame 241a, and each of the movable connection portions 243a is sleeved over the corresponding sliding guide column 242a. The support frame 241a is generally U-shaped. The support frame 241a includes a substrate 2411a, two support plates 2412a extending vertically upward from two sides of the substrate 2411a, and two connection plates 2413a extending outward from the free ends of the two support plates 2412a. The substrate 2411a and the two support plates 2412a jointly enclose an accommodation space 2414a to accommodate the fixed compartment body 1a. The substrate 2411a is fixed on the main case 1 by means of the mounting structure. The length direction of each sliding guide column 242a is parallel to the movement direction of the movable compartment body 2a.

In this embodiment, one of support plates 2412a that is close to the display screen 40 is provided with two parallel sliding slots 24121a at two ends of the support plate 2412a. Both the sliding guide column 242a and the movable connection portion 243a are accommodated in the sliding slots 24121a so as to reduce the space of the accommodation compartment 20a occupied by the lifting support apparatus 24a. The sliding slots 24121a are through slots. The support frame 241a is provided with two opposite engaging holes 24131a that penetrate the sliding slot 24121a. In this embodiment, the engaging hole 24131a penetrates the substrate 2411a and the connection plate 2413a. Two extreme ends of the sliding guide column 242a are mounted in the two engaging holes 24131a.

The other one of the support plates 2412a that is away from the display screen 40 is provided with the sliding guide column and the movable connecting portion at the outer side of the support plate 2412a. The support frame 241a is provided, at one side of the support plate 2412a away from the display screen 40, with two opposite engaging holes 24131a that penetrate the substrate 2411a and the connection plate 2413a. Two extreme ends of the sliding guide column 242a are mounted in the two engaging holes 24131a. The length of the sliding guide column 242a is greater than the height of the support plate 2412a. Each of the connection plates 2413a is further provided with several locking holes 24132a mating with the mounting structure 245a.

The lifting support apparatus 24a further includes an elastic piece 244a sleeved over at least one sliding guide column 242a. In this embodiment, the elastic piece 244a is sleeved over the sliding guide column 242a on a side close to the display screen 40. The elastic piece 244a is clamped between the movable connection portion 243a and the substrate 2411a of the support frame 241a.

Figure 64:
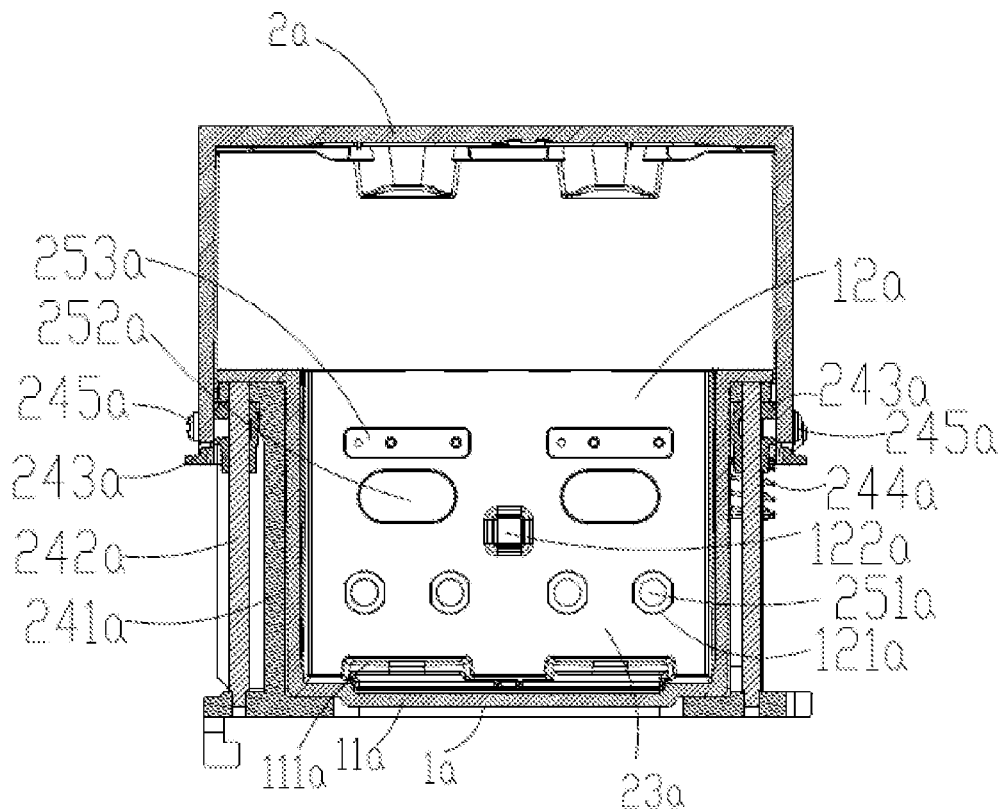
FIG. 64 is a section view of the accommodation compartment of the monitor of FIG. 62, where the accommodation compartment is in an unlocked state.
Figure 65:
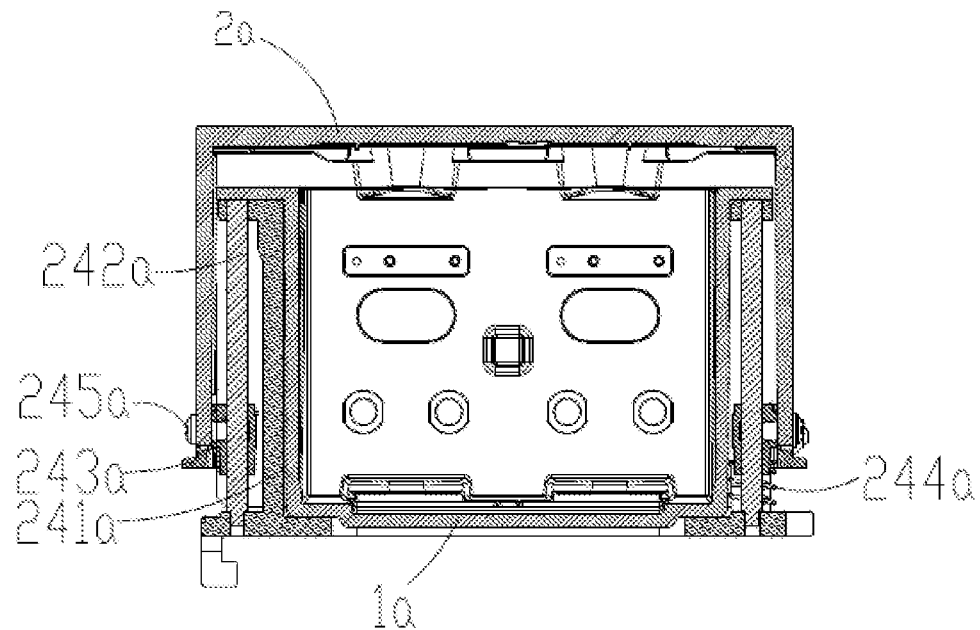
FIG. 65 is a section view of the accommodation compartment of the monitor of FIG. 62, where the accommodation compartment is in a locked state.

It may be understood that, as shown in FIGS. 64 and 65, when the movable compartment body 2a overlaps the fixed compartment body 1a, that is, the fixed compartment body 1a is completely covered by the movable compartment body 2a, the movable connection portion 243a is located at a first position on the sliding guide column 242a and abuts against the elastic piece 244a, such that the elastic piece 244a deforms to be in a compressed state. After the movable compartment body 2a rises relative to the fixed compartment body 1a by a predetermined distance, the movable connecting portion 243a is located at a second position on the sliding guide column 242a, and the elastic piece 244a recovers from the deformation. In this embodiment, the first position refers to the initial position of the movable connection portion 243a relative to the sliding guide column 242a, i.e. the position of the bottom end of the sliding guide column 242a (i.e., the end of the sliding guide column 242a close to the substrate 2411a). The second position refers to the pre-operating position of the movable connection portion 243a relative to the sliding guide column 242a, and at this time, the movable connection portion 243a is located away from the bottom end of the sliding guide column 242a, for example, located at the top end of the sliding guide column 242a. It can be seen that the movable connection portion 243a may reciprocate relative to the sliding guide column 242a in the length direction thereof between the first position and the second position, and drives the movable compartment body 2a to reciprocate relative to the fixed compartment body 1a so as to flexibly adjust the size of the accommodation space 3a of the accommodation compartment 20a.

The movable compartment body 2a is fixedly connected to the movable connection portion 243a by means of several mounting structures 245a, such that the movable compartment body 2a may follow the movement of the sliding connection portion 243a to move up and down relative to the fixed compartment body 1a. Specifically, the movable compartment body 2a further includes side plates 213a. The movable compartment body 2a is provided with several through holes 2131a at the bottom of the two side plates 213a that are perpendicular to the compartment door 22a. The movable connection portion 243a is provided with locking holes 2431a at positions corresponding to the through holes 2131a, and the mounting structures 245a pass through the through holes 2131a and are locked in the locking holes 2431a. Further, the bottom of each of the two side plates 213a of the movable compartment body 2a is further provided with several retaining ports 2132a. At least one of the movable connection portions 243a is provided with a retaining block 2432a at a position corresponding to the retaining port 2132a. The retaining block 2432a passes through the retaining port 2132a and is exposed outside the movable compartment body 2a.

Particularly, in this embodiment, the interface communication board 25a is provided with several electrical interfaces 251a, several infrared communication interfaces 252a, and several high-speed interfaces 253a. When the medical article 30 is inserted into the accommodation compartment 20a, the medical article 30 is electrically connected to the functional module of the medical device 900 via the several electrical interfaces 231a, such that the medical article 30 can be powered on for operation, and the medical article 30 can also transfer the monitored data to the display screen 40 or to the printing recorder of the medical device 900 through the several infrared communication interfaces 252a. The several high-speed interfaces 253a are, for example, such as Internet of Things application interfaces, and may be used to transfer data or used for the medical article 30 to be powered on for operation.

Manipulator of Accommodation Compartment

Figure 66:
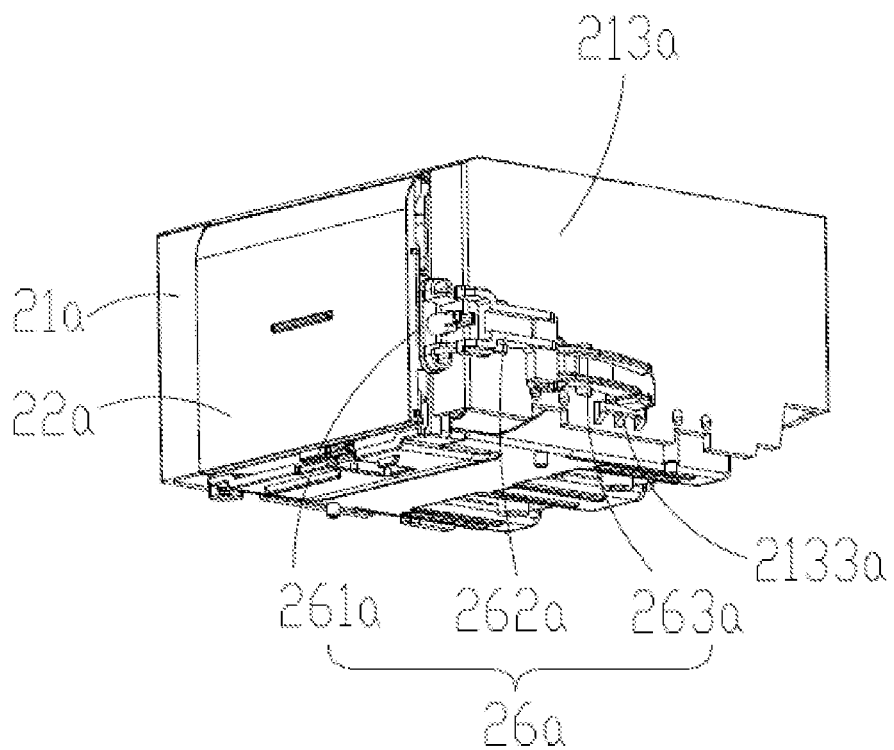
FIG. 66 is an assembled schematic diagram of the structure of the accommodation compartment and a manipulator of the monitor of FIG. 61.
Figure 67:
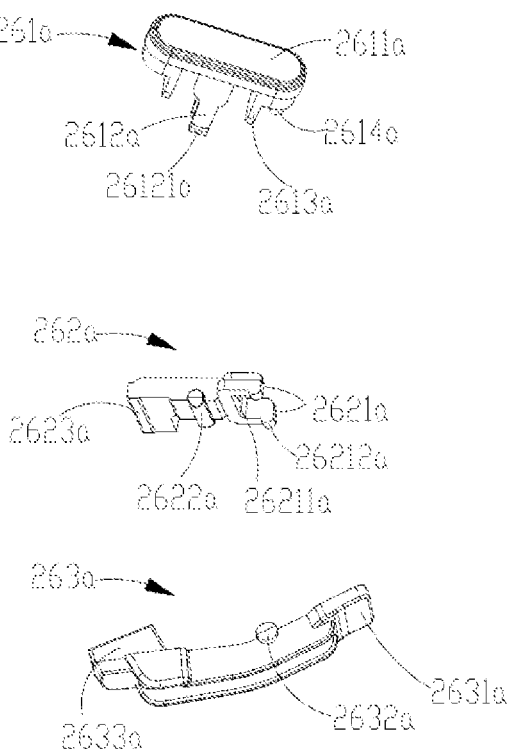
FIG. 67 is an exploded structural diagram of the manipulator of the monitor of FIG. 66.
Figure 68:
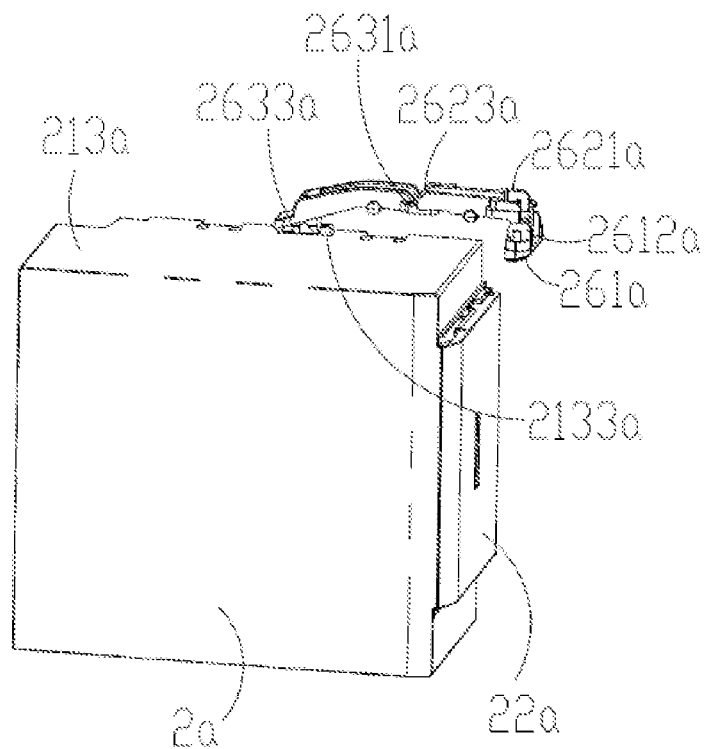
FIG. 68 is a view of the accommodation compartment and the manipulator of the monitor of FIG. 66 from another perspective.
Figure 69:
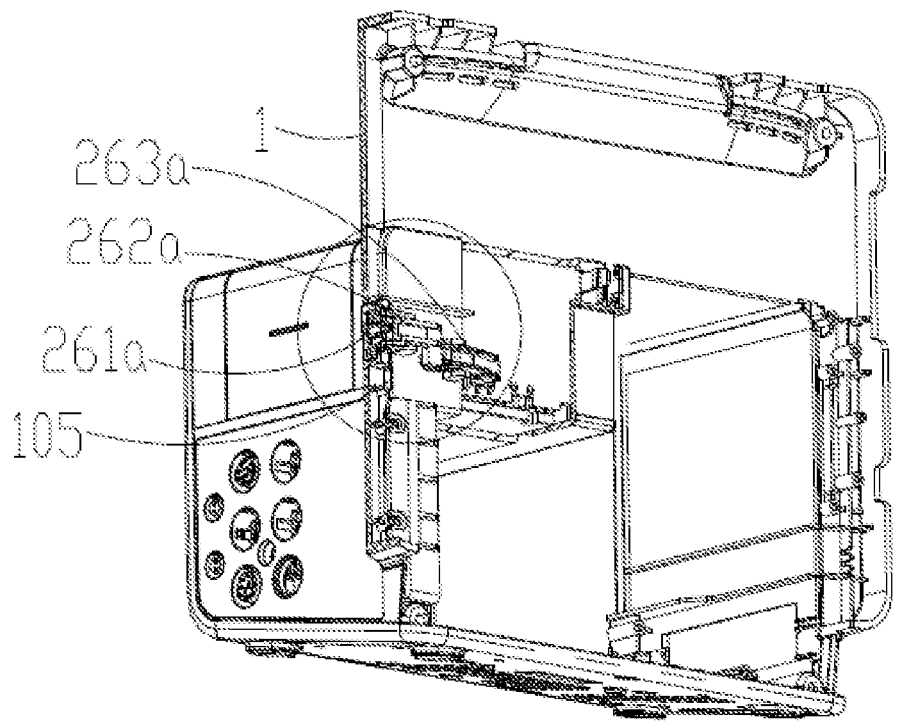
FIG. 69 is a section view of the monitor of FIG. 61.

FIGS. 66 to 68 refer to another embodiment of this disclosure. The medical device 900 further includes a manipulator 26a. The movable compartment body 2a is placed in a locked state or in an unlocked state relative to the fixed compartment body 1a by the manipulator 26a. Particularly, the movable compartment body 2a is locked on the main case 1 by the manipulator 26a, or the manipulator 26a is operated to unlock the movable compartment body 2a from the main case 1. In the locked state, the movable compartment body 2a cannot move or go up and down; and in the unlocked state, the movable compartment body 2a can move or go up and down, such that the space of the accommodation compartment can be changed or enlarged.

In one embodiment, the manipulator 26a controls the movable compartment body 2a to be placed in the locked state or in the unlocked state relative to the fixed compartment body 1a by means of elastic gripping. The manipulator 26a includes a pressing member 261a, a first movable member 262a, a second movable member 263a, and a return member 264a that is elastic. The pressing member 261a is movably fitted to the main case 1, the first movable member 262a and the second movable member 263a are linked to the pressing member 261a and drive the movable compartment body 2a to move relative to the fixed compartment body 1a toward the upper orientation of the main case 1. The elastic force of the return member 264a acts on the pressing member 261a. In this embodiment, the return member 264a is a spring. Two extreme ends of the first movable member 262a respectively abut against the pressing member 261a and the second movable member 263a, and the pressing member 261a and the second movable member 263a are located on the same side of the first movable member 262a.

The pressing member 261a includes an operating portion 2611a, a mounting portion 2612a, and two first force application portions 2613a. The operating portion 2611a is exposed outside the main case 1. The mounting portion 2612a extends downward from the middle of the operating portion 2611a. The return member 264a is sleeved over the mounting portion 2612a. The two first force application portions 2613a are disposed on two sides of the mounting portion 2612a. In this embodiment, the two first force application portions 2613a are disposed symmetrically relative to the mounting portion 2612a so as to ensure that the first movable member 262a is uniformly stressed. The pressing member 261a further includes a guiding shaft 2614a for guiding the movement direction of the pressing member 261a. The guiding shaft 2614a is disposed on the side of the first force application portion 2613a away from the mounting portion 2612a. The mounting portion 2612a is generally cylindrical. The central axis of the guiding shaft 2614a is parallel to the central axis of the mounting portion 2612a. As such, the mounting portion 2612a may also be used to guide the movement direction of the pressing member 261a. Since the mounting portion 2612a is disposed in the middle of the pressing member 261a, the mounting portion 2612a can act as a central guiding shaft for guiding the movement direction of the pressing member 261a.

The main case 1 is provided with a mounting frame 105 at a position corresponding to the manipulator 26a. The mounting portion 2612a of the pressing member 261a engages with the mounting frame 105. Particularly, the end of the mounting portion 2612a away from the operating portion 2611a is provided with a stopper 26121a. The mounting frame 105 is provided with an engaging recess 1051 for accommodating the return member 264a and the mounting portion 2612a. The recess bottom of the engaging recess 1051 is provided with a flange 1052 that engages with the stopper 26121a.

The end of the first movable member 262a close to the pressing member 261a is provided with two first stressed portions 2621a, where the two first stressed portions respectively correspond to the two first force application portions 2613a. The two first stressed portions 2621a respectively abut against the two first force application portions 2613a. An opening 26211a for the mounting portion 2612a of the pressing member 261a to pass through is formed between the two first stressed portions 2621a. Each of the first stressed portions 2621a is provided with a bump 26212a on the side close to the first force application portion 2613a.

The end of the first movable member 262a away from pressing member 261a is provided with a second force application portion 2623a.

The end of the second movable member 263a close to the first movable member 262a is provided with a second stressed portion 2631a. The second stressed portion 2631a abuts against the second force application portion 2623a, and the distance between the second stressed portion 2631a and the accommodation compartment 20a is less than the distance between the second force application portion 2623a and the accommodation compartment 20a. The end of the second movable member 263a away from the first movable member 262a is provided with a compression portion 2633a. When the pressing member 261a is in an unstressed state, the compression portion 2633a is compressed against the stopper 2133a of the side plate 213a of the movable compartment body 2a. When the pressing member 261a is in a stressed state, the compression portion 2633a is out of contact with the stopper 2133a of the side plate 213a of the movable compartment body 2a.

The first movable member 262a and the second movable member 263a are rotatably pivoted to the mounting frame 105. Particularly, the first movable member 262a is provided with a first pivot 2622a, the second movable member 263a is provided with a second pivot 2632a, and the mounting frame 105 is correspondingly provided with two pivoting portions 106 rotatably connected to the first pivot 2622a and the second pivot 2632a. The first pivot 2622a is parallel to the second pivot 2632a, and the length directions of the first pivot 2622a and the second pivot 2632a are parallel to the movement direction of the movable compartment body 2a. The first pivot 2622a of the first movable member 262a serves as a support shaft around which the first stressed portion 2621a and the second force application portion 2623a turn, that is, the first stressed portion 2621a and the second force application portion 2623a are deflected in a direction close to or away from the accommodation compartment 20a by means of the first pivot 2622a. The principle of movement of the second movable member 263a is the same as the principle of movement of the first movable member 261a.

Figure 70:
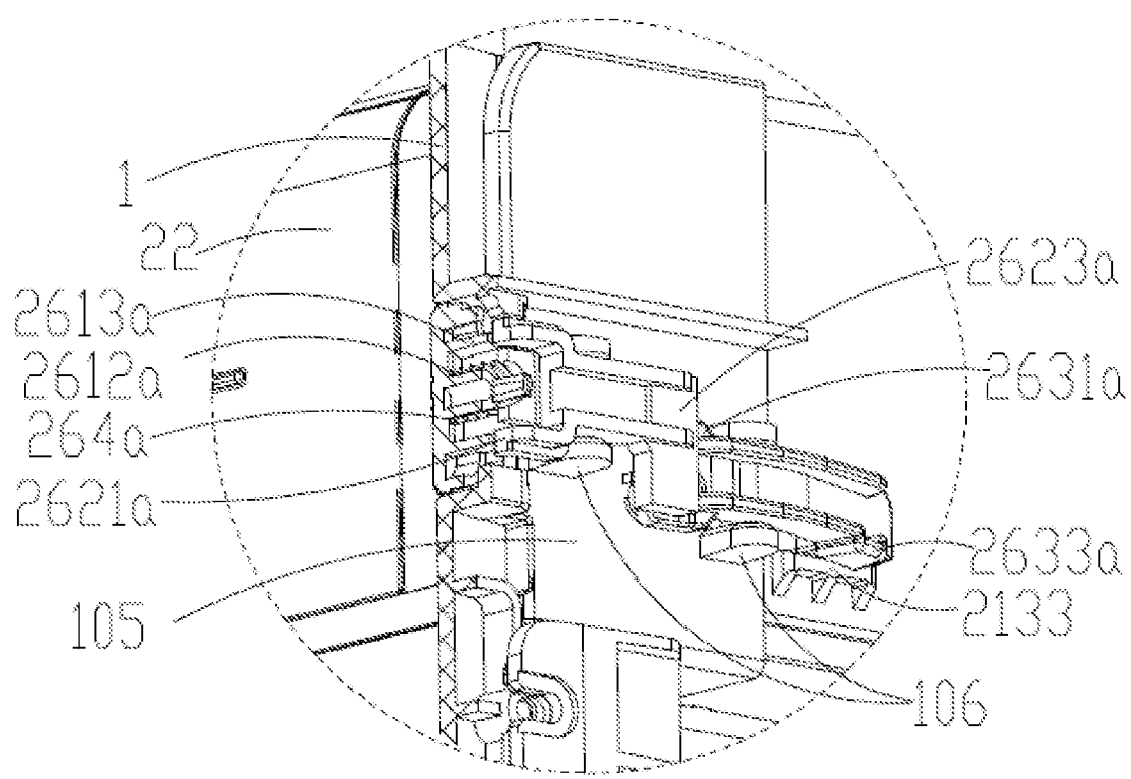
FIG. 70 is an enlarged view of the monitor of FIG. 69.
Figure 71:
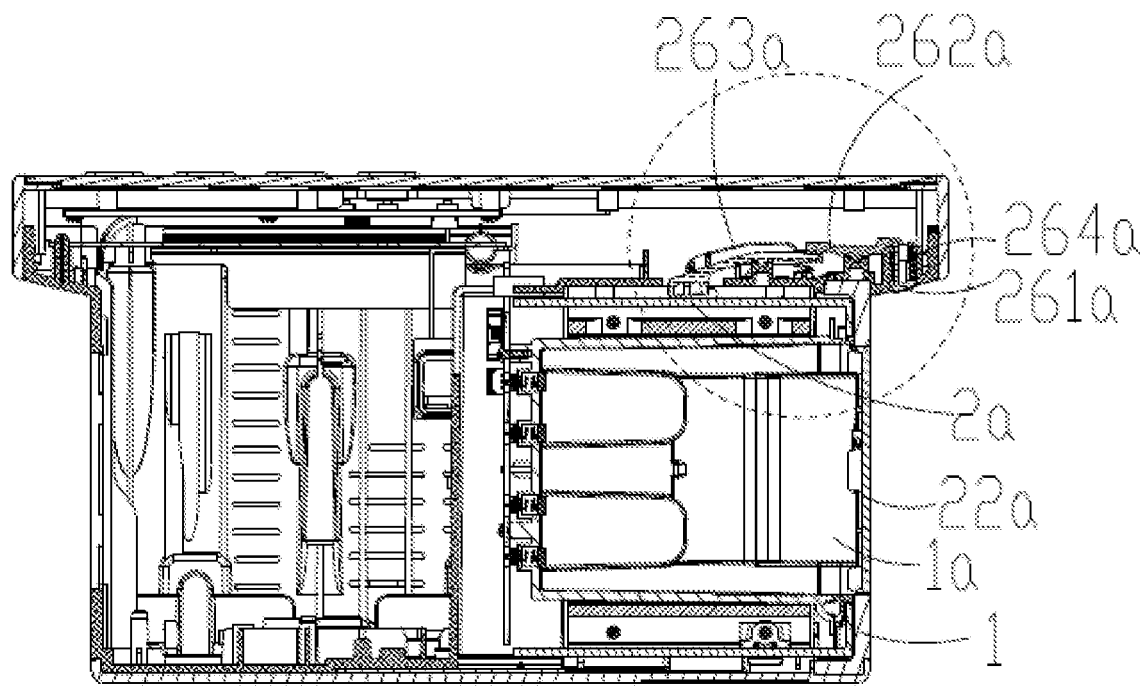
FIG. 71 is a partial section view of the manipulator of the monitor of FIG. 62, where the manipulator is in an unstressed state.
Figure 72:
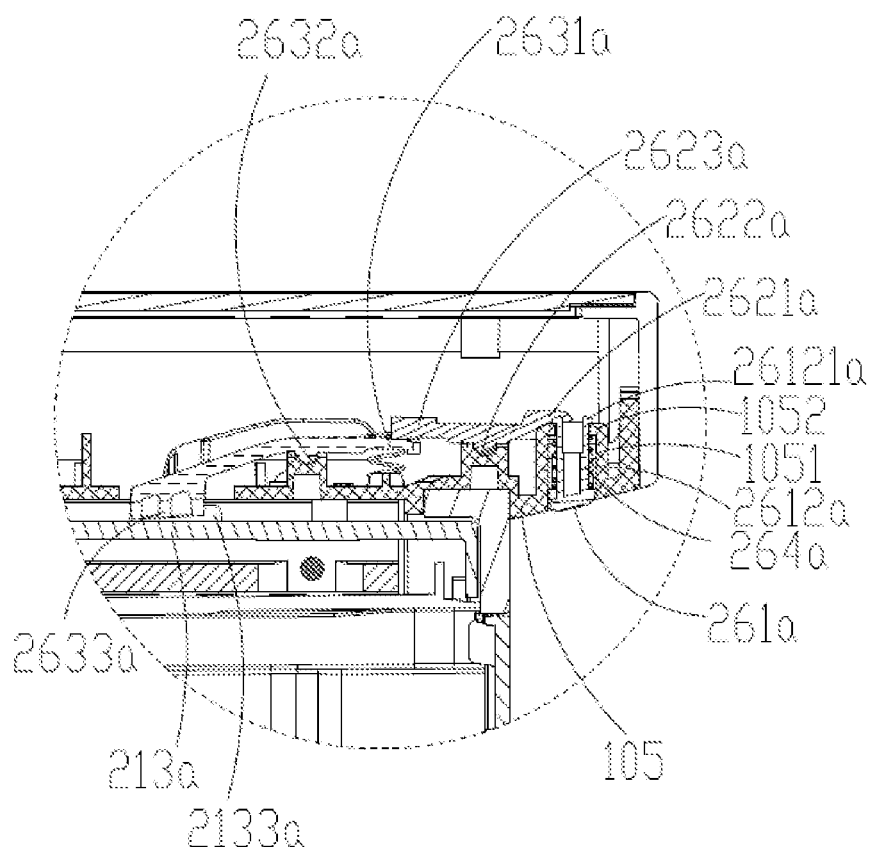
FIG. 72 is an enlarged view of the monitor of FIG. 71.
Figure 73:
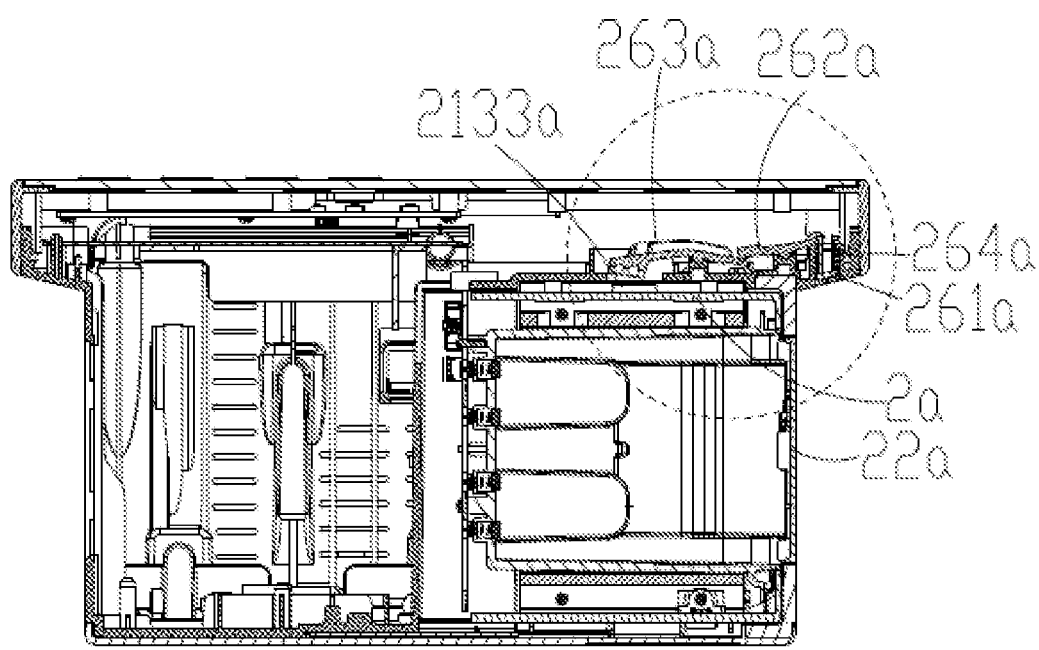
FIG. 73 is a partial section view of the manipulator of the monitor of FIG. 62, where the manipulator is in a stressed state.
Figure 74:
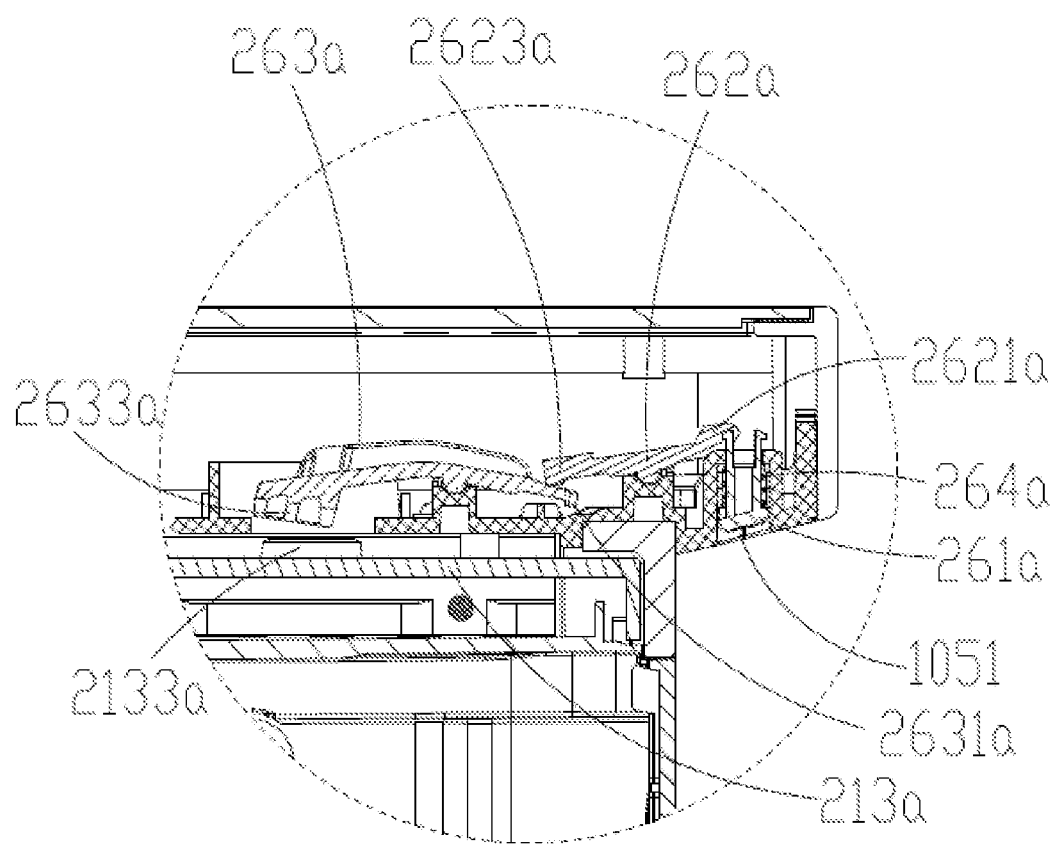
FIG. 74 is an enlarged view of the monitor of FIG. 73.

As shown in FIGS. 70 to 72, when the pressing member 261a is in an unstressed state (i.e., an initial state), the return member 264a does not deform, the pressing member 261a is located at a third position under the elastic force of the return member 264a, the first force application portion 2613a abuts against the first stressed portion 2621a, the second force application portion 2623a abuts against the second stressed portion 2631a, and the compression portion 2633a is compressed against the stopper 2133a, such that the movable compartment body 2a is placed in the locked state. In this embodiment, the movable compartment body 2a is locked on the main case 1. It may be understood that, in this embodiment, the third position refers to a position where the stopping portion 26121a of the pressing member 261a stops against the flange 1052 of the mounting frame 105. The pressing member 261a is exposed outside the main case 1.

When the pressing member 261a is in a stressed state, the return member 264a deforms, the pressing member 261a is located at a fourth position under the action of an external force, the first force application portion 2613a abuts against the first stressed portion 2621a and drives the second force application portion 2623a to abut against the second stressed portion 2631a, and the compression portion 2633a is out of contact with the stopper 2133a under an acting force from the second stressed portion 2631a, such that the movable compartment body 2a is in the unlocked state, that is, the movable compartment body 2a is unlocked from the main case 1. It may be understood that in this embodiment, the fourth position refers to a position where the stopping portion 26121a of the pressing member 261a is disengaged from the flange 1052 of the mounting frame 105. The pressing member 261a is embedded inside the main case 1. When the external force is eliminated, the return member 264a allows the pressing member 261a to return to the third position.

It may be understood that in other embodiments, the manipulator 26a controls, by means of magnetic attraction, the movable compartment body 2a to be placed in the locked state or in the unlocked state relative to the fixed compartment body 1a. The manipulator 26a includes an attraction body or an attracted body. One of the attraction body and the attracted body is disposed on the movable compartment body 2a, and the other one thereof is disposed on the main case 1 or the fixed compartment body 1a. The attraction body is for example a magnet. The attracted body is an object containing iron, cobalt, and nickel, such as tinplate. Alternatively, the attraction body and the corresponding attracted body are arranged in stack so as to increase the contact area between the attracted body and the attraction body and thus increase the attraction force therebetween. In some embodiments, at least one of the movable compartment body 2a and/or the main case 1 and the fixed compartment body 1a is made of an attraction material. At least one of the movable compartment body 2a and/or the main case 1 and the fixed compartment body 1a is correspondingly provided with an attraction material.

Medical Article—Storage Box for Medical Article

Figure 75:
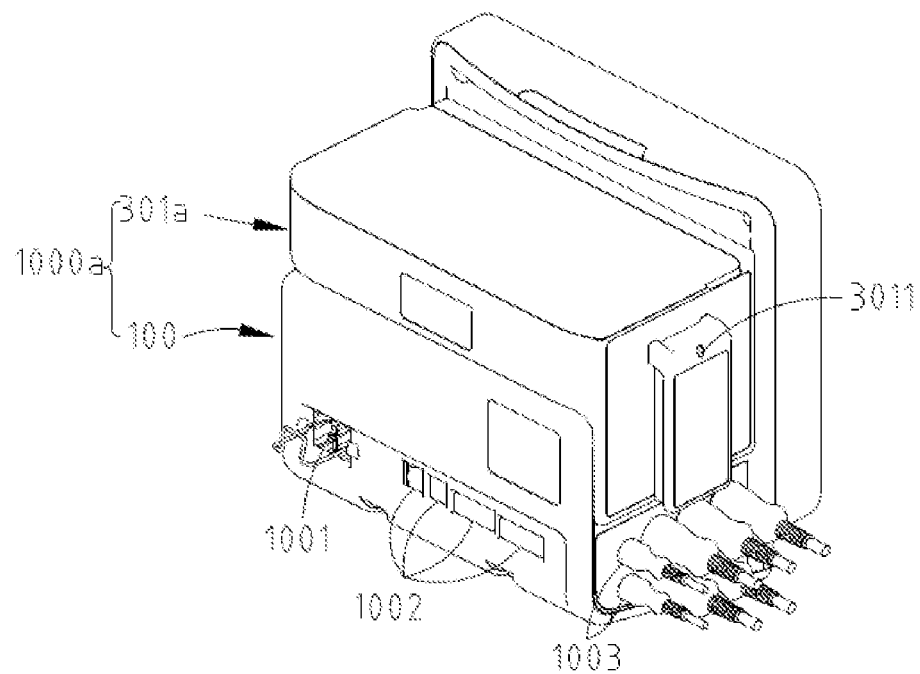
FIG. 75 is a schematic structural diagram, from another direction, of a medical device provided according to a fifth embodiment of this disclosure.

Referring to FIG. 75, FIG. 75 is a schematic structural diagram of the medical device according to the fifth embodiment of this disclosure. The medical device 1000a is similar to the medical device 1000, except that the medical device 1000a includes the monitor 100 and the storage box 301a for the medical article mounted on the monitor 100. As above, in this embodiment, the monitor 100 may be a portable monitor, a transfer monitor, or a movable monitor. Of course, in other embodiments, the monitor 100 may also be other types of medical devices, for example, a monitor with physically separated host and displayer, and with data to be transferred between the physically separated host and displayer in the monitor in a wireless or wired manner. The storage box 301a for the medical article may also be a box for housing a physiological parameter monitoring accessory. The physiological parameter monitoring accessory includes at least one accessory device for measuring physiological parameters such as ECG signals, blood oxygen signals, blood pressure signals, body temperature, respiration, and blood glucose. The monitor 100 may obtain at least one parameter data of the physiological parameters such as ECG signals, blood oxygen signals, blood pressure signals, body temperature, respiration, and blood glucose from the physiological parameter monitoring accessory, and may also obtain at least one parameter data of non-physiological parameters such as movement from the physiological parameter monitoring accessory.

Figure 76:
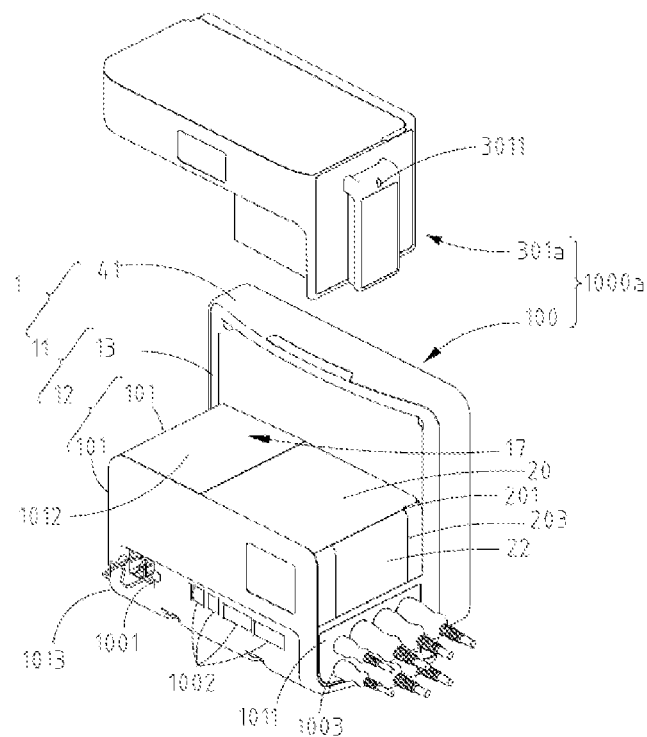
FIG. 76 is an exploded schematic view of the medical device of FIG. 75.

Referring to FIG. 76, FIG. 76 is a schematic diagram of a disassembled medical device 1000a in the second embodiment of this disclosure. The storage box 301a for the medical article is removably mounted on the monitor 100.

The storage box 301a for medical article is electrically connected to the monitor 100. The monitor 100 is further provided with a power interface 1001, and the power interface 1001 includes, but is not limited to, a DC power interface and an AC power interface. The monitor 100 is electrically connected to an external power source via the power interface 1001, and thus the storage box 301a for the medical article is indirectly electrically connected to the external power source via the monitor 100.

Alternatively, in this embodiment, the storage box 301a for the medical article is further provided with an indicator 3011 for indicating that the storage box 301a for the medical article and the monitor 100 complete an effective combination, for example, the two may be combined together by means of electrical connection or combined together by means of mechanical coupling. In some of the embodiments, the power interface of the indicator 3011 disposed on the storage box 301a for medical article is electrically connected to the external power interface on the storage box 301a for the medical article. When the storage box 301a for the medical article is mounted on the monitor 100 and establish an electrical connection with the monitor 100, the indicator 3011 is powered on and emits light, and power is obtained from the monitor 100 via the external power interface on the storage box 301a for the medical article, indicating that an electrical connection have been established between the current storage box 301a for the medical article and the monitor 100 to complete a power-on combination. When no effective electrical connection is established between the storage box 301a for the medical article and the monitor 100, the indicator 3011 does not emit light, indicating that no effective electrical connection is established between the storage box 301a for the medical article and the monitor 100. Of course, in some other embodiments, the power interface of the indicator 3011 provided on the storage box 301a for medical article can be directly electrically connected to the power supply unit provided inside the storage box 301a for the medical article. When a coupling detection unit detects that the combination of the storage box 301a for medical article and the monitor 100 is completed, the indicator 3011 is powered on and lights up correspondingly.

In addition to the power supply connection between the storage box 301a for medical article and the monitor 100 via the external power interface, the storage box 301a for the medical article may also be in communication connection with the monitor 100, which will be described in detail later.

The monitor 100 is further provided with several communication interfaces 1002, and the several communication interfaces 1002 include a wireless interface or a wired interface. The wireless interface included in the several communication interfaces 1002 may be, but are not limited to, a parallel interface, WiFi, Bluetooth, or Ethernet. The wired interface included in the several communication interfaces 1002 may be, but are not limited to, a serial interface, a USB interface, a multi-function data transmission interface, a printing recorder interface, a headphone interface, or a SD card interface. The monitor 100 establishes a communication connection with external devices (for example, a central server, a wireless network node, a mobile terminal) via the several communication interfaces 1002. The storage box 301a for the medical article thus indirectly establishes a data communication connection with the external devices by the monitor 100. The data transferred through the communication connection includes at least one parameter data of physiological parameters such as ECG signals, blood oxygen signals, blood pressure signals, body temperature, respiration and blood glucose obtained by the monitor 100, and may also include at least one parameter data of non-physiological parameters, such as movement, obtained by the monitor 100 from the physiological parameter monitoring accessory.

The monitor 100 further includes several parameter interfaces 1003, and the monitor 100 establishes a connection with the at least one physiological parameter monitoring accessory via the several parameter interfaces 1003.

Therefore, when the monitor 100 needs to extend the function by the storage box 301a for the medical article, the storage box 301a for the medical article may be mounted on the monitor 100 and establish an electrical connection and/or a communication connection with the monitor 100. When the monitor 100 does not need to extend the function by the storage box 301a for the medical article, the storage box 301a for the medical article may be removed from the monitor 100. Compared with the medical device 100, the monitor 100 has less weight and a smaller size, and thus has better portability to meet the demands of different occasions such as hospitals and ambulances.

Figure 77:
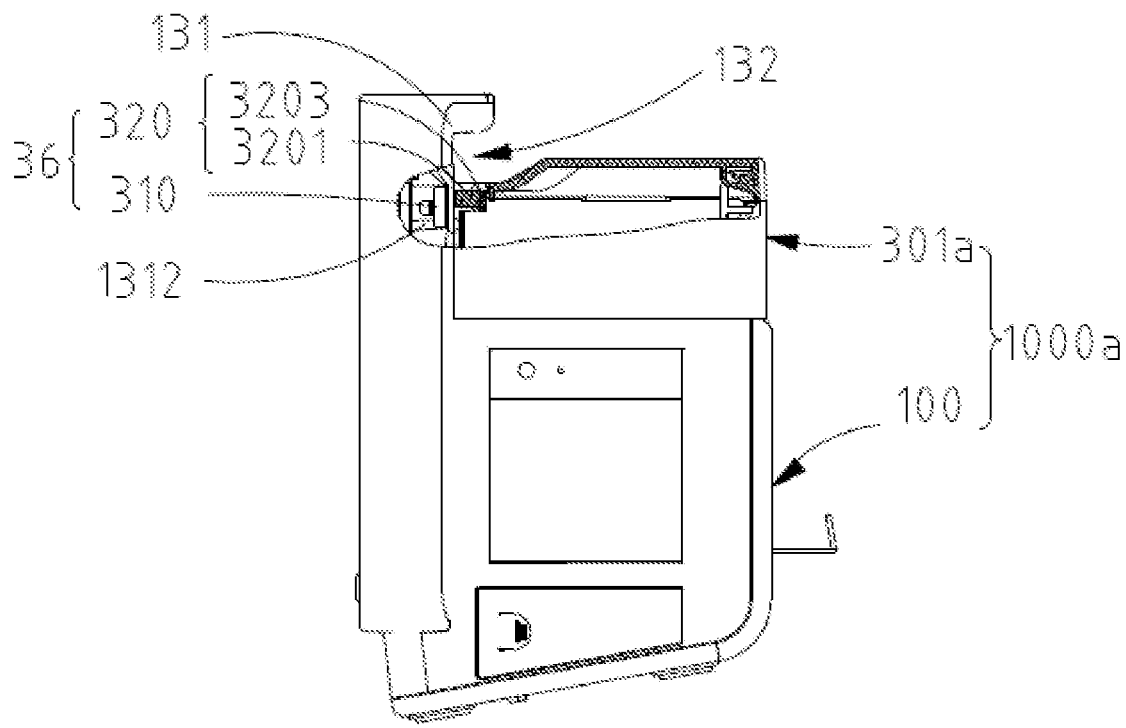
FIG. 77 is a partial section view of a part of the medical device of FIG. 75.

In order to achieve better operation reliability of the medical device 1000a, a stable and reliable electrical connection and/or communication connection needs to be established between the storage box 301a for the medical article and the monitor 100, and the connection between the storage box 301a for medical article and the monitor 100 cannot become unreliable to affect the operation stability due to some events such as pulling or collision. Referring to FIG. 77, in order to solve this problem, the medical device 1000a further includes a fixing apparatus 36. The fixing apparatus 36 allows the storage box 301a for the medical article to be stably and reliably mounted on the monitor 100.

Particularly, in this embodiment, the fixing apparatus 36 is a magnetic attraction assembly that includes a first fixing member 310 and a second fixing member 320. The first fixing member 310 is disposed at a position corresponding to that of the second fixing member 310, where the first fixing member 310 is disposed on the monitor 100, and the second fixing member 320 is disposed on the storage box 301a for the medical article. When the storage box 301a for the medical article is mounted on the monitor 100, the first fixing member 310 is approximate to and magnetically attracted to the second fixing member 320, such that the storage box 301a for the medical article is stably connected to the monitor 100. When an external force greater than the magnetic attraction force between the first fixing member 310 and the second fixing member 320 is applied to the storage box 301a for the medical article, the storage box 301a for the medical article may be removed from the monitor 100. Thus, a stable and reliable connection can be created between the storage box 301a for the medical article and the monitor 100, and the two may also be detached from each other.

It may be understood that, in this embodiment, the first fixing member 310 is a magnetizable metal member made of a magnetizable metal material, such as iron, cobalt, nickel, cast steel, and silicon steel. The second fixing member 320 is a magnetic member made of a magnetic material. Thus, when the storage box 301a for the medical article is mounted on the monitor 100 such that the second fixing member 320 is approximate to the first fixing member 310, the second fixing member 320 magnetizes the first fixing member and is fixedly connected to the first fixing member 310 by means of magnetic attraction.

It may be understood that in a further embodiment, the first fixing member 310 is a magnetic member, and the second fixing member 320 is a magnetizable metal member.

It may be understood that in a still further embodiment, the first fixing member 310 and the second fixing member 320 are both magnetic members, and the magnetic property of the first fixing member 310 is opposite to that of the second fixing member 320, such that the first fixing member 310 and the second fixing member 320 are fixedly connected by means of magnetic attraction when approaching each other.

It may be understood that in other embodiments, the fixing apparatus 36 is other types of fixing assemblies, such as an engagement fixing assembly, which will not be defined herein.

Particularly, referring to FIGS. 76 and 77, the first fixing member 310 is disposed on the main case 1, the second fixing member 320 is disposed on the storage box 301a for the medical article at a position corresponding to and close to the first fixing member 310, and the first fixing member 310 is coupled and fixed to the second fixing member 320.

Particularly, referring to FIG. 76, the main case 1 includes the front case 41 and the back case 11. The front case 41 and the back case 11 are snap-fitted to form an enclosure of the monitor 100. That is, the external contours of the front case 41 and the back case 11 determine the external shape of the monitor 100. The side of the front case 41 facing the user is provided with, but not limited to, a display screen and operating keys. The back case 11 includes a connection frame 13 and a box body structure 12. The frame size on the side of the connection frame 13 facing the front case 41 is substantially the same as the frame size on the side of the front case 41 facing the connection frame 13, and the connection frame 13 can thus match and be snap-fitted with the front case 41 to form a whole structure. The box body structure 12 protrudes from the side of the connection frame 13 away from the front case 41. The box body structure 12 includes at least one exposed chamber outer wall 101, and the at least one exposed chamber outer wall 101 encloses an accommodation chamber 103. The accommodation compartment 20 is disposed inside the box body structure 12. The height of the box body structure 12 is less than that of the connection frame 13, so a step portion 17 is formed between the box body structure 12 and the connection frame 13. The first fixing member 310 is disposed in the connection frame 13 or the box body structure 12.

Particularly, in this embodiment, referring to FIG. 77, the connection frame 13 includes a connection wall 131 located above the box body structure 12. The side of the connection wall 131 facing and close to the front case 41 is recessed to form a handle 132 to facilitate the user holding and carrying the monitor 100 from here.

Figure 78:
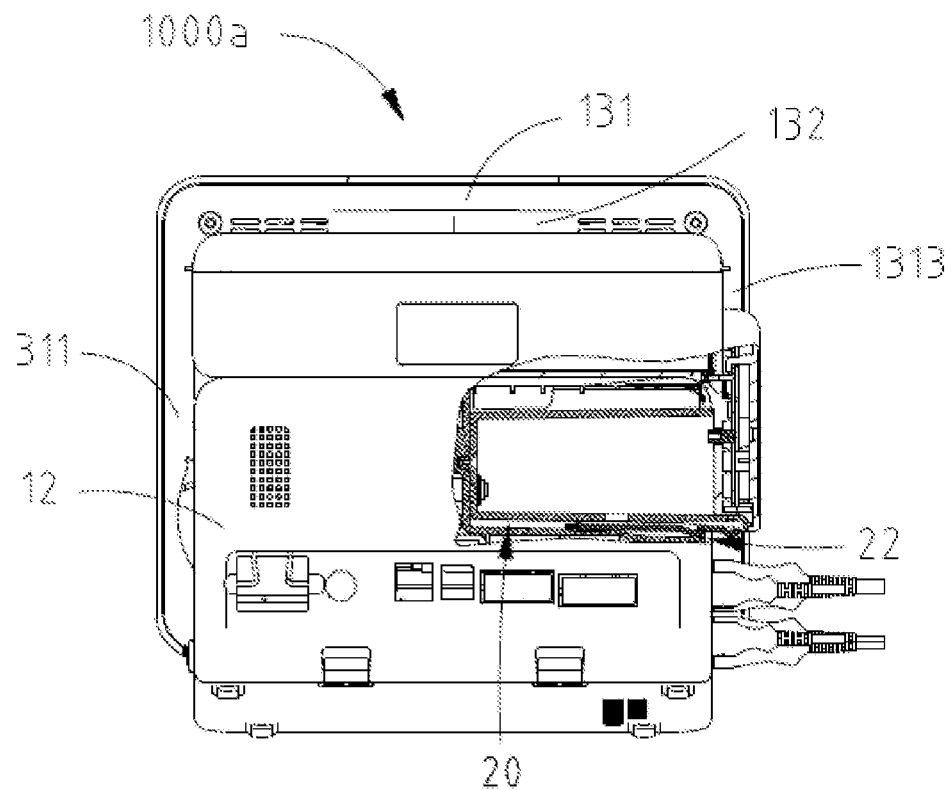
FIG. 78 is a partial section view of another part of the medical device of FIG. 75.

Further, referring to FIG. 78, the width of the box body structure 12 is less than that of the connection frame 13, and thus the connection frame 13 further includes a first connection wall 1311 respectively connected to a left side edge of the box body structure 12 and to the front case 41, and a second connection wall 1313 respectively connected to a right side edge of the box body structure 12 and to the front case 41. Therefore, a top side of the box body structure 12 is connected to the connection wall 131 of the connection frame 13, a left side of the box body structure 12 is connected to the first connection wall 1311 of the connection frame 13, and a right side of the box body structure 12 is connected to the second connection wall 1313 of the connection frame 13.

In one embodiment, the first fixing member 310 is disposed at the connection wall 131. Particularly, referring to FIG. 77 again, an inner side of the connection wall 131 is provided with a mounting slot 1312, and the first fixing member 310 is mounted into the mounting slot 1312. It may be understood that the first fixing member 310 may be mounted in the mounting slot 1312 by bonding or other methods, such as screw fixing. The second fixing member 320 is then disposed at a corresponding position inside the accommodation portion 33.

It may be understood that, in a further embodiment, the first fixing member 310 may be disposed at the first top plate 1012, and the second fixing member 320 is then disposed at a corresponding position inside the accommodation portion 33.

Figure 79:
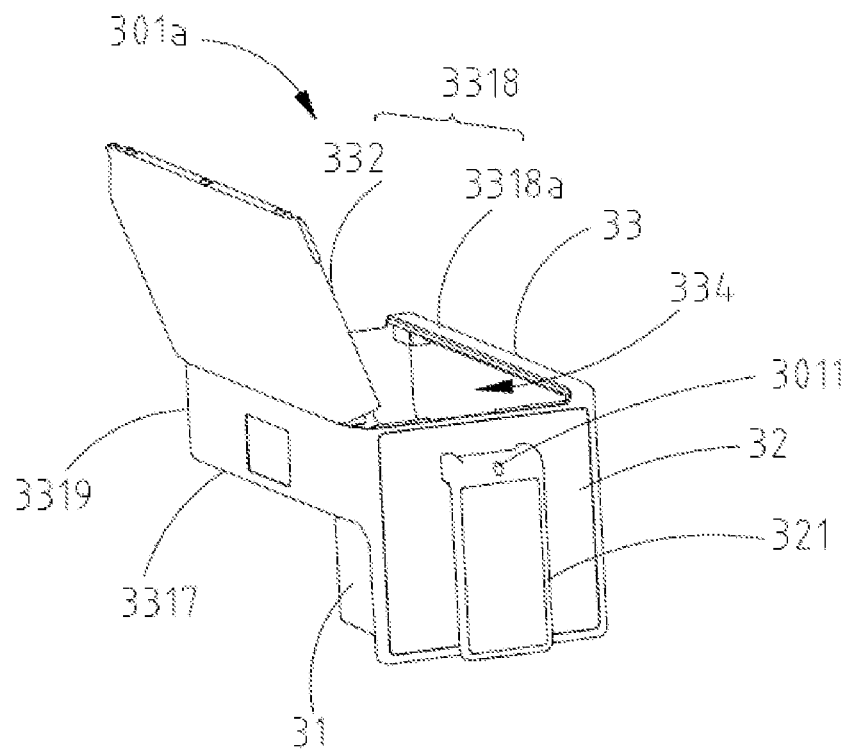
FIG. 79 is a schematic structural diagram of a storage box for a medical article of the medical device of FIG. 75 with a box door opened.

Particularly, referring to FIG. 79, in this embodiment, the storage box 301*a* for the medical article is similar to the storage box 301 for the medical article in the first embodiment and may also include the mounting portion 32 that may be inserted into the accommodation compartment 20, and the accommodation portion 33 fixed on the mounting portion 32, where the accommodation portion 33 is a chamber structure that may house an article. In one embodiment, the size of the mounting portion 32 may be adapted to the size of the space of the fixed compartment body 1*a* in the above embodiment, so it is possible to expand the accommodation space and/or the communication method by inserting the storage box 301*a* for the medical article into the fixed compartment body 1*a* without movement or lifting of the movable compartment body. In addition, the storage box 301 for the medical article further includes a communication connection portion 31, and the communication connection portion 31 is disposed on the mounting portion 32. When the mounting portion 32 is inserted into the accommodation compartment 20, the communication connection portion 31 may be electrically connected to the first connection interface disposed inside the accommodation compartment 20. The first connection interface includes a wireless interface and/or a wired interface, such that a corresponding functional module in the host part 10 may be connected via the first connection interface for communications. The accommodation portion 33 includes an accommodation body 331 and a box door 332 rotatably connected to the accommodation body 331. Particularly, the accommodation body 331 includes a second bottom plate 3317, a second top plate 3318, and a second side plate 3319. The second bottom plate 3317, the second top plate 3318 and the second side plate 3319 enclose an accommodation recess 334 for accommodating the medical article.

When the first fixing member 310 is disposed inside the main case 1 at the connection wall 131, the second fixing member 320 is disposed on the second side plate 3319 adjacent to the connection wall 131, of the accommodation portion 33. Thus, when the second fixing member 320 is approximate to the first fixing member 310, the two can be magnetically attracted and fixed.

Further, in this embodiment, when the second fixing member 320 is disposed on the second side plate 3319 adjacent to the connection wall 131, the second fixing member is also disposed adjacent to the second top plate 3318. That is, the second fixing member 320 is disposed at the connection between the second side plate 3319 adjacent to the connection wall 131 and the second top plate 3318.

Further, in this embodiment, the second top plate 3318 includes a box door 332 and a cover plate 3318*a*. The box door 332 is pivoted on one of the second side plates 3319. Alternatively, the box door 332 is rotatably connected to the second side plate 3319 by means of a hinge or a rotatable arm. The box door 332 can be opened to facilitate storage of an article. The cover plate 3318*a* is fixed on the other second side plate 3319 opposite to the second side plate 3319 provided with the box door, and when the box door 332 and the cover plate 3318*a* are locked, the accommodation recess 334 is closed by the box door 332. The second fixing member 320 is disposed at the connection between the cover plate 3318*a* and the second side plate 3319 adjacent to the connection wall 131. In this way, the storage box 301*a* for the medical article can be fixed by means of attraction between the second fixing member 320 and the first fixing member 310, and there is no affect on the storage of the medical article, such that the accommodation space of the storage box 301*a* for the medical article can be utilized to a greater extent. It may be understood that in a further embodiment, if the first fixing member 310 is disposed inside the first top plate 1012 of the box body structure 12, the second fixing member 320 is then disposed on the second bottom plate 3317 of the accommodation body 331. Thus, when the second fixing member 320 is approximate to the first fixing member 310, the second fixing member 320 and the first fixing member 310 are attracted and fixed to each other.

It may be understood that in other embodiments, in order to further use the accommodation space of the storage box 301*a* for the medical article, the second fixing member 320 may be disposed at any vertex angles adjacent to the cover plate 3318*a* or adjacent to the second bottom plate 3317.

Particularly, referring to FIG. 77 again, the second fixing member 320 includes a protective shell 3201 and a fixed block 3203 disposed inside the protective shell 3201. The fixed block 3203 can be fixed inside the accommodation portion 33 by means of the protective shell 3201.

It may be understood that in a further embodiment, the fixed block 3203 may be directly embedded in a corresponding wall body of the accommodation portion 33 or bonded to the corresponding wall body of the accommodation portion 33 by means of adhesive bonding. Thus, the protective shell 3201 may also be omitted.

Figure 80:
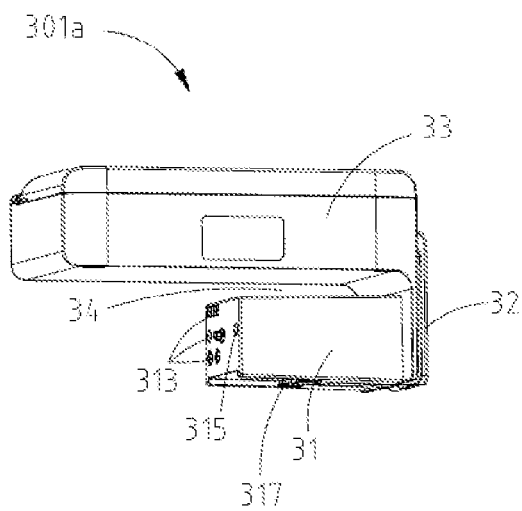
FIG. 80 is a schematic structural diagram, from another direction, of a storage box for a medical article of the medical device of FIG. 75 with a box door closed.
Figure 81:
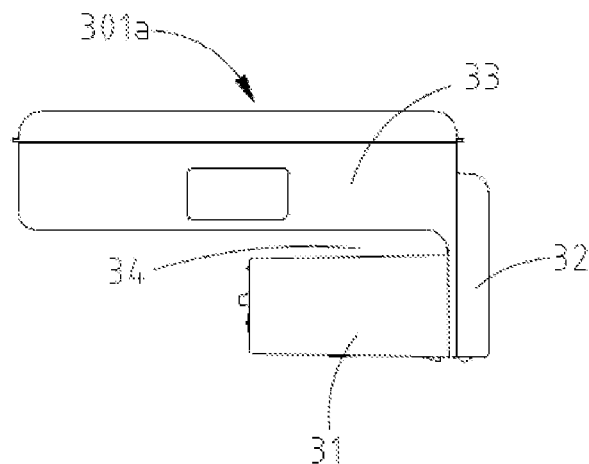
FIG. 81 is a schematic structural diagram, from a further direction, of a storage box for a medical article of the medical device of FIG. 75 with a box door closed.
Figure 82:
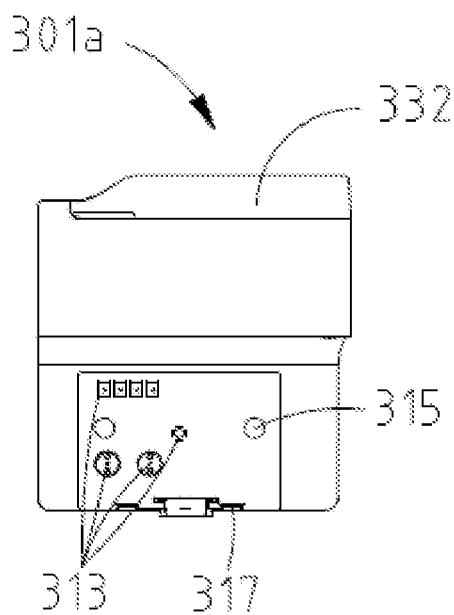
FIG. 82 is a schematic structural diagram, from a still further direction, of a storage box for a medical article of the medical device of FIG. 75 with a box door closed.

Particularly, referring to FIGS. 80 to 82, the end face of the communication connection portion 31 away from the mounting portion 32 is provided with several connection interfaces 313, and the several connection interfaces include, but are not limited to, a power interface and a communication interface. The communication connection portion 31 further includes a first retaining portion 315 disposed on an end face away from the connection portion 32. The accommodation compartment 20 is provided with a corresponding a first retaining member 122*a* on the compartment inner wall corresponding to the communication connection portion 31 (see FIG. 64), and the first retaining portion 315 is arranged to mate with the first retaining member, such that when the communication connection portion 31 is inserted in the chamber of the accommodation compartment 20, the communication connection portion 31 can be properly retained and guided by the cooperation of the first retaining portion 315 and the first retaining member. It may be understood that, when the first retaining portion 315 is a protrusion, the first retaining member is a recess mating with the first retaining portion 315; and when the first retaining portion 315 is a recess, the first retaining member is a protrusion mating with the first retaining portion 315. In one of the embodiments, the several connection interfaces 313 include at least a power interface and a communication interface, and an elastic contact pin structure is used between the power interface as well as the communication interface and the first connection interface provided on the accommodation compartment 20.

The communication connection portion 31 further includes a second retaining portion 317 disposed on a lower surface thereof. The extending direction of the second retaining portion 317 is parallel to the insertion direction of the communication connection portion 31. The accommodation compartment 20 is provided with a corresponding second retaining member 111a on the compartment inner wall corresponding to the lower surface of the communication connection portion 31 (see FIG. 64). The second retaining member cooperates with the second retaining portion 317 such that the communication connection portion 31 can be further retained and the retaining is more accurate. It may be understood that in this embodiment, the second retaining portion 317 includes two retaining pieces extending in the insertion direction of the communication connection portion 31. In other embodiments, both the number of the retaining pieces and the shape of the second retaining portion 317 may be configured according to actual needs, which will not be defined herein.

Figure 83:
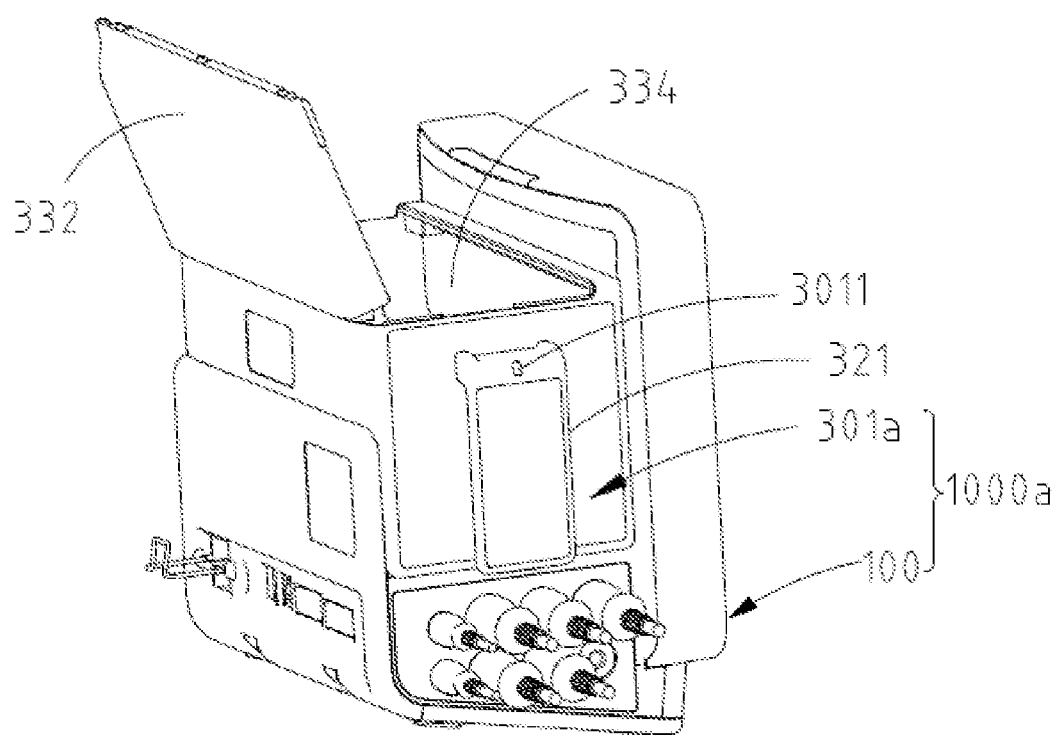
FIG. 83 is a schematic structural diagram of the medical device of FIG. 75, where a box door of a storage box for a medical article of the medical device is opened.

Referring to FIG. 83, a gripping portion 321 is provided on the end face of the connection portion 32 away from the communication connection portion 31, that is, on an outer surface of the connection portion 32. The gripping portion 321 is used for a user to grip so as to carry the storage box 301a for the medical article. In this embodiment, an indicator 3011 is further provided on the gripping portion 321. When the gripping portion 321 of the storage box 301a for the medical article is gripped by hand to align the communication connection portion 31 of the storage box 301a for the medical article with the compartment door 22 of the monitor 100, the communication connection portion 31 pushes and opens the compartment door 22, enters the chamber of the accommodation compartment 20 and then establishes an electrical connection and a communication connection with the monitor 100 inside the chamber. In this case, the indicator 3011 emits light to indicate that the storage box 301a for the medical article has been inserted into place. At the same time, the second fixing member 320 provided on the storage box 301a for the medical article approaches the first fixing member 310 provided on the monitor 100, the two are attracted and fixed to each other, such that stable and reliable electrical connection and communication connection are established between the storage box 301a for the medical article and the monitor 100, and the electrical connection and/or the communication connection will not be interrupted by accidental pulling. At this time, the box door 332 of the storage box 301a for the medical article can be opened for function extension.

Therefore, the storage box 301a for the medical article is removably and connected to the monitor 100 by means of the fixing apparatus 36. Stable and reliable electrical connection and/or communication connection can be established between the storage box 301a for the medical article and the monitor 100, and when an external force greater than the magnetic attraction force from the fixing apparatus 36 is applied to the storage box 301a for the medical article, the storage box 301a for the medical article can also be removed from the monitor 100. Thus, a stable and detachable connection can be formed between the storage box 301a for the medical article and the monitor 100.

It may be understood that in this embodiment, the main case 1, the accommodation compartment 20 and the storage box 301a for the medical article are all made of disinfection resistant material. The disinfection resistant material is, for example, but not limited to, one of polybutylene terephthalate (PBT), polyphenylene sulfone resins (PPSU), polyformaldehyde (POM), polyethylene terephthalate (PET), polycarbonate (PC), polyamide (PA), and polyurethane (PU) or a combination thereof. As such, when the main case 1, the accommodation compartment 20 and the storage box 301a for the medical article are wiped with a high-concentration disinfectant, it is possible to not only avoid corrosion of the main case 1, the accommodation compartment 20 and the storage box 301a for the medical article by the disinfectant, but also avoid scratching and cracking of the main case 1, the accommodation compartment 20 and the storage box 301a for the medical article due to the large coefficient of friction of the disinfection resistant material, thereby prolonging the service life of the medical device 1000a.

Figure 84:
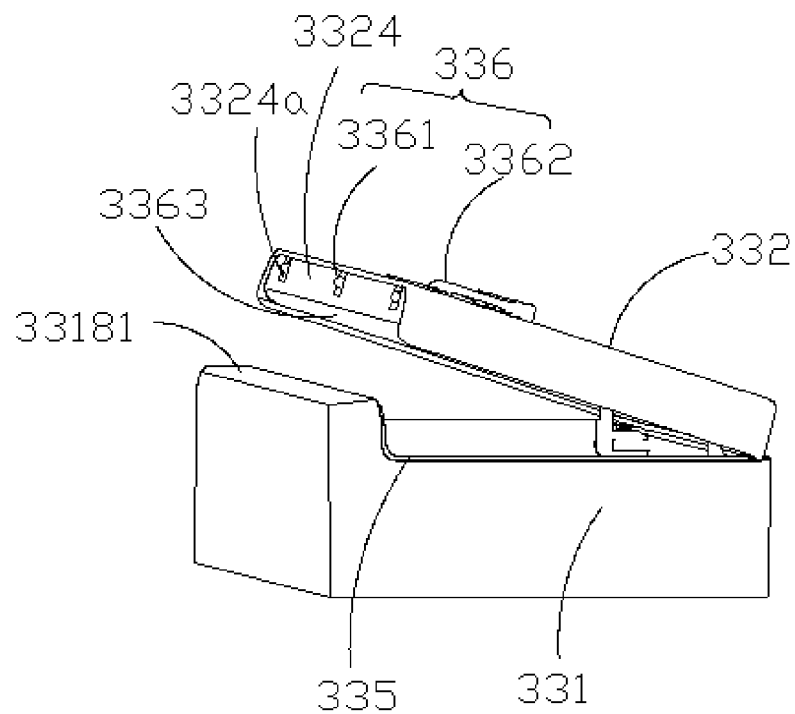
FIG. 84 is a schematic structural diagram of a storage box for a medical article provided according to a first embodiment of this disclosure.
Figure 85:
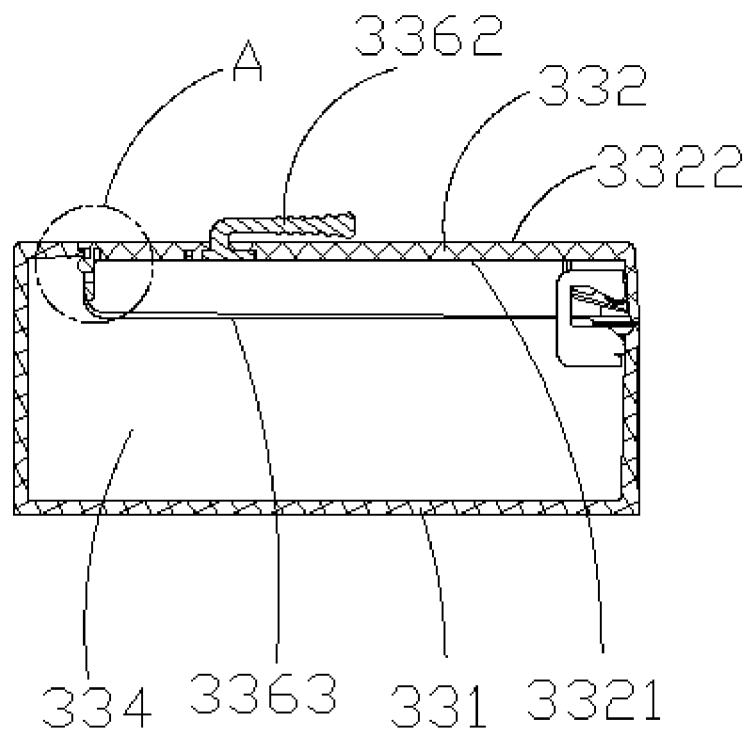
FIG. 85 is a schematic cross-section view of FIG. 84 at a cantilever.

Referring to FIGS. 84 and 85, these are schematic structural diagrams of the latching structure 336 according to the first embodiment of this disclosure. The accommodation body 331 further includes a door frame 33181 that covers part of a region on one side of the opening 335. When the opening 335 is closed by the box door 332, the box door 332, the door frame 33181 and the accommodation body 331 form a whole that has an intact appearance and a closed interior. The latching structure 336 includes a latching portion 3361 and a door driving portion 3362. The latching portion 3361 is disposed on a side wall 3324 of the box door 332. The door driving portion 3362 is disposed on the box door 332. When the opening 335 is closed by the box door 332, the side wall 3324 of the box door 332 is directly opposite the door frame 33181 and the box door 332 is latched on the door frame 33181 of the accommodation body 331 by the latching portion 3361 in such a way that the second surface 3322 of the box door 332 is flush with the outer surface of the door frame 33181. When an external force is applied to the door driving portion 3362 to drive the latching portion 3361 to be separated from the door frame 33181 of the accommodation body 331, the opening 335 is opened by the box door 332.

Figure 86:
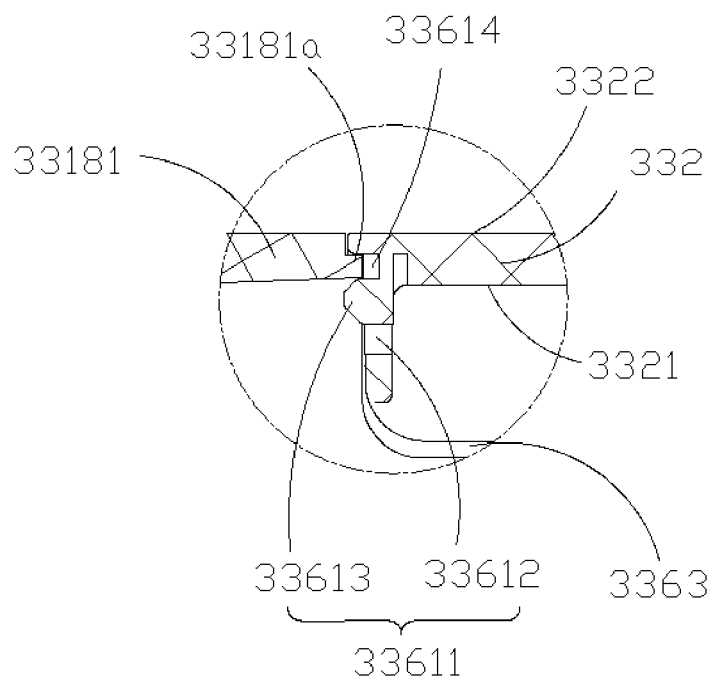
FIG. 86 is a partial enlarged schematic view of FIG. 85 at A.
Figure 87:
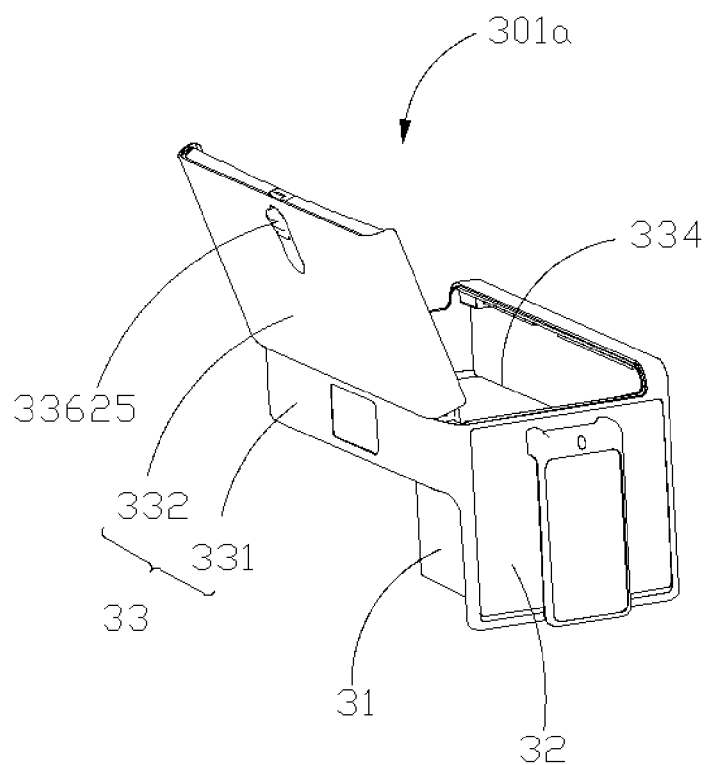
FIG. 87 is a schematic structural diagram of a storage box for a medical article in a second embodiment of this disclosure.
Figure 88:
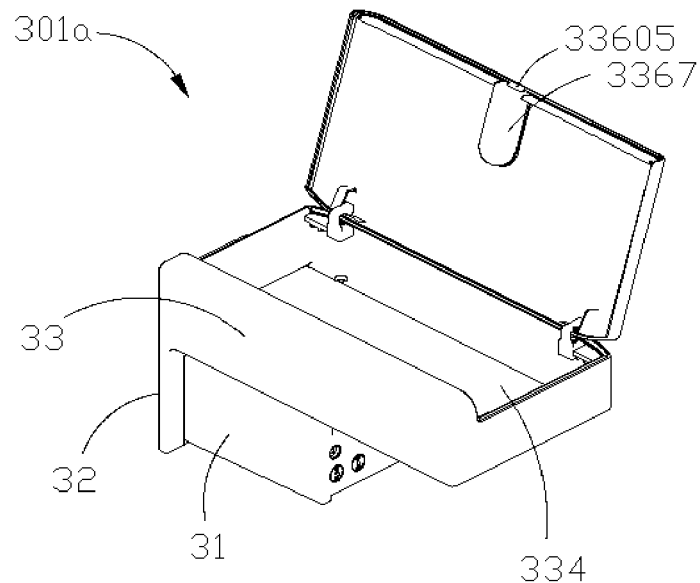
FIG. 88 is a schematic structural diagram, from another direction, of the storage box for the medical article of FIG. 87.
Figure 89:
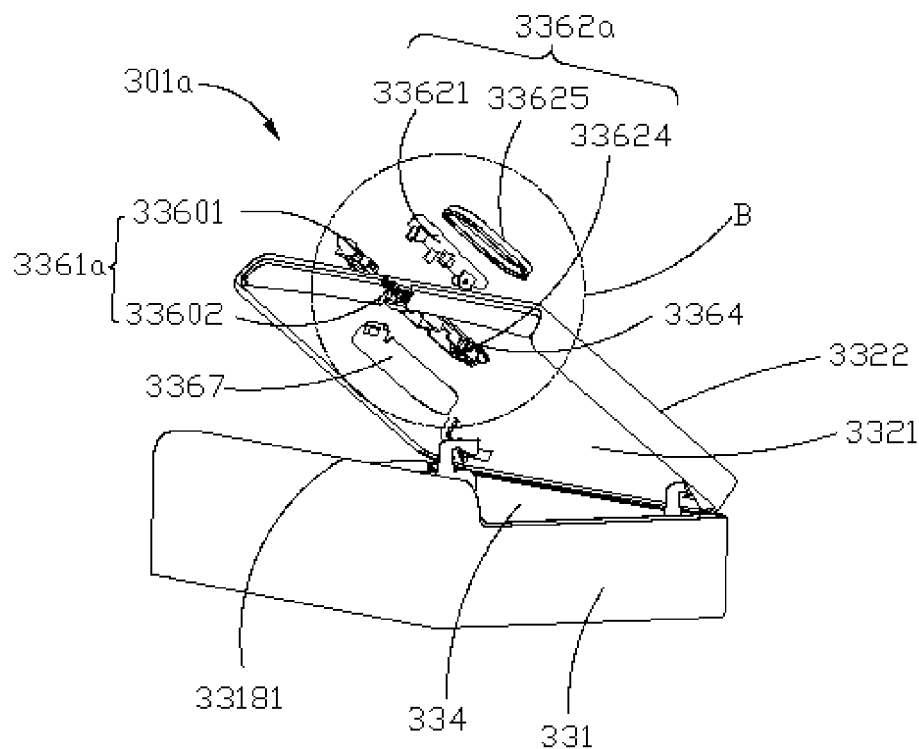
FIG. 89 is a partially schematic diagram of a disassembled storage box for a medical article in a second embodiment of this disclosure.

Particularly, referring to FIGS. 85 and 86, in one embodiment, the latching portion 3361 includes at least one cantilever 33611 that is disposed on the box door 332 and cooperates with the door frame 33181. In this embodiment, the at least one cantilever 33611 includes three cantilevers 33611 arranged at intervals. It may be understood that in other embodiments, the number of the at least one cantilever 33611 may be increased or decreased according to actual conditions, which will not be defined herein. The cantilever 33611 has a predetermined capability to elastically deform. The predetermined capability to elastically deform means that the capability of the cantilever 33611 to elastically deform is within a moderate range, so neither the box door 332 cannot be opened due to the poor capability of elastic deformation, nor the opening 335 cannot be reliably covered by the box door 332 due to excessive capability of elastic deformation. The door driving portion 3362 is disposed on the side of the box door 332 away from the storage chamber 334. When the opening 335 is closed by the box door 332, the cantilever 33611 is in interference fit with the door frame 33181 of the accommodation body 331. When a pulling force pulling outward is applied to the door driving portion 3362, the cantilever 33611 is separated from the door frame 33181 of the accommodation body 331, and the opening 335 is opened by the box door 332.

Particularly, each of the cantilevers 33611 includes a first cantilever 33612 extending toward one side of the storage chamber 334 from the first surface 3321 of the box door 332, and a second cantilever 33613 extending toward one side of the side wall 3324 of the box door 332 from the first cantilever 33612. When the opening 335 is closed by the box door 332, the second cantilever 33613 engages with the door frame 33181 of the accommodation body 331.

In this embodiment, the first cantilever 33612 is substantially perpendicular to the first surface 3321 of the box door 332, and the second cantilever 33613 is substantially perpendicular to the first cantilever 33612. It may be understood that in this embodiment, the first cantilever 33612 is not limited to be perpendicular to, but may also be slightly inclined to the first surface 3321 of the box door 332, and the second cantilever 33613 is not limited to be perpendicular to, but may also be slightly inclined to the first cantilever 33612, which will not be defined herein.

Further, a protrusion 33181a is provided on an engagement end where the door frame 33181 of the accommodation body 331 cooperates with the cantilever 33611. It may be understood that in this embodiment, the protrusion 33181a is a stepped structure. When the opening 335 is closed by the box door 332, the interaction force between the protrusion 33181a and the second cantilever 33613 causes the first cantilever 33612 and/or the second cantilever 33613 to deform and slide into the side of the protrusion 33181a close to the storage chamber 334 from the side of the protrusion 33181a away from the storage chamber 334 and further engage with the side of the protrusion 33181a close to the storage chamber 334.

Further, a limiting portion 33614 with an accommodation space is formed between the first cantilever 33612, the second cantilever 33613 and the box door 332. When the second cantilever 33613 engages with the side of the protrusion 33181a close to the storage chamber 334, the protrusion 33181a is accommodated inside the limiting portion 33614 so as to prevent the box door 332 from falling into the storage chamber 334.

Further, both sides of the second cantilever 33613 close to the box door 332 and away from the box door 332 are inclined and curved. That is, the second cantilever 33613 is generally wedge-shaped, which facilitates the second cantilever 33613 sliding to the side of the protrusion 33181a close to the storage chamber 334 from the side of the protrusion 33181a away from the storage chamber 334, and also facilitates the second cantilever 33613 sliding to the side of the protrusion 33181a away from the storage chamber 334 from the side of the protrusion 33181a close to the storage chamber 334.

Further, referring to FIGS. 84 and 85, the latching structure 336 further includes a mask 3363. The mask 3363 is disposed at a first face 3321 of the box door 332 and covers the cantilever 33611. The side of the mask 3363 facing the door frame 33181 is provided with a first notch 3324a corresponding to each second cantilever 33613. The mask 3363 covers the first cantilever 33612 and allows the second cantilever 33613 to protrude through the corresponding first notch 3324a.

Further, the mask 3363 extends, in a direction parallel to the surface of the box door, to a position where the box door 332 is pivoted to the accommodation body 331 from the first cantilever 33612.

Particularly, in this embodiment, the door driving portion 3362 is a door handle, where the door handle extends from the side of the box door 332 away from the storage chamber 334, then bends and extends in a direction parallel to the box door 332. The portion of the door handle that extends in the direction parallel to the box door 332 faces one side of the box door. Further, the door driving portion 3362 is provided with an anti-slip protrusion that includes, but is not limited to, a raised point or a ridge.

Thus, when it is necessary to open the opening 335 of the accommodation body 331 for storage of the medical article, the door handle is pulled hard, such that the protrusion 33181a is pressed from below by the wedged face of the second cantilever 33613 to further urge the first cantilever 33612 and/or the second cantilever 33613 to deform and slide to the side of the protrusion 33181a away from the storage chamber 334 from the side of the protrusion 33181a close to the storage chamber 334, so the box door 331 is separated from the door frame 33181. When it is necessary to close the opening 335 of the accommodation body 331, the door handle is gripped and pressed down such that the protrusion 33181a is pressed from above by the other wedged face of the second cantilever 33613 to further urge the first cantilever 33612 and/or the second cantilever 33613 to deform and slide to the side of the protrusion 33181a close to the storage chamber 334 from the side of the protrusion 33181a away from the storage chamber 334, so the box door 331 is fitted to the door frame 33181 in a covering manner, and the second surface 3322 of the box door 331 is flush with the surface of the door frame 33181 to form an integrated whole.

Figure 90:
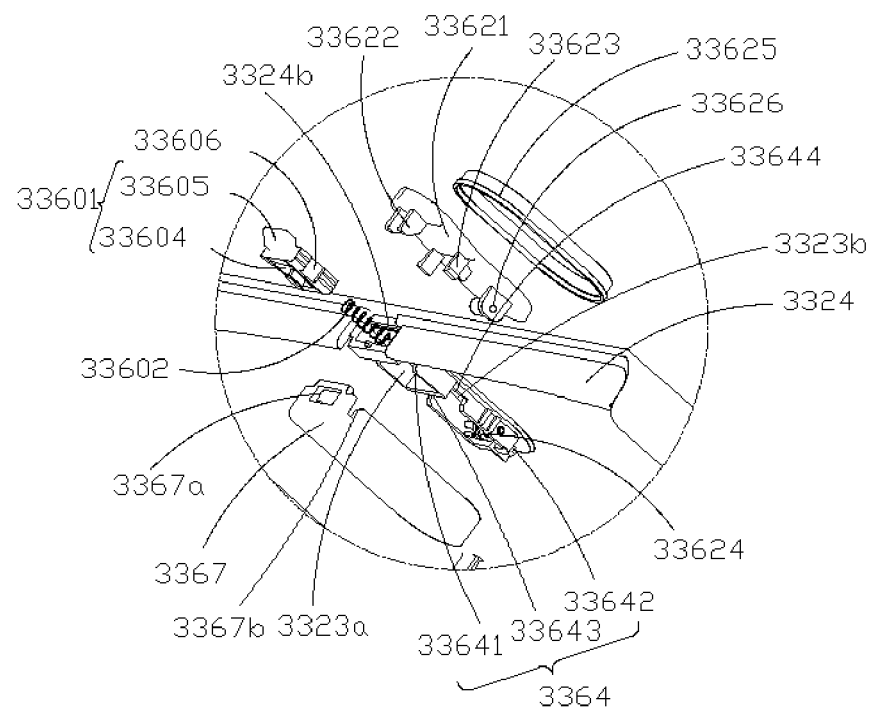
FIG. 90 is a partial enlarged schematic view of FIG. 89 at B.
Figure 91:
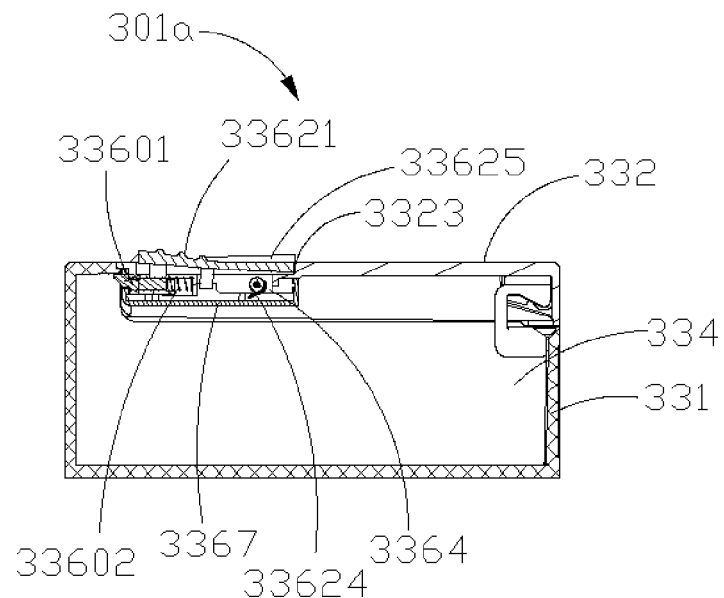
FIG. 91 is a schematic cross-section view of a storage box for a medical article in a second embodiment of this disclosure at a locking pin.

Referring to FIGS. 87 to 91, these are schematic structural diagrams of the storage box 301a for the medical article according to the second embodiment of this disclosure. It may be understood that the storage box 301a for the medical article in the second embodiment is similar to the structure of the storage box 301 for the medical article in the first embodiment, except that the latching structure 336a of the storage box 301a for the medical article in the second embodiment is different from the structure of the latching structure 336 of the storage box 301 for the medical article in the first embodiment. In the second embodiment, the latching structure 336a includes a latching portion 3361a and a door driving portion 3362a. The latching portion 3361a includes a locking pin 33601, and the door driving portion 3362a includes a button 33621. The box door 332 is provided with an accommodation space 3323 (as shown in FIG. 91) adjacent to the side wall 3324 thereof. The accommodation space 3323 penetrates the first surface 3321 and the second surface 3322 of the box door 332. The side wall 3324 of the box door 332 is provided with a second notch 3324b (as shown in FIG. 90) in communication with the accommodation space 3323, and the locking pin 33601 is movably accommodated inside the accommodation space 3323. In addition, one end of the locking pin 33601 may protrude through the second notch 3324b and engage with the door frame 33181. The end of the button 33621 away from the locking pin 33601 is rotatably pivoted inside the accommodation space 3323, and the end of the button 33621 close to the locking pin 33601 is located above the locking pin 33601. When the button 33621 is pressed down to drive the locking pin 33601 to be retracted, the locking pin 33601 is separated from the door frame 33181, so the opening 335 is opened by the box door 332.

Further, referring to FIG. 90, the locking pin 33601 includes a locking pin body 33604, and a tongue 33605 disposed on one end of the locking pin body 33604. The locking pin body 33604 is provided with at least one guide groove 33606. The button 33621 is provided with at least one protruding guide bar 33622 on the side facing the locking pin body 33604. The at least one guide bar 33622 is respectively disposed in the at least one guide groove 33606. When the button 33621 moves relative to the locking pin 33601, the guide groove 33606 guides the movement of the button 33621.

Particularly, in this embodiment, the at least one guide groove 33606 includes two guide grooves 33606, and the at least one guide bar 33622 includes two guide bars 33622. The two guide bars 33622 are respectively disposed in the two guide groove 33606 so as to guide the movement of the button 33621 relative to the locking pin 33601. It may be understood that in other embodiments, the at least one guide groove 33606 and the at least one guide bar 33622 can be adjusted according to actual conditions, which will not be defined herein.

Further, the latching structure 336a further includes a fixing bracket 3364. The fixing bracket 3364 is fixed in the accommodation space 3323 of the box door 332. The fixing bracket 3364 includes a first frame 33641, a second frame 33642, and a partition 33643 disposed between the first frame 33641 and the second frame 33642. The first frame 33641 and the partition 33643 enclose a first accommodation space 3323a close to the side wall 3324 of the box door 332. The second frame 33642 and the partition 33643 enclose a second accommodation space 3323b away from the side wall 3324 of the box door 332. The locking pin 33601 is disposed in the first accommodation space 3323a, and the end of the button 33621 away from the locking pin 33601 is rotatably pivoted in the second accommodation space 3323b.

In one embodiment, the second frame 33642 is provided with at least one engaging groove 33644. The side of the button 33621 close to the storage chamber 334 is provided with at least one hook 33623. When the end of the button 33621 away from the locking pin 33601 is inserted into the second accommodation space 3323b, the at least one hook 33623 is correspondingly engaged with the at least one engaging groove 33644. Thus, the button 33621 is prevented from being separated from the fixing bracket 3364.

Particularly, in this embodiment, the at least one engaging groove 33644 includes two engaging grooves 33644. The two engaging grooves 33644 are respectively arranged on opposite walls of the second frame 33642. The at least one hook 33623 includes two hooks 33623. The hooks 33623 are inverted L-shaped. The two hooks 33623 are arranged back to back. The end of the button 33621 away from the locking pin 33601 is inserted into the second accommodation space 3323b, and the two hooks 33623 are respectively engaged into the two engaging grooves 33644.

Further, in an embodiment, the latching portion 3361a further includes a return elastic piece 33602. One end of the return elastic piece 33602 is disposed at the end of the locking pin body 33604 away from the tongue 33605, and the other end thereof abuts against and/or is fixed to the partition 33643 of the fixing bracket 3364.

Further, in an embodiment, the door driving portion 3362a further includes a torsion spring 33624. The torsion spring 33624 enables the end of the button 33621 away from the locking pin 33601 to be pivoted on the second frame 33642. The latching structure 336a further includes a button cover 3367. The button cover 3367 is disposed on the side of the box door 332 close to the storage chamber 334 and covers the locking pin 33601, the button 33621 and the fixing bracket 3364. One arm of the torsion spring 33624 abuts against the box door 332, and the other arm thereof abuts against the button cover 3367.

Further, in an embodiment, the end of the button 33621 away from the locking pin 33601 is provided with a pivoting portion 33626. The torsion spring 33624 is pivoted on the pivoting portion 33626.

Further, in an embodiment, the side of the button cover 3367 close to the side wall 3324 of the box door 332 is provided with a third notch 3367a, and the third notch 3367a is arranged to correspond to the second notch 3324b and is located on the outer side of the second notch 3324b. The tongue 33605 of the locking pin 33601 protrudes through the second notch 3324b and the third notch 3367a in sequence.

Further, in an embodiment, the button cover 3367 is provided with a fourth notch 3367b corresponding to the side wall 3324, and when the button cover 3367 is fixed on the box door 332, the side wall 3324 is partially inserted into the fourth notch 3367b.

The latching structure 336a further includes soft button rubber 33625. The soft button rubber 33625 is adapted to the structure of the button 33621. The soft button rubber 33625 is disposed on the button 33621 and covers the button 33621.

Further, the soft button rubber 33625 is provided with an anti-slip protrusion that includes, but is not limited to, a ridge, a raised point and so on.

Referring to FIGS. 90 and 91, in the second embodiment, when the opening 335 is closed by the box door 332, the tongue 33605 of the latching portion 3361a is engaged with the door frame 33181 of the accommodation body 331. When the opening 335 needs to be opened for storage of the medical article, pressure is applied to the door driving portion 3362a, the tongue 33605 of the latching portion 3361a is retracted into the third notch 3367a under the interaction force between the wedged face thereof and the third notch 3367a, such that the tongue 33605 of the latching portion 3361a is no longer engaged with the door frame 33181 of the accommodation body 331. At the same time, the return elastic piece 33602 is compressed into a compressed state, and the torsion spring 33624 is also compressed into a compressed state when a pressure is applied to the door driving portion 3362a. Therefore, when the tongue 33605 of the latching portion 3361a is no longer engaged with the door frame 33181 of the accommodation body 331, the elastic restoring force of the torsion spring 33624 enables the box door 332 to spring upward, so the opening 335 is opened by the box door 332. At this time, the elastic restoring force of the return elastic piece 33602 urges the tongue 33605 of the latching portion 3361a to protrude through the third notch 3367a again. When the opening 335 needs to be closed, a pressure is applied to the door driving portion 3362a, the tongue 33605 of the latching portion 3361a is retracted into the third notch 3367a under the interaction between the wedged face thereof and the door frame 33181 of the accommodation body 331, so that the box door 332 can cover the opening 335. When the second surface 3322 of the box door 332 is flush with the upper surface of the door frame 33181, the tongue 33605 of the latching portion 3361a moves downward to a position where the tongue just does not abut against the side wall of the door frame 33181. At this time, the elastic restoring force of the return elastic piece 33602 urges the tongue 33605 of the latching portion 3361a to protrude through the third notch 3367a again to engage with the door frame 33181. Therefore, the actual latching principle of the latching structure 336a in the second embodiment is simply pressing to open and then pressing to close.

Referring to FIGS. 92 to 96, these are schematic structural diagrams of the storage box 301b for medical article according to the third embodiment of this disclosure. The storage box 301b for medical article is similar to the storage box 301 for the medical article in the first embodiment, except that the latching structure 336b of the storage box 301b for the medical article is different from the latching structure 336 of the storage box for the medical article. Particularly, the latching structure 336b includes a latching portion 3361b and a door driving portion 3362b. In this embodiment, the latching portion 3361b is at least one latch 33650. The door driving portion 3362b includes a toggle button 3366. The toggle button 3366 is generally L-shaped, with one end thereof protruding to form a gripping portion to facilitate gripping by the user. The at least one latch 33650 is disposed on a first surface 3321 of the box door 332, the toggle button 3366 is disposed on a second surface 3322 of the box door 332, the at least one latch 33650 is connected to the toggle button 3366. When the at least one latch 33650 engages with the door frame 33181, an external force is applied to the toggle button 3366, such that when the at least one latch 33650 is retracted, the box door 332 is separated from the door frame 33181.

Figure 92:
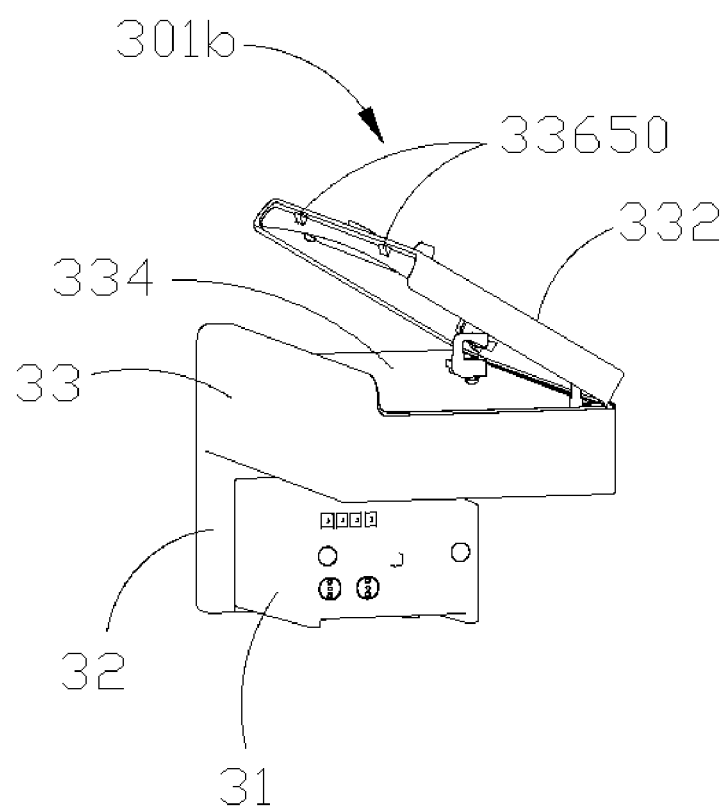
FIG. 92 is a schematic structural diagram of a storage box for a medical article in a third embodiment of this disclosure.
Figure 93:
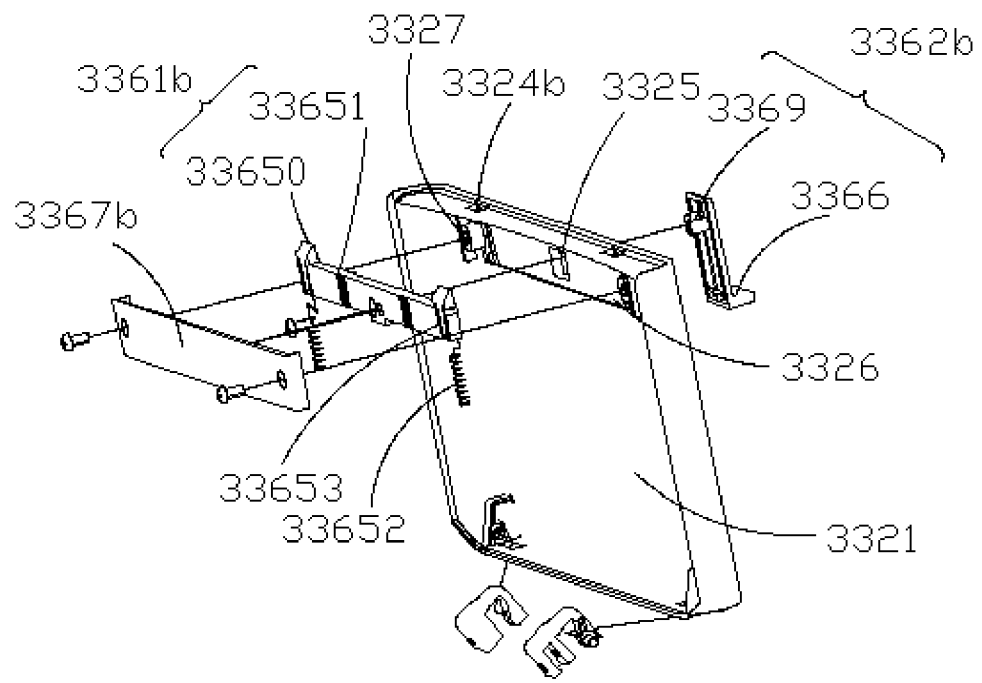
FIG. 93 is a disassembled schematic diagram of a box door and a latching structure of FIG. 92.
Figure 94:
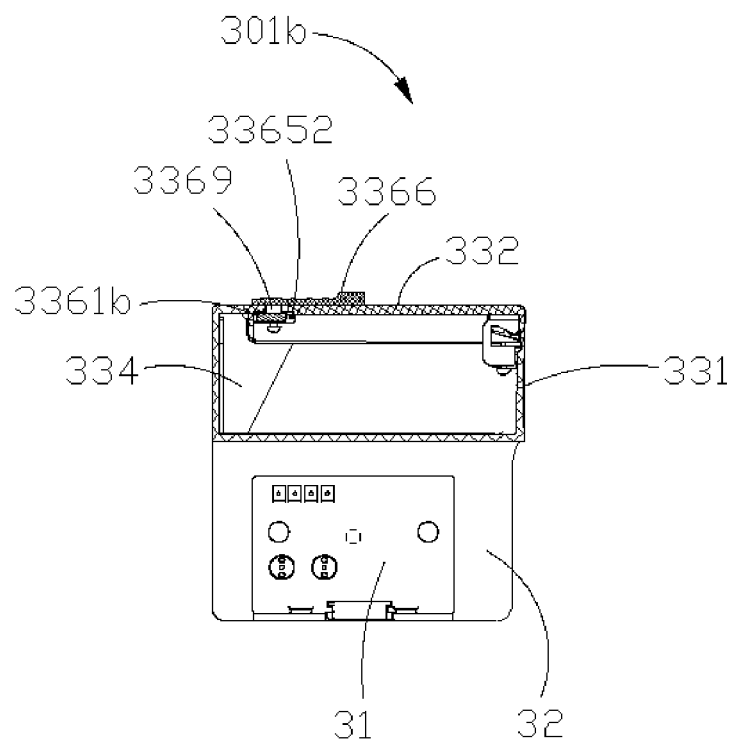
FIG. 94 is a schematic cross-section view of a storage box for a medical article provided according to a third embodiment of this disclosure at a through hole in a box door.

Particularly, referring to FIGS. 92 and 93, the box door 332 is provided with a through hole 3325 passing through the first surface 3321 and the second surface 3322. A connection portion 3369 is provided on the at least one latch 33650 and/or the toggle button 3366. In this embodiment, the connection portion 3369 is disposed on the toggle button 3366. Referring to FIG. 94, the connection portion 3369 passes through the through hole 3325 and connects the toggle button 3366 with the at least one latch 33650. Thus, when the toggle button 3366 is pushed to slide on the second surface 3322 of the box door 332, the toggle button 3366 may drive the at least one latch 33650 via the connection portion 3369 to slide on the first surface 3321 of the box door 332 so as to achieve the opening and closing of the box door 332.

Further, referring to FIG. 93 again, in this embodiment, the at least one latch 33650 includes two latches 33650. It may be understood that in other embodiments, the at least one latch 33650 includes multiple latches 33650. If the at least one latch 33650 includes two or more latches 33650, the latches 33650 are connected to each other. Particularly, the at least one latch 33650 includes a connection arm 33651 disposed between the adjacent latches 33650. The connection arm 33651 is connected between the two adjacent latches 33650. The toggle button 3366 is connected on the connection arm 33651 by means of the connection portion 3369. Thus, when the toggle button 3366 is pushed to slide on the second surface 3322 of the box door 332, the multiple latches 33650 may be simultaneously driven by the toggle button 3366 to slide on the first surface 3321, thereby achieving simpler operation.

Further, the side wall 3324 of the box door 332 is provided with at least one fifth notch 3324b, and the at least one latch 33650 respectively and correspondingly protrudes through the at least one fifth notch 3324b. Particularly, in this embodiment, the at least one fifth notch 3324b includes two fifth notches 3324b. The two latches 33650 respectively protrude through the two fifth notches 3324b.

Further, in this embodiment, the latching portion 3361b further includes at least one return elastic piece 33652. One end of the at least one return elastic piece 33652 is fixed on the first surface 3321 of the box door 332, and the other end of the at least one return elastic piece is respectively fixed on the at least one latch 33650. When the toggle button 3366 drives the at least one latch 33650 to retract, the elastic restoring force of the at least one return elastic piece 33652 after being compressed urges the at least one latch 33650 to return.

Figure 95:
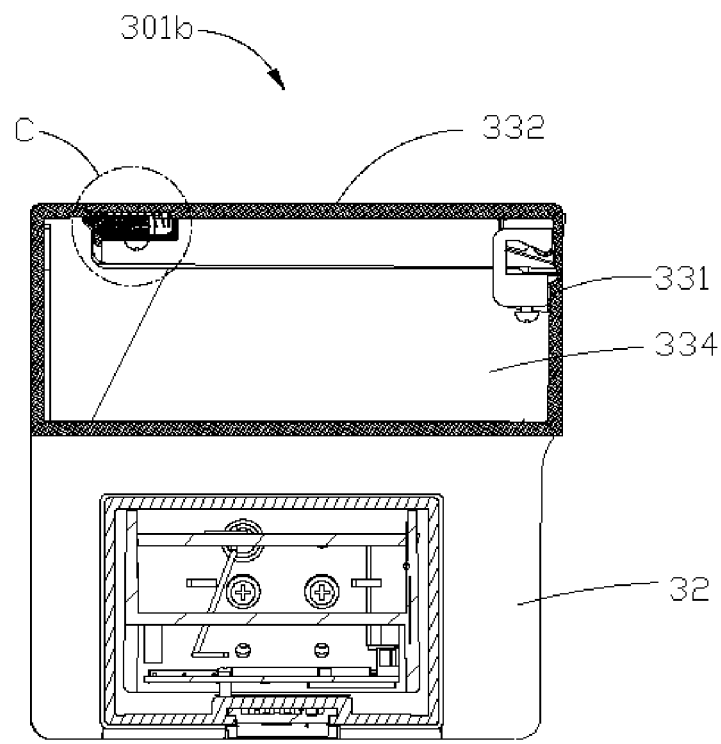
FIG. 95 is a schematic cross-section view of a storage box for a medical article provided according to a third embodiment of this disclosure at a latch.

Particularly, referring to FIGS. 93 and 95, each of the latches 33650 is provided with a mounting slot 33653 at the end away from the side wall 3324 of the box door 332. The mounting slot 33653 is adapted to the shape of the return elastic piece 33652. The first surface 3321 of the box door 332 is provided with a accommodation recess 3326 that houses the at least one latch 33650. The at least one latch 33650 is housed in the accommodation recess 3326, one end of the return elastic piece 33652 is disposed in the mounting slot 33653, and the other end of the return elastic piece abuts against a recess wall of the accommodation recess 3326.

Figure 96:
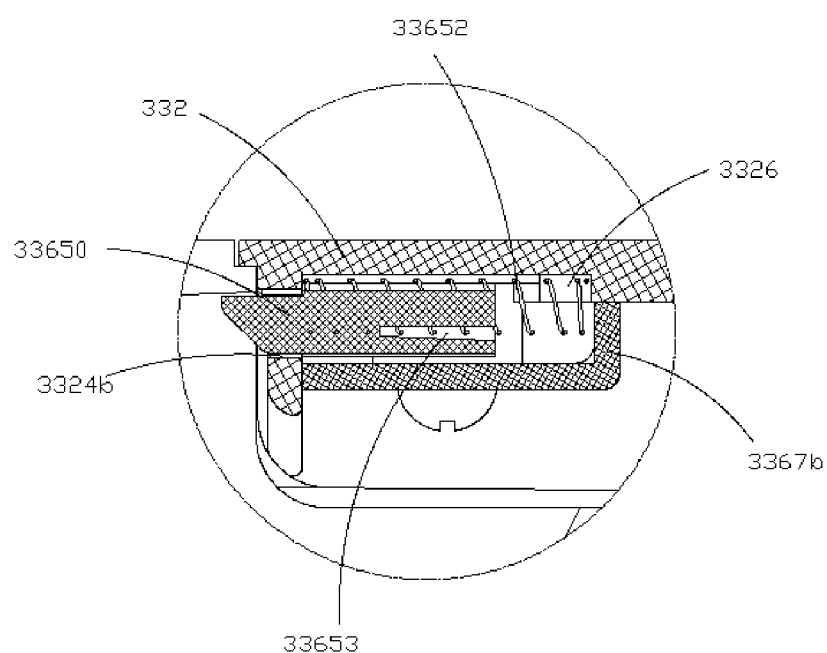
FIG. 96 is a partial enlarged schematic view of FIG. 95 at C.
Figure 97:
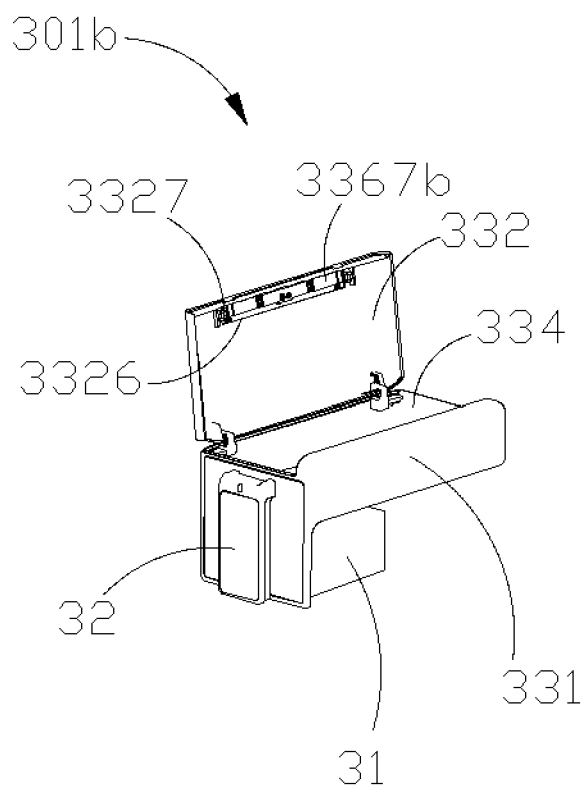
FIG. 97 is a schematic structural diagram of a storage box for a medical article provided according to a third embodiment of this disclosure, where a latch bracket is removed from the storage box for the medical article.

Further, referring to FIGS. 93 and 96, the latching structure 336b further includes a latch bracket 3367b. The latch bracket 3367b is disposed on a first surface 3321 of the box door 332 and allows the at least one latch 33650 to be located between the latch bracket 3367b and the box door 332. Particularly, the box door 332 further includes at least one fixed column 3327 disposed on the first surface 3321. In this embodiment, the box door 332 includes two fixed columns 3327 disposed on the first surface 3321. The two fixed columns 3327 are respectively disposed on two sides of the at least one latch 33650. The latch bracket 3367b locks the latch bracket 3367b to the first surface 3321 of the box door 332 by means of a connection member such as a screw. Thus, the latch bracket 3367b masks the at least one latch 33650, the fixed columns 3327 and the return elastic piece 33652, and the at least one latch 33650 exposes from the side wall 3324 of the box door 332.

Thus, in this embodiment, when the box door 332 closes the opening 335, the at least one latch 33650 is engaged with the door frame 33181 of the accommodation body 331. When the opening 335 needs to be opened for storage of the medical article, a pulling force is applied to the toggle button 3366 to enable the toggle button to slide on the second surface 3322 of the box door 332, and the toggle button 3366 drives the at least one latch 33650 by the connection portion 3369 to slide on the first surface 3321 of the box door 332, such that when the at least one latch 33650 is no longer engaged with the door frame 33181 of the accommodation body 331, the toggle button 3366 is pulled outward to open the box door 332. When the toggle button 3366 drives the at least one latch 33650 by the connection portion 3369 to slide on the first surface 3321 of the box door 332 such that the at least one latch 33650 is no longer engaged with the door frame 33181 of the accommodation body 331, the return elastic piece 33652 is in a compressed state, and when the opening 335 is opened by the box door 332, the return elastic piece 33652 returns to urge the at least one latch 33650 to return.

When the opening 335 needs to be closed by the box door 332, the box door 332 is pressed downward, such that the wedged face of the at least one latch 33650 abuts against the door frame 33181 of the accommodation body 331, the at least one latch is retracted under the interaction with the door frame 33181, and the box door 332 can thus cover the opening 335. When the second surface 3322 of the box door 332 is flush with the upper surface of the door frame 33181, the at least one latch 33650 moves downward to a position where the at least one latch just does not abut against the side wall of the door frame 33181. At this time, the elastic restoring force of the return elastic piece 33652 urges the at least one latch 33650 to protrude through the fifth notch 3324b again to engage with the door frame 33181.

According to the storage box for the medical article applied to the monitor in this disclosure, the box door can be latched on the accommodation body by means of the latching structure, where the latching structure is easily operated to open and close and is durable, which provides a good solution of rapid storage of cables and objects, solves the problems that the held object is prone to falling off and wires are exposed, and meets the requirements of cleaning and disinfection.

Figure 98:
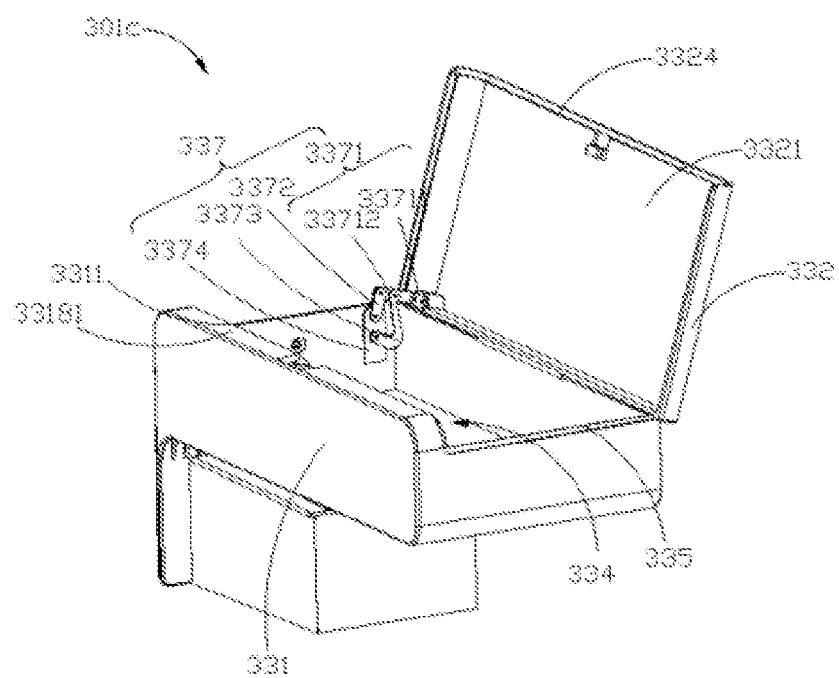
FIG. 98 is a schematic structural diagram of a storage box for a medical article provided according to a fourth embodiment of this disclosure.

Referring to FIG. 98, FIG. 98 is a schematic structural diagram of the storage box for the medical article provided according to the fourth embodiment of this disclosure. Different from the above three embodiments, the storage box 301c for medical article in the fourth embodiment further includes a pivoted structure 337. The pivoted structure 337 is a four-linkage mechanism. In this embodiment, two four-linkage mechanisms are provided and disposed on two opposite sides of the accommodation body 331. It may be understood that in other embodiments, one four-linkage mechanism is provided and may be disposed on one side of the accommodation body 331. The four-linkage mechanism includes a first linkage 3371, a second linkage 3372, a third linkage 3373 and a fourth linkage 3374. The first linkage 3371 is fixed on the first surface 3321 of the box door 332. The fourth linkage 3374 is fixed vertically on the inner wall of the accommodation body 331. Two ends of the second linkage 3372 are respectively rotatably connected to the proximal extreme ends of the first linkage 3371 and the fourth linkage 3374. Two ends of the third linkage 3373 are respectively rotatably connected to the middle of the first linkage 3371 and the middle of the fourth linkage 3374.

Particularly, the length of the second linkage 3372 is less than that of the third linkage 3373, the third linkage 3373 is bent, and an opening of the third linkage 3373 opens to the second linkage 3372.

Particularly, the accommodation body 331 further includes a door frame 33181 that covers part of the region on one side of the opening 335. The box door 332 is provided with a side wall 3324 mating with the door frame 33181. The first linkage 3371 includes a fixed portion 33711, and a connection portion 33712 bended and extending from the fixed portion 33711. The fixed portion 33711 is fixed on a vertex angle region on the side of the box door 332 away from the side wall 3324. The connection portion 33712 protrudes vertically from the first surface 3321 of the box door 332. A free end of the connection portion 33712 is rotatably connected to one end of the second linkage 3372. One end of the third linkage 3373 is rotatably connected to the middle of the connection portion 33712. The accommodation body 331 further includes a side plate 3311 adjacent to both the door frame 33181 and the first linkage 3371. The fourth linkage 3374 is disposed vertically on the inner wall of the side plate 3311.

Further, the directions of pivots between the first linkage 3371, the second linkage 3372, the third linkage 3373 and the fourth linkage 3374 are each perpendicular to the side plate 3311.

Thus, the storage box 301c for medical article can be opened and closed by the four-linkage mechanism, and since the four-linkage mechanism has a predetermined stroke, the four-linkage mechanism enables the storage box 301c for the medical article to open the box door 332 only by a predetermined angle, which facilitates storage of the medical article and also facilitates opening and closing the box door 332.

Figure 99:
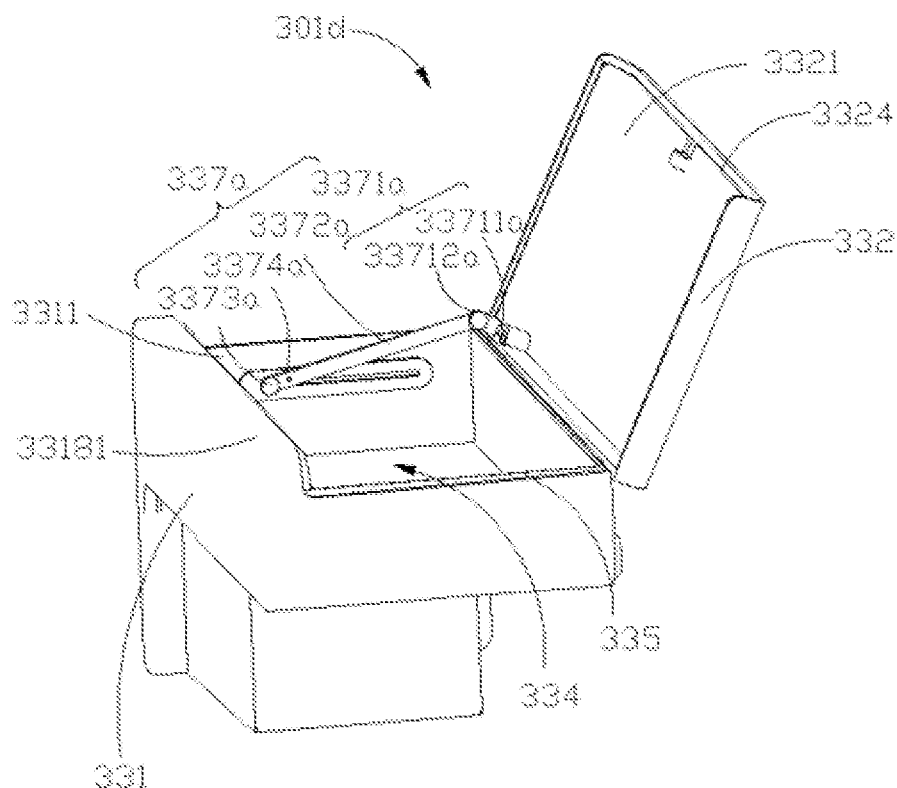
FIG. 99 is a schematic structural diagram of a storage box for a medical article provided according to a fourth embodiment of this disclosure.

Referring to FIG. 99, FIG. 99 is a schematic structural diagram of the storage box 301d for the medical article provided according to the fifth embodiment of this disclosure. Different from the above three embodiments, the storage box 301d for the medical article in the fifth embodiment further includes a pivoted structure 337a. The pivoted structure 337a is a crank slider mechanism. In this embodiment, two crank slider mechanisms are provided and disposed on two opposite sides of the accommodation body 331. It may be understood that in other embodiments, one crank slider mechanism is provided and may be disposed on one side of the accommodation body 331. The crank slider mechanism includes a crank 3371a, a linkage 3372a, a slider 3373a, and a framework 3374a. The crank 3371a is fixed on the first surface 3321 of the box door 332. The framework 3374a is fixed horizontally on the inner wall of the accommodation body 331 and is provided with a sliding slot 33741a. One end of the linkage 3372a is rotatably connected to a free end of the crank 3371a. One end of the slider 3373a is rotatably connected to the other end of the linkage 3372a, and the other end of the slider 3373a is slidably disposed in the sliding slot 33741a.

Further, the accommodation body 331 further includes a door frame 33181 that covers part of the region on one side of the opening 335, and the box door 332 includes a side wall 3324 mating with the door frame 33181. The crank 3371a includes a fixed portion 33711a, and a connection portion 33712a bent and extending from the fixed portion 33711a. The fixed portion 33711a is fixed on a vertex angle region at the side of the box door 332 away from the side wall 3324. The connection portion 33712a protrudes vertically from the first surface 3321 of the box door 332. A free end of the connection portion 33712a is rotatably connected to one end of the linkage 3372a. The accommodation body 331 further includes a side plate 3311 adjacent to both the door frame 33181 and the crank 3371a. The framework 3374a is disposed horizontally on the inner wall of the side plate 3311.

Further, the length of the linkage 3372a is much greater than the length of the slider 3373a, and the slider 3373a is a sliding guide pin disposed in the sliding slot 33741a.

Further, the directions of the pivots between the crank 3371a, the linkage 3372a, the slider 3373a and the framework 3374a are each perpendicular to the side plate 3311.

Thus, the storage box 301d for the medical article can be opened and closed by the crank slider mechanism, and since the crank slider mechanism has the predetermined stroke, the crank slider mechanism enables the storage box 301c for the medical article to open the box door 332 only by a predetermined angle, which facilitates storage of the medical article and also facilitates opening and closing the box door 332.

Figure 100:
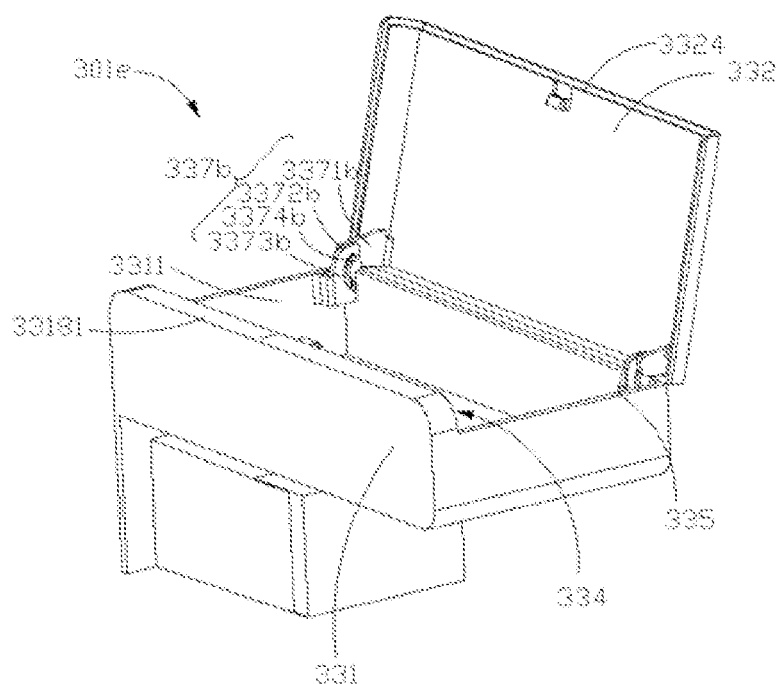
FIG. 100 is a schematic structural diagram of a storage box for a medical article provided according to a fifth embodiment of this disclosure.

Referring to FIG. 100, FIG. 100 is a schematic structural diagram of the storage box 301e for medical article provided according to the sixth embodiment of this disclosure. Different from the above three embodiments, the storage box 301e for the medical article in the sixth embodiment further includes a pivoted structure 337b. The pivoted structure 337b is a slider structure. In this embodiment, two slider structures are provided and disposed on opposite sides of the accommodation body 331. It may be understood that in other embodiments, one slider structure is provided and may be disposed on one side of the accommodation body 331. The slider structure includes a sliding body 3371b disposed on the box door 332 and a fixed body 3372b disposed on the accommodation body 331. The fixed body 3372b is provided with a sliding slot 3373b, the sliding body 3371b is provided with a corresponding sliding portion 3374b, and the sliding portion 3374b is inserted into the sliding slot 3373b to slide in the sliding slot 3373b.

Further, the sliding slot 3373b is arc-shaped and extends from the side close to the box door 332 to the side away from the box door 332, and the opening of the sliding slot 3373b opens to the sliding body 3371b.

Further, the free end of the sliding body 3371b extends toward the accommodation body 331, and extends into the storage chamber 334 of the accommodation body 331 when the box door 332 covers the opening 335. The free end of the fixed body 3372b extends toward the box door 332 and out of the opening 335. The free end of the sliding body 3371b and the free end of the fixed body 3372b are inserted into the sliding slot 3373b through the sliding portion 3374b and are then connected to each other.

Particularly, the accommodation body 331 further includes a door frame 33181 that covers part of the region on one side of the opening 335, and the box door 332 includes a side wall 3324 mating with the door frame 33181. The free end of the sliding body 3371*b* extends toward the accommodation body 331, and extends into the storage chamber 334 of the accommodation body 331 when the box door 332 covers the opening 335. The accommodation body 331 further includes a side plate 3311 adjacent to both the door frame 33181 and the sliding body 3371*b*. The fixed body 3372*b* is fixed vertically on the inner wall of the side plate 3311. The free end of the fixed body 3372*b* extends toward the box door 332 and out of the opening 335. The free end of the sliding body 3371*b* and the free end of the fixed body 3372*b* are inserted into the sliding slot 3373*b* through the sliding portion 3374*b* and are then connected to each other.

Thus, the storage box 301*e* for the medical article can be opened and closed by the slider mechanism, and since the slider mechanism has the predetermined stroke, the slider enables the storage box 301*c* for the medical article to open the box door 332 only by a predetermined angle, which facilitates storage of the medical article and also facilitates opening and closing the box door 332.

Referring to FIG. 99, FIG. 99 is a schematic structural diagram of the storage box 301*d* for the medical article provided according to the fifth embodiment of this disclosure. Different from the above three embodiments, the storage box 301*d* for the medical article in the fifth embodiment further includes a pivoted structure 337*a*. The pivoted structure 337*a* is a crank slider mechanism. The crank slider mechanism includes a crank 3371*a*, a linkage 3372*a*, a slider 3373*a*, and a framework 3374*a*. The crank 3371*a* is fixed on the first surface 3321 of the box door 332. The framework 3374*a* is fixed horizontally on the inner wall of the accommodation body 331 and is provided with a sliding slot 33741*a*. One end of the linkage 3372*a* is rotatably connected to a free end of the crank 3371*a*. One end of the slider 3373*a* is rotatably connected to the other end of the linkage 3372*a*, and the other end of the slider 3373*a* is slidably disposed in the sliding slot 33741*a*.

Further, the accommodation body 331 further includes a door frame 33181 that covers part of the region on one side of the opening 335, and the box door 332 includes a side wall 3324 mating with the door frame 33181. The crank 3371*a* includes a fixed portion 33711*a*, and a connection portion 33712*a* bent and extending from the fixed portion 33711*a*. The fixed portion 33711*a* is fixed on a vertex angle region at the side of the box door 332 away from the side wall 3324. The connection portion 33712*a* protrudes vertically from the first surface 3321 of the box door 332. A free end of the connection portion 33712*a* is rotatably connected to one end of the linkage 3372*a*. The accommodation body 331 further includes a side plate 3311 adjacent to both the door frame 33181 and the crank 3371*a*. The framework 3374*a* is disposed horizontally on the inner wall of the side plate 3311.

Further, the length of the linkage 3372*a* is much greater than the length of the slider 3373*a*, and the slider 3373*a* is a sliding guide pin disposed in the sliding slot 33741*a*.

Further, the directions of the pivots between the crank 3371*a*, the linkage 3372*a*, the slider 3373*a* and the framework 3374*a* are each perpendicular to the side plate 3311.

Thus, the storage box 301*d* for the medical article can be opened and closed by the crank slider mechanism. Moreover, since the crank slider mechanism has the predetermined stroke, the crank slider mechanism enables the storage box 301*d* for the medical article to open the box door 332 only by a predetermined angle, which facilitates storage of the medical article and also facilitates opening and closing the box door 332.

Referring to FIG. 100, FIG. 100 is a schematic structural diagram of the storage box 301*e* for medical article provided according to the sixth embodiment of this disclosure. Different from the above three embodiments, the storage box 301*e* for the medical article in the sixth embodiment further includes a pivoted structure 337*b*. In this embodiment, the pivoted structure 337*b* is a slider structure. The slider structure includes a sliding body 3371*b* disposed on the box door 332 and a fixed body 3372*b* disposed on the accommodation body 331. The fixed body 3372*b* is provided with a sliding slot 3373*b*, the sliding body 3371*b* is provided with a corresponding sliding portion 3374*b*, and the sliding portion 3374*b* is inserted into the sliding slot 3373*b* to slide in the sliding slot 3373*b*.

Further, the sliding slot 3373*b* is arc-shaped and extends from the side close to the box door 332 to the side away from the box door 332, and the opening of the sliding slot 3373*b* opens to the sliding body 3371*b*.

Further, the free end of the sliding body 3371*b* extends toward the accommodation body 331, and extends into the storage chamber 334 of the accommodation body 331 when the box door 332 covers the opening 335. The free end of the fixed body 3372*b* extends toward the box door 332 and out of the opening 335; and the free end of the sliding body 3371*b* and the free end of the fixed body 3372*b* are inserted into the sliding slot 3373*b* through the sliding portion 3374*b* and are then connected to each other. Thus, the storage box 301*e* for the medical article can be opened and closed by the slider mechanism, and since the slider mechanism has the predetermined stroke, the slider mechanism enables the storage box 301*c* for the medical article to open the box door 332 only by a predetermined angle, which facilitates storage of the medical article and also facilitates opening and closing the box door 332.

Medical Article—Parameter Measurement Function Extension Module

Figure 101:
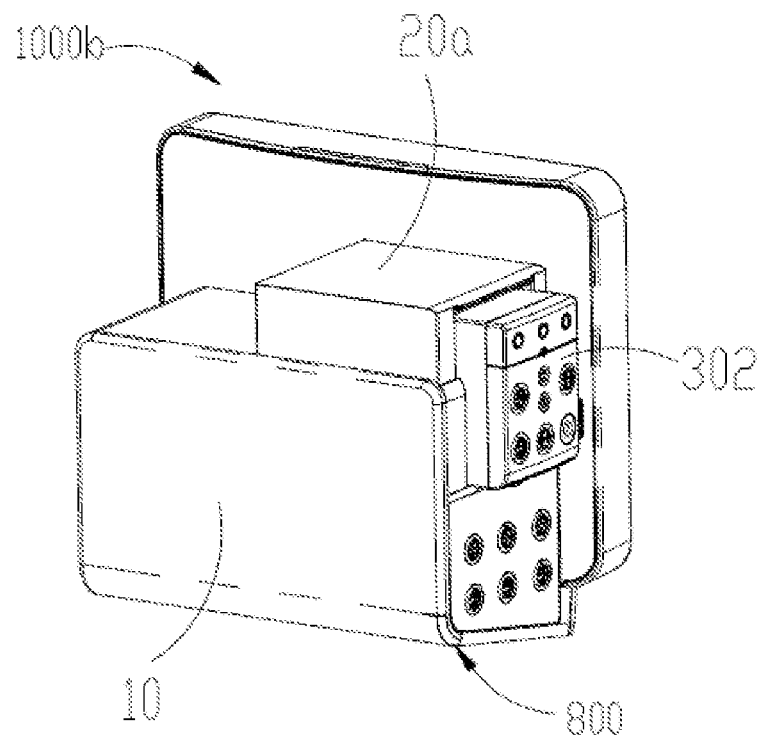
FIG. 101 is an assembled schematic structural diagram of a monitor and a medical article of a medical device provided according to an embodiment of this disclosure.
Figure 102:
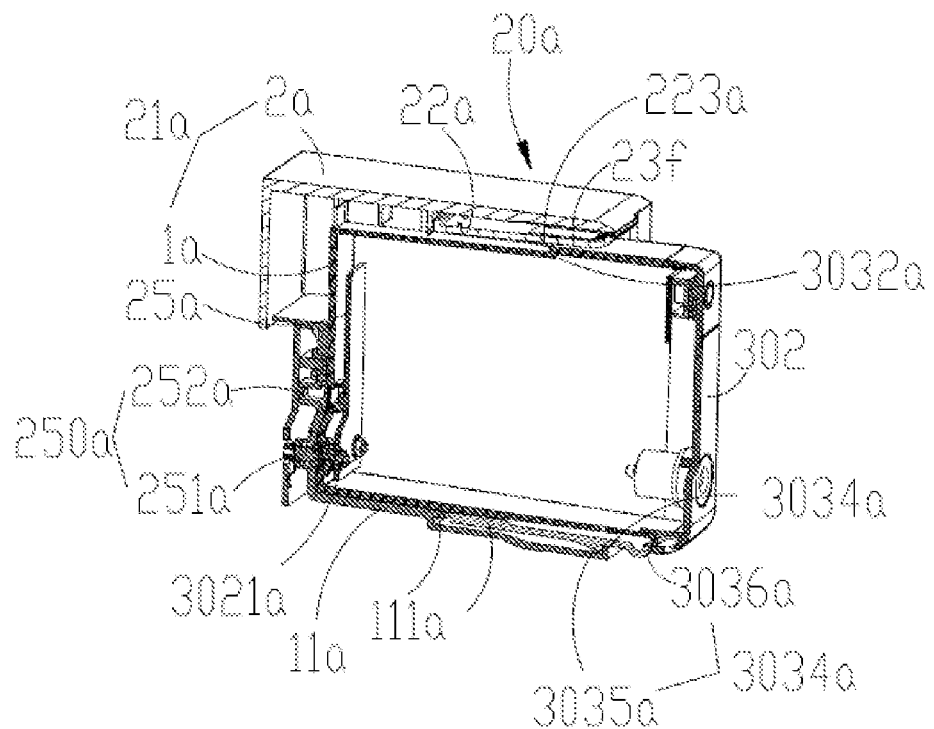
FIG. 102 is a partial section view of a part of the medical device of FIG. 101.

Referring to FIGS. 101 and 102 together, FIG. 101 shows a schematic structural diagram for an assembly of the monitor 800 and the medical article of the medical device 1000*b* provided according to the embodiments of this disclosure, and FIG. 102 is a partial section view of a part of the medical device. The medical device 1000*b* includes a monitor 800, and a medical article removably mounted on the monitor 800. In this embodiment, the medical article is a parameter measurement function extension module 302*a*.

A side face of the parameter measurement function extension module 302*a* is provided with several connection interfaces 3031*a* correspondingly connected to several functional interfaces 250*a* of a communication interface board 25*a*. The several connection interfaces include, but are not limited to a power interface and a communication interface. It may be understood that the monitor 100 is electrically connected to an external power source via the power interface, so the parameter measurement function extension module 302*a* is indirectly electrically connected to the external power source via the monitor 100. In some embodiments, the several connection interfaces 3031*a* include at least a power interface and a communication interface, and an elastic contact pin structure is used between the power interface as well as the communication interface and the connection interface 250*a* provided on the communication interface board 25*a* in the accommodation compartment 20*a*.

A side face of the parameter measurement function extension module 302a is provided with a first mating portion mating with the first retaining portion on the compartment inner wall of the accommodation compartment 20a. Further, the bottom of the parameter measurement function extension module 302a is provided with a second mating portion 3034a mating with the second retaining portion 111a disposed on the bottom plate 11a of the fixed compartment body 1a. The extending direction of the second mating portion 3034a is parallel to the insertion direction of the parameter measurement function extension module 302a. The second mating portion 3034a includes a connection end away from compartment door 22a and a free end close to the compartment door 22a. The connection end of the second mating portion 3034a is fixedly connected to the parameter measurement function extension module 302a, and a gap is formed between the free end of the second mating portion 3034a and the bottom surface of the parameter measurement function extension module 302a. Particularly, an engaging block 112a is provided on the side of the bottom plate 11a close to the compartment door 22a. The second mating portion 3034a includes an engaging portion 3035a and an operating portion 3036a. When the parameter measurement function extension module 302a is inserted into the accommodation compartment 20a, the engaging portion 3035a engages with the engaging block 112a such that the parameter measurement function extension module 302a is locked in the accommodation compartment 20a. Alternatively, the second mating portion 3034a is made of an elastic material, such that when the free end of the second mating portion 3034a moves toward the side away from the bottom plate 11a, the engaging portion 3035a is out of contact with the engaging block 112a to unlock the parameter measurement function extension module 302a from the accommodation compartment 20a, so as to facilitate the user removing the parameter measurement function extension module 302a.

The top of the parameter measurement function extension module 302a is further provided with a stepped third mating portion 3032a that stops against the third retaining portion 223a of the compartment door 22a. The third retaining portion 223a is arranged to match with the mating portion 3032a, such that when the parameter measurement function extension module 302a is inserted in the chamber of the accommodation compartment 20a, the parameter measurement function extension module can be accurately retained and guided by the cooperation of the mating portion 3032a and the third retaining portion 223a.

By using the structural layout design in the above embodiments, the transfer monitoring standby time of the monitor can be improved. In the same functional configuration, compared to traditional plug-in monitors, the volume of the whole machine is reduced by about 20%, which greatly reduces the volume of the plug-in monitor such that the plug-in monitor is more portable and has an additional mobile property, and the internal space of the monitor is effectively used to support a variety of power inputs and realize a variety of parameter extension function detections besides the measurement of basic parameters.

The embodiments of this disclosure have been described above in detail, where specific examples are used herein to explain the principles and embodiments of the present invention, and the description of the embodiments is only intended to facilitate understanding of the method of this disclosure and the core idea thereof. Moreover, for those skilled persons in the art, modifications can be made to the specific embodiments and the range of application thereof based on the idea of this disclosure. In summary, the content of this description should not be construed as the limitation of this disclosure.

What is claimed is:

1. A medical device, comprising:
a main case that comprises at least two exposed chamber outer walls, wherein the at least two exposed chamber outer walls enclose an accommodation chamber for accommodating a functional module; and
an accommodation compartment for accommodating a medical article or a storage box for the medical article, wherein the accommodation compartment is disposed on the main case and is adjacent to the accommodation chamber, wherein the accommodation compartment comprises at least one exposed compartment outer wall, and the at least one compartment outer wall is connected to at least one of the chamber outer walls of the main case, and wherein the medical article comprises a parameter measurement function extension module, a physiological parameter monitoring accessory, or an adapter part for a third-party device that is connected to the medical device;
wherein the accommodation compartment comprises a fixed compartment body, a movable compartment body and a lifting support apparatus; the fixed compartment body and the movable compartment body enclose an accommodation space for accommodating the medical article or the storage box for the medical article; the fixed compartment body is fixedly arranged on the main case, and the movable compartment body is movably connected to the fixed compartment body by means of the lifting support apparatus to form a variable accommodation space;
the accommodation space for accommodating the medical article or the storage box for the medical article becomes enlarged in response to the movable compartment body being lifted relative to the fixed compartment body while remaining movably connected to the fixed compartment body by the lifting support apparatus; and
wherein the lifting support apparatus comprises a movable connection portion, the movable compartment body is movable relative to the fixed compartment body via the movable connection portion so as to form the variable accommodation space for accommodating the medical article or the storage box for the medical article within the accommodation compartment, wherein the accommodation chamber is a closed chamber, and the accommodation compartment is a semi-open chamber configured to open and reclose by a compartment door movably disposed on the movable compartment body;
wherein the lifting support apparatus further comprises a support frame for supporting the fixed compartment body, and one or more sliding guide columns embedded in the support frame, wherein the movable connection portion is movably sleeved over the one or more sliding guide columns and is fixedly connected to the movable compartment body, and the fixed compartment body is fixed to the main case by means of the support frame.

2. The medical device of claim 1, further comprising a manipulator by which the movable compartment body is placed in a locked state or an unlocked state relative to the fixed compartment body,
wherein the manipulator is an elastic gripper that comprises a pressing member, a first movable member and a second movable member, wherein the first movable member and the second movable member are linked to the pressing member and drive the movable compartment body to be movable relative to the fixed compartment body.

3. The medical device of claim 2, wherein the manipulator further comprises a return member, and the pressing member movably mates with the main case by means of the return member; or
two ends of the first movable member respectively abut against the pressing member and the second movable member, and the pressing member and the second movable member are located on a same side of the first movable member; or
the movable compartment body comprises a side plate that is provided with a stopper on a side thereof close to the manipulator, and the second movable member is provided with a compression portion; when the pressing member is in an unstressed state, the compression portion is stopped by the stopper so as to bring the movable compartment body into the locked state; and when the pressing member is in a stressed state, the first movable member is stressed to drive the compression portion to move out of contact with the stopper so as to bring the movable compartment body into the unlocked state; or
the main case is provided with a mounting frame at a position corresponding to the manipulator, and the pressing member, the first movable member and the second movable member are movably mounted to the mounting frame.

4. The medical device of claim 3, wherein the lifting support apparatus further comprises an elastic piece sleeved over a bottom end of at least one of the one or more sliding guide columns; wherein when the movable compartment body is in the locked state, the movable connection portion presses against the elastic piece to bring the elastic piece into a compressed state; and when the movable compartment body is in the unlocked state, the elastic piece recovers from deformation.

5. The medical device of claim 1, wherein the medical device is a patient monitor provided with the main case; the medical device further comprises a fixing apparatus by which the storage box for the medical article and the monitor are removably connected;
wherein the fixing apparatus comprises a first fixing member and a second fixing member, the first fixing member is disposed on the monitor, the second fixing member is disposed on the storage box for the medical article, and the first fixing member and the second fixing member are positioned corresponding to each other, such that when the storage box for the medical article is inserted into the patient monitor by means of the accommodation compartment, the first fixing member and the second fixing member are removably connected with each other.

6. The medical device of claim 1, wherein the accommodation chamber is used for housing a functional device, the medical device further comprises a connection interface disposed on the functional device, and an external battery box for removable connection to the connection interface, and the external battery box is used to power the functional device inside the accommodation chamber when the external battery box is connected to the connection interface.

7. The medical device of claim 1, wherein the accommodation compartment comprises at least one compartment inner wall adjacent to the accommodation chamber, and the compartment inner wall is provided with a first connection interface in electrical connection with the medical article.

8. The medical device of claim 7, wherein
the storage box for the medical article comprises a mounting portion that is insertable into the accommodation compartment and an accommodation portion that is fixed on the mounting portion, the accommodation portion is a chamber structure for housing an article;
the storage box for the medical article further comprises a communication connection portion that is electrically connectable to the first connection interface when the mounting portion is inserted into the accommodation compartment;
a communication connection portion is arranged parallel to the accommodation portion, and a gap for inserting the storage box for the medical article into the accommodation compartment is formed between the mounting portion and the accommodation portion.

9. The medical device of claim 8, wherein the communication connection portion comprises a first communication interface disposed on a side or an end of the mounting portion and electrically connectable to the first connection interface; the communication connection portion further comprises a second communication interface, wherein the second communication interface is disposed on an outer surface of the mounting portion, and the second communication interface comprises a wireless interface or a wired interface.

10. The medical device of claim 1, wherein the movable connection portion reciprocates relative to the fixed compartment body, and drives the movable compartment body to move in a reciprocating way relative to the fixed compartment body so as to obtain the variable accommodation space of the accommodation compartment.

11. The medical device of claim 1, wherein a length direction of each of the one or more sliding guide columns is parallel to a movement direction of the movable compartment body, the movable connection portion reciprocates relative to the sliding guide column in the length direction thereof, and drives the movable compartment body to reciprocate relative to the fixed compartment body so as to obtain the variable accommodation space of the accommodation compartment.

12. The medical device of claim 1, wherein the support frame comprises a substrate, and the lifting support apparatus further comprises an elastic piece sleeved over at least one of the one or more sliding guide columns, and the elastic piece is clamped between the movable connection portion and the substrate of the support frame.

13. The medical device of claim 12, wherein when the fixed compartment body is completely covered by the movable compartment body, the movable connection portion is located at a first position on the one or more sliding guide columns and abuts against the elastic piece; when the movable compartment body is lifted relative to the fixed compartment body by a predetermined distance, the movable connecting portion is located at a second position on the one or more sliding guide columns, and the elastic piece recovers from a deformation, wherein the first position refers to an initial position of the movable connection portion relative to the one or more sliding guide columns, and the second position refers to a pre-operating position of the movable connection portion that is located away from a bottom end of the one or more sliding guide columns.

14. A medical device, comprising:
a main case that comprises at least two exposed chamber outer walls, wherein the at least two exposed chamber outer walls enclose an accommodation chamber for accommodating a functional module; and an accommodation compartment for accommodating a medical article or a storage box for the medical article, wherein the accommodation compartment is disposed on the main case and is adjacent to the accommodation chamber, wherein the accommodation compartment comprises at least one exposed compartment outer wall, and the at least one compartment outer wall is connected to at least one of the chamber outer walls of the main case, and wherein the medical article comprises a parameter measurement function extension module, a physiological parameter monitoring accessory, or an adapter part for a third-party device that is connected to the medical device;

wherein the accommodation compartment comprises a fixed compartment body, a movable compartment body and a lifting support apparatus; the fixed compartment body and the movable compartment body enclose an accommodation space for accommodating the medical article or the storage box for the medical article; the fixed compartment body is fixedly arranged on the main case, and the movable compartment body is movably connected to the fixed compartment body by means of the lifting support apparatus to form a variable accommodation space; and the accommodation space for accommodating the medical article or the storage box for the medical article becomes enlarged in response to the movable compartment body being lifted relative to the fixed compartment body while remaining movably connected to the fixed compartment body by the lifting support apparatus; and wherein the accommodation compartment comprises at least one compartment inner wall adjacent to the accommodation chamber, and the compartment inner wall is provided with a first connection interface in electrical connection with the medical article;

wherein the medical device further comprises a communication interface board that is arranged between the fixed compartment body and the movable compartment body and is located at a position where the accommodation compartment adjoins the accommodation chamber.

15. The medical device of claim 14, wherein the first connection interface is arranged on the communication interface board, and the first connection interface is exposed inside the accommodation space of the accommodation compartment.

* * * * *